United States Patent
Ishikawa et al.

(10) Patent No.: US 7,151,879 B2
(45) Date of Patent: Dec. 19, 2006

(54) OPTICAL FIBER RIBBON THAT IS EASILY BRANCHED INTO INDIVIDUAL OPTICAL FIBERS AND OPTICAL FIBER CABLE USING THE SAME

(75) Inventors: Hiroki Ishikawa, Yokohama (JP); Kaoru Okuno, Yokohama (JP); Atsushi Suzuki, Yokohama (JP); Tomoyuki Hattori, Yokohama (JP); Itaru Sakabe, Yokohama (JP); Keisuke Okada, Yokohama (JP); Hisashi Tanji, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/702,076

(22) Filed: Nov. 6, 2003

(65) Prior Publication Data
US 2004/0146255 A1    Jul. 29, 2004

(30) Foreign Application Priority Data

| Nov. 6, 2002 | (JP) | ............................. 2002-323074 |
| May 7, 2003 | (JP) | ............................. 2003-129269 |
| May 30, 2003 | (JP) | ............................. 2003-154941 |
| Jul. 1, 2003 | (JP) | ............................. 2003-189779 |
| Jul. 7, 2003 | (JP) | ............................. 2003-193162 |
| Aug. 4, 2003 | (JP) | ............................. 2003-205809 |

(51) Int. Cl.
*G02B 6/06* (2006.01)

(52) U.S. Cl. ..................................................... 385/114

(58) Field of Classification Search ................ 385/114, 385/101, 102, 106, 109, 112, 113
See application file for complete search history.

(56) References Cited

U.S. PATENT DOCUMENTS

| 4,147,407 | A |   | 4/1979 | Eichenbaum et al. |
| 4,724,024 | A | * | 2/1988 | Van Der Velde et al. ... 156/181 |
| 5,457,762 | A | * | 10/1995 | Lochkovic et al. ......... 385/114 |
| 5,524,166 | A | * | 6/1996 | Osaka et al. ................ 385/134 |
| 5,761,363 | A |   | 6/1998 | Mills |
| 5,982,968 | A | * | 11/1999 | Stulpin ....................... 385/114 |
| 6,160,941 | A | * | 12/2000 | Yang .......................... 385/114 |

(Continued)

FOREIGN PATENT DOCUMENTS

EP          218 418 A2    4/1987

(Continued)

OTHER PUBLICATIONS

Hartman, I., "Fibre Optic Ribbon Cable for Subscriber Loop Networks," Philips Telecommunication Review, Philips Telecommunlcatie Industrie N.V. Hilversum NL, vol. 49, No. 3, Sep. 1, 1991, pp. 23-25.

(Continued)

*Primary Examiner*—Chandrika Prasad
(74) *Attorney, Agent, or Firm*—McDermott Will & Emery LLP

(57) ABSTRACT

A plurality of optical fibers are arranged in parallel and peripheries of the plurality of these optical fibers are integrally formed using a sheath. Here, the sheath is formed over the entire length of optical fiber ribbons and a flat portion of the sheath is formed substantially parallel to a common tangent of the neighboring optical fibers. A maximum value of a thickness of the optical fiber ribbons is set to a value which is larger than an outer diameter of the optical fibers by 40 μm or less. Due to such a constitution, it is possible to easily branch the optical fibers from the integrally formed optical fiber ribbons.

39 Claims, 28 Drawing Sheets

U.S. PATENT DOCUMENTS

| | | |
|---|---|---|
| 6,853,783 B1 * | 2/2005 | Chiasson et al. ........... 385/114 |
| 2001/0048796 A1 * | 12/2001 | Ludl et al. ................. 385/114 |

FOREIGN PATENT DOCUMENTS

| | | |
|---|---|---|
| EP | 253 457 A2 | 1/1988 |
| EP | 0 328 409 A2 | 8/1989 |
| EP | 540 988 A1 | 5/1993 |
| EP | 0 650 237 A2 | 4/1995 |
| EP | 1 126 297 A1 | 8/2001 |
| FR | 2 543 729 A | 10/1984 |
| FR | 2 693 560 A | 1/1994 |
| JP | 60-257415 A | 12/1985 |
| JP | 61-73112 A | 4/1986 |
| JP | 61-98308 A | 5/1986 |
| JP | 61-103111 A | 5/1986 |
| JP | 62-24206 A | 2/1987 |
| JP | 62-91905 | 4/1987 |
| JP | 63-2085 A | 1/1988 |
| JP | 63-13008 A | 1/1988 |
| JP | 4-75304 A | 3/1992 |
| JP | 4-161910 | 6/1992 |
| JP | 4-166805 | 6/1992 |
| JP | 4-305605 | 10/1992 |
| JP | 5-019150 | 1/1993 |
| JP | 5-72448 | 3/1993 |
| JP | 5-73611 | 10/1993 |
| JP | 6-109955 | 4/1994 |
| JP | 6-191872 | 7/1994 |
| JP | 6-194549 | 7/1994 |
| JP | 6-273649 | 9/1994 |
| JP | 6-313827 | 11/1994 |
| JP | 7-120645 | 5/1995 |
| JP | 7-306320 | 11/1995 |
| JP | 7-330383 | 12/1995 |
| JP | 8-5843 | 1/1996 |
| JP | 8-43694 | 2/1996 |
| JP | 8-94894 | 4/1996 |
| JP | 8-129122 | 5/1996 |
| JP | 8-262292 | 10/1996 |
| JP | 9-197213 | 7/1997 |
| JP | 10-160945 A | 6/1998 |
| JP | 11-52202 | 2/1999 |
| JP | 11-231183 | 8/1999 |
| JP | 11-305086 | 11/1999 |
| JP | 11-316328 | 11/1999 |
| JP | 2000-155248 A | 6/2000 |
| JP | 2000-206382 A | 7/2000 |
| JP | 2000-231042 A | 8/2000 |
| JP | 2000-338377 | 12/2000 |
| JP | 2001-108876 A | 4/2001 |
| JP | 2001-249259 A | 9/2001 |
| JP | 2001-348412 A | 12/2001 |
| JP | 2002-122762 | 4/2002 |
| JP | 2002-162544 A | 6/2002 |
| JP | 2002-333560 A | 11/2002 |

OTHER PUBLICATIONS

Beresford D.M., et al. "Local Area Network: Optical Cable Systems." 2nd IEEE National Conference on Telecommuncaitions. Apr. 2-5, vol. COND. IEE No. 300, Apr. 2, 1989, pp. 82-87.

* cited by examiner

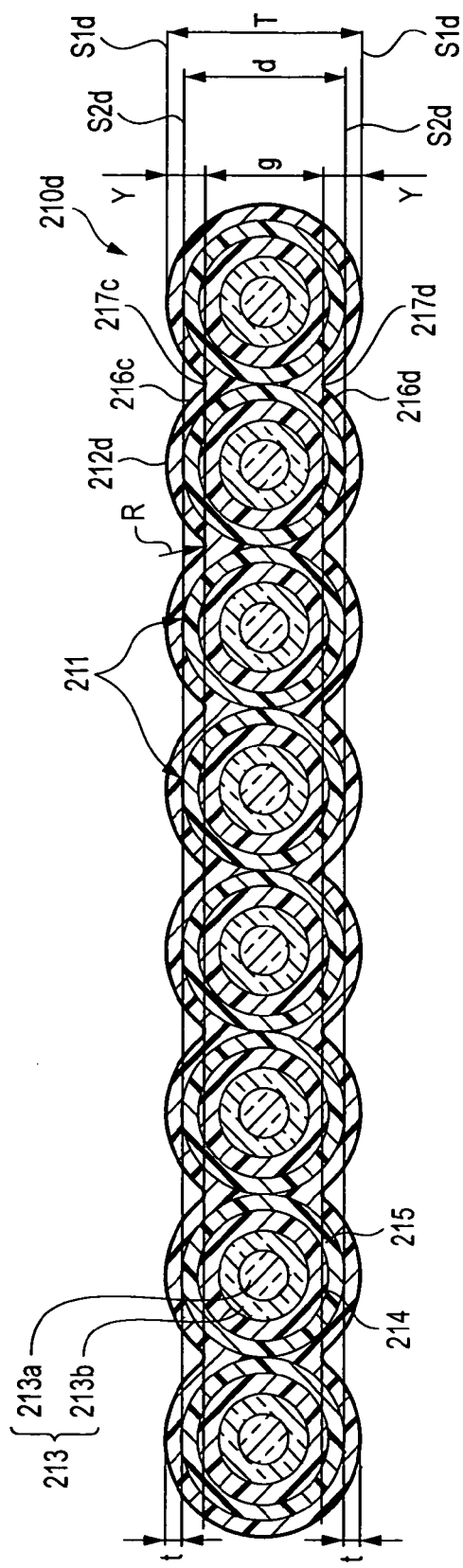

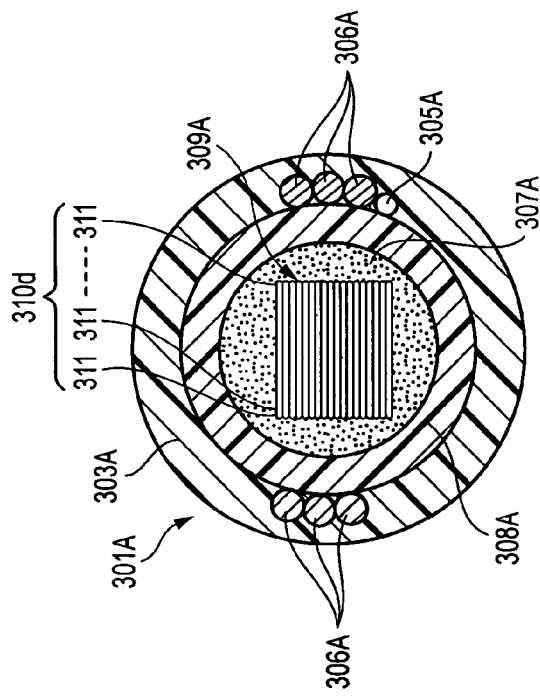
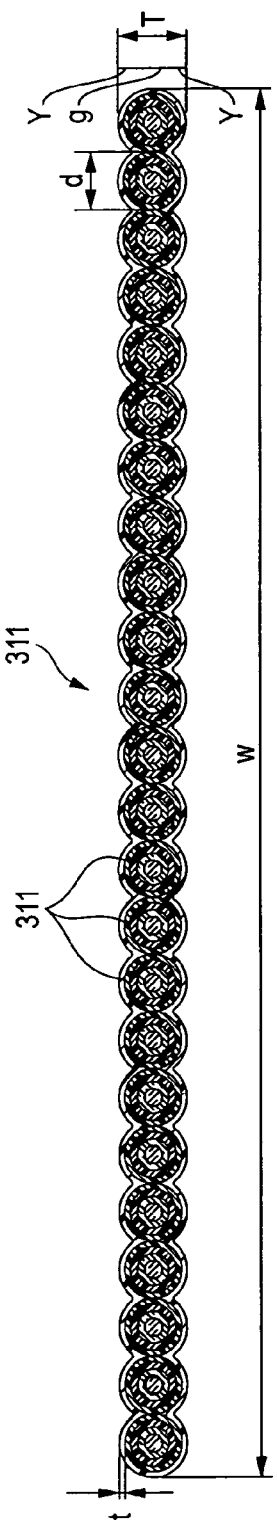
FIG. 27A
FIG. 27B

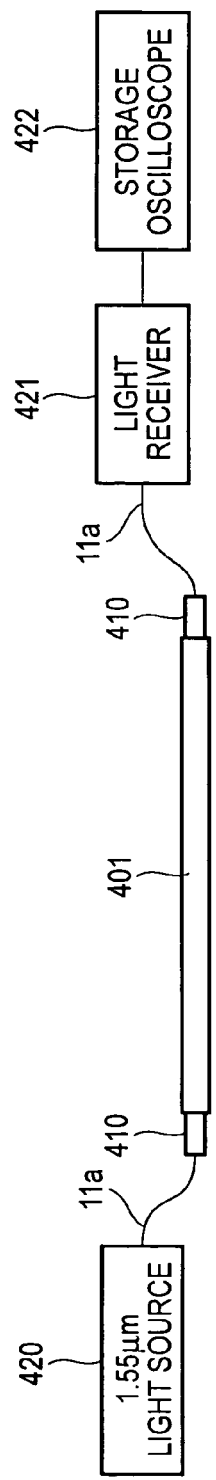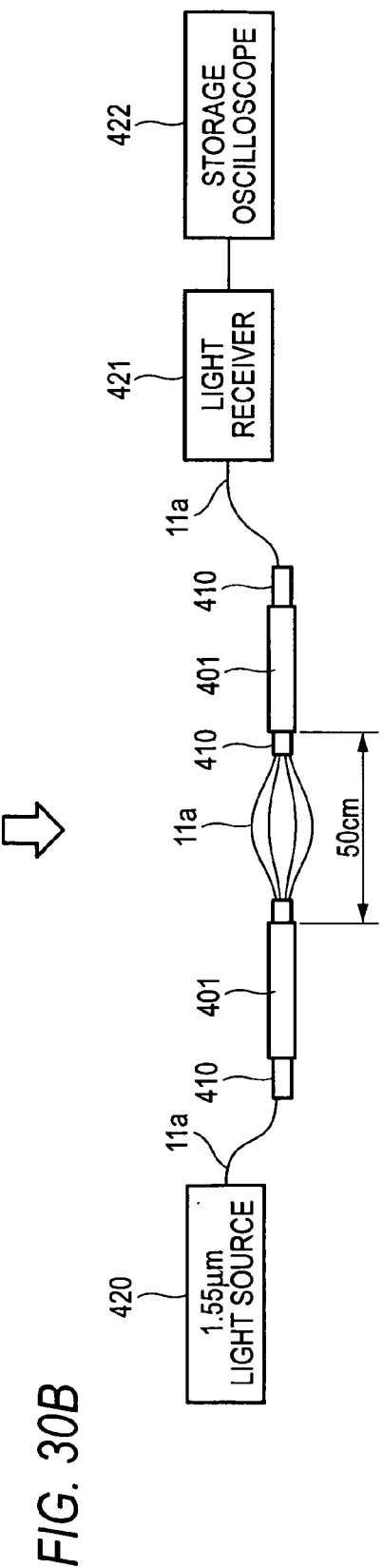
FIG. 30A
FIG. 30B

OPTICAL FIBER RIBBON THAT IS EASILY BRANCHED INTO INDIVIDUAL OPTICAL FIBERS AND OPTICAL FIBER CABLE USING THE SAME

BACKGROUND OF THE INVENTION

1. Field of the Invention

The present invention relates to an optical fiber ribbon and an optical fiber cable using the same.

2. Description of the Related Art

As an optical fiber ribbon which is formed by integrating a plurality of optical fibers in a ribbon shape, followings can be named for example.

In Japanese Unexamined Patent Publication Sho. 61(1986)-73112, a ribbon-type optical unit 1105 is disclosed, wherein, as shown in FIG. 39, the ribbon-type optical unit 1105 is configured such that a plurality of coated optical fibers 1103 each of which includes a coating layer 1102 made of an ultraviolet ray curable resin around an optical fiber 1101 are arranged in parallel to form an optical fiber assembled body, and a protective layer 1104 made of an ultraviolet ray curable resin is integrally formed on the optical fiber assembled body in a state that the protective layer 1104 is not adhered to the coating layers 1102. This ribbon type optical unit 1105 is characterized in that assuming an outer diameter of the coated optical fiber 1103 as X, the number of the coated optical fibers 1103 which form the optical fiber assembled body as n, a thickness and a width of the ribbon-type optical unit 105 as H and L, relationships $1.1 \leq H/X \leq 1.45$, $1.0 < L/nX \leq 1.08$ are established.

In Japanese Unexamined Utility Model Publication Hei.4 (1992)-75304, as shown in FIG. 40A and FIG. 40B, in an optical fiber ribbon, a color layer is formed on an outermost periphery of each coated optical fiber and an overall coating layer is formed over the whole periphery of the coated optical fibers. The coated optical fiber 1201 includes an optical fiber 1202 at the center thereof and a first coating layer 1203 and a second coating layer 1204 made of an ultraviolet ray curing type resin are sequentially applied on a periphery of thereof and, further, a color layer 1205 is formed on a periphery the second coating layer 1204 by applying color ink made of an ultraviolet ray curable resin. A plurality, (usually 4n (n being 2, 3, . . . ) pieces, and 8 pieces in this embodiment) of optical fibers 1202 are arranged in a row in parallel. The overall coating layer 1206 is filled in gaps defined between respective coated optical fibers 1201 which are arranged in parallel so as to integrate the coated optical fibers 1201 and is made of, for example, an ultraviolet ray curable resin which is applied to outer peripheries of the coated optical fibers 1201 with a thickness of h=10 μm or less. FIG. 40A is a plan view of the above-mentioned optical fiber ribbon. As clearly shown in FIG. 40A, the overall coating layer 1206 is intermittently peeled off in the longitudinal direction so that intermittent portions 1207 having no coating layers and exposing the coated optical fibers 1201 are formed. That is, coating portions 1208 where the coating layer 1206 is left and the above-mentioned intermittent layers are alternately arranged. FIG. 40B shows a transverse cross section of the portion which constitutes the above-mentioned coating portion 1208.

Further, in Japanese Unexamined Patent Publication Sho. 63(1985)-13008, as shown in FIG. 41, in an optical fiber ribbon 2100, a coated optical fiber 2101 is constituted of a glass fiber 2101a which constitutes a core and a primary coating layer (buffer layer) 2101b which is formed on an outer periphery of the glass fiber 2101a. A plurality of coated optical fibers 2101 are arranged in parallel like a ribbon and resin adhesive portions 2102 are formed at a fixed interval in the lengthwise direction of the ribbon. The resin adhesive portions 2102 are formed of an ultraviolet ray curable resin such as an epoxy acrylate resin, an polybuthadiene acrylate resin, a silicone acrylate resin, for example.

Further, In U.S. Pat. No. 4,147,407, as shown in FIG. 42, an optical fiber ribbon 2110 is formed such that a two-layered coating consisting of a primary coating 2112 and a secondary coating 2113 is applied to an outside of each glass fiber 2111 thus forming an optical fiber 2114. A plurality of these optical fibers 2114 are bundled and the secondary coatings 2113 which are once cured are melt by a solvent thus forming a common coating by melting each other.

Further, in Japanese Accepted Patent Publication Sho. 63(1988)-2085, as shown in FIG. 43, an optical fiber ribbon 2120 constitutes an optical fiber 2123 by forming a coating 2122 on an outside of a glass fiber 2121 and a roving is vertically attached to both sides of the optical fiber 2123 as reinforcing glass fibers 2124. Then, a ribbon-like interwoven body 2126 is obtained by weaving these reinforcing glass fibers 2124 as warps and glass fibers 2125 as wefts, and the interwoven body 2126 is impregnated with a thermosetting resin 2127 and is set to a half-cured state. In this case, the reinforcing glass fibers 2124 which are attached to both sides of the optical fiber 2123 are fastened by the glass fibers 2125 which constitute the wefts and wraps the optical fibers 2123.

Recently, along with the increase of demand for optical communication systems, optical fiber cables using the above-mentioned optical fiber ribbons which constitute optical transmission paths are popularly installed using conduits, poles or the like.

Generally, as the optical fiber cable installed in a communication trunk route such as the conduits and the poles, a tape slot type optical fiber cable has been popularly used (for example, see General Catalogue of optical fiber cable network wiring system, Sumitomo Denki Kogyo, Co., Ltd. issued on August, 2002, page 9).

FIG. 44 shows an example of a related-art tape slot type optical fiber cable.

As shown in FIG. 44, in the related-art tape slot type optical fiber cable 3050, a plurality of optical fiber ribbons 3060 are housed in grooves 3053 formed in a spacer 3052 having a tensile strength body 3051 at the center thereof. The optical fiber cable 3050 is a 100-core type optical fiber cable, wherein five sheets of four-fibered optical fiber ribbons 3060 are stacked and housed in each one of five grooves 3053. Further, respective grooves 3053 are formed spirally in one direction in a state that they are arranged parallel to each other along the longitudinal direction. Alternatively, there also exists a n optical fiber cable in which the respective grooves 3053 are formed spirally in the alternatingly inverted manner in the circumferential direction while maintaining a state in which they are arranged parallel to each other in the longitudinal direction. In general, the spacers in which the grooves are formed spirally in one direction are referred to as one-direction twisted spacers and the spacers in which the grooves are formed spirally in the alternatingly inverted manner are referred to as SZ spacers.

Further, to prevent the removal of the optical fiber ribbons 3060 from the grooves 3053, a press winding 3054 is wound around a periphery of the spacer 3052 and, at the same time, an outside of the press winding 3054 is covered with a plastic sheath 3055.

The tensile strength body 3051 is a tensile strength body which is provided for preventing the direct transfer of a tensile strength to the optical fiber ribbons 3060 when the tensile strength is applied to the optical fiber cable 3050 and a steel wire is used as the tensile strength body, for example.

The optical fiber ribbons 3060 are arranged such that four optical fibers having an outer diameter of 250 μm are arranged in parallel such that they are brought into contact with each other, and the whole optical fibers are covered with an ultraviolet ray curable resin and are formed into a ribbon shape. With respect to the contour of the optical fiber ribbon 3060, for example, a thickness thereof is approximately 0.3 mm to 0.4 mm and a width thereof is approximately 1.1 mm. Five optical fiber ribbons 3060 which are housed in the inside of one groove 3053 are stacked in a state that they are brought into close contact with each other.

Further, as another configuration of the optical fiber cable installed in a communication trunk route such as conduits, poles or the like, optical fiber ribbons are housed in a tube-like elongated body. For example, as a loose tube type fiber cable, a following fiber cable has been disclosed (see Proceedings of the 51$^{st}$ IWCS (International Wire & Cable Symposium) pages 22 to 25).

As shown in FIG. 45, six sheets of 12-fibered optical fiber ribbons 4102 each of which collectively covers 12-fibered optical fibers 4101 are interwoven and are housed in the inside of a tube 4103, and four pieces of these tubes 4103 are twisted together around a center tensile strength body 4104 in an alternatingly inverted manner in the longitudinal direction and, a sheath 4105 is applied thereto.

Although the detailed structure of the 12-fibered optical fiber ribbons 4102 is not described in detail, usually, coated optical fibers having an outer diameter of 250 μm are arranged in parallel and the whole coated optical fibers are covered with an ultraviolet ray curable resin thus forming the optical fiber ribbon in a ribbon shape. With respect to outer sizes of the ribbon-shaped body, for example, a thickness thereof is approximately 0.3 mm to 0.4 mm and a width thereof is approximately 3.1 mm.

As an optical fiber cable served for an application such as FTTH (Fiber To The Home) or the like, a drop cable which is distributed and dropped from an overhead wiring cable for every one or a plurality of optical fibers can be named (for example, General Catalogue on Optical fiber cable network wiring system, Sumitomo Denki Kogyo Co., Ltd. issued on August, 2002, page 13). An example of an optical fiber cable used as the drop cable is shown in FIG. 46.

As shown in FIG. 46, a related-art optical fiber cable 5100 is configured such that an element portion 5107 and a messenger wire portion 5108 are connected by a neck portion 5105.

In the element portion 5107, an optical fiber 5101 and two tensile strength bodies 5102 are covered with a sheath 5103 made of a thermoplastic resin. The optical fiber 5101 is formed by covering an outer periphery of a glass fiber with an ultraviolet ray curable resin, wherein an outer diameter thereof is 250 μm, for example. As the tensile strength body 5102, a linear body made of steel or fiber reinforced plastic (FRP) is used, wherein a contour of a cross section of the tensile strength body 5102 is formed in a circular shape. By collectively covering the optical fiber 5101 and the tensile strength bodies 5102 with the sheath 5103, an external force such as a tensile force or the like added to the optical fiber cable 5100 is received by the tensile strength bodies 5102 so as to protect the optical fiber 5101 from the external force.

Further, two notches 5104 are formed in an outer periphery of the element portion 5107 such that the notches 5104 are directed to the optical fiber 5101. The notches 5104 are provided for easing the taking out of the optical fiber 5101, wherein at the time of taking out the optical fiber 5101, cuts are formed in portions of the sheath 5103 between two notches 5104 and these portions are torn.

The messenger wire portion 5108 is configured to have strength to support the optical fiber cable 5100 overhead and is formed by covering a support line 5106 made of steel, FRP or the like with a sheath 5103.

Further, the neck portion 5105 is integrally formed with the element portion 5107 and the messenger wire portion 5108 using the same resin as the resin of the sheath 5103 for the element portion 5107 and the messenger wire portion 5108.

Although the optical fiber cable 5100 having one optical fiber 5104 is illustrated here, among the related-art drop cables, there exists a drop cable in which two optical fibers are arranged in parallel or, as shown in FIG. 47, there exist a drop cable which includes an optical fiber ribbon 5101a which is produced by a forming a plurality of optical fibers into a ribbon.

The related-art optical fiber ribbon 5101a is formed by arranging four optical fibers having an outer diameter of 250 μm in parallel in a state that four optical fibers are brought into contact with each other and the whole optical fibers are covered with an ultraviolet ray curable resin in a ribbon shape. The size of the outer contour of the optical fiber ribbon is such that a thickness thereof is approximately 0.3 mm to 0.4 mm and a width thereof is approximately 1.1 mm.

Here, with respect to the above-mentioned optical fiber cable which is installed in the communication trunk route shown in FIG. 44 and FIG. 45, to wire the optical fiber to a subscriber-side building or the like from a housing station, there may be cases in which the housed optical fiber ribbons are pulled out and any arbitrary optical fibers out of the pulled out optical fiber ribbons are connected with optical fibers at the subscribers side.

In the related-art tape slot type optical fiber cable shown in FIG. 44, first of all, the sheath and the press winding are peeled off from an arbitrary portion of the installed optical fiber cable by a given length and, thereafter, desired optical fiber ribbons are pulled out from the grooves. Then, given optical fibers are branched from the pulled-out optical fiber ribbons and are connected to the optical fibers at the subscriber side.

Further, with respect to the related-art loose tube type optical fiber cable shown in FIG. 45, first of all, the sheath is peeled off from an arbitrary portion of the installed optical fiber cable by a given length, the desired tubes are pulled out and, thereafter, the coatings of the tubes are removed so as to pull out the desired optical fiber ribbons. Then, given optical fibers are branched from the pulled-out optical fiber ribbons and are connected to the optical fibers at the subscriber side.

Further, with respect to the optical fiber cable 5100 shown in FIG. 46, when the optical fiber cable 5100 is introduced into the inside of a housing from overhead, the messenger wire portion 5108 for supporting the optical fiber cable overhead becomes unnecessary and hence, the neck portion 5105 is torn so as to divide the element portion 5107 and the messenger wire portion 5108. Then, the optical fiber cable which is constituted of only the element portion 5107 is wired in the housing.

With respect to the optical fiber cable 5100a shown in FIG. 47, after wiring the optical fiber cable 5100 in the inside of a housing, the coated optical fiber ribbon 5101a is taken out and the arbitrary optical fibers out of the taken-out optical fiber ribbon 5101a are connected to optical fibers at the subscribers side.

In this case, first of all, the sheath 5103 is torn at an arbitrary portion of the wired optical fiber cable 5100a so as to take out the optical fiber ribbon 5101a. Then, desired optical fibers are branched from the taken-out optical fiber ribbon 5101a and are connected to the optical fibers at the subscribers side.

Since the optical fiber cable which is already wired includes optical fibers through which optical signals are transmitted, there has been requested an operation to branch optical fibers which are not used as transmission paths from an intermediate portion of the optical fiber ribbon in which some optical fibers are used as the transmission paths while suppressing the deterioration of transmission quality (so-called live-line branching operation). Accordingly, in branching the desired optical fibers, a demand for a branching method which is referred to as an intermediate post branching in which desired optical fibers are branched from an intermediate portion of a taken-out optical fiber ribbon without cutting the optical fiber ribbon has been increasing.

However, with respect to the optical fiber ribbon which is housed in the related-art optical fiber cable, it is difficult to remove resin which covers a plurality of optical fibers and, particularly, under the current situation, it is difficult to perform the intermediate post branching by selecting one optical fiber out of the plurality of optical fibers.

For example, in an attempt to shave off the resin using a sandpaper or a tool such as a planer, there exists a possibility that the optical fiber is damaged or cut.

Under such circumstances, in the related art, the intermediate post branching cannot be performed and hence, to branch a desired optical fiber, all of a plurality of optical fibers which are integrally formed as an optical fiber ribbon are cut and, thereafter, a single optical fiber is branched from the cut portion of the optical fiber ribbon. Accordingly, it is impossible to perform the live-line branching operation of the optical fiber ribbon including the optical fibers in the using state (that is, in the live state) as the transmission path.

Further, when the optical fiber ribbon is cut, the remaining optical fibers other than the optical fibers which are connected at the cut portion cannot be used as the transmission path thus pushing up a cost for constructing an optical communication network.

Further, recently, the demand for long-distance transmission of the high-speed signals of high packing density has been increasing in the information communication and the reduction of polarization mode dispersion (PMD) of the optical fiber which becomes a factor to restrict the long-distance transmission has been requested. However, in the optical fiber cable shown in FIG. 45 which houses the optical fiber ribbon in the tube, the ribbon is twisted in the tube and, further, the tube is twisted around the tensile strength body at the center and hence, the ribbon is deformed in the tube and hence, there arises a drawback that the refractive birefringence is generated due to a stress which the optical fiber receives from resin so that the PMD is increased.

SUMMARY OF THE INVENTION

Accordingly, it is an object of the present invention to provide an optical fiber ribbon in which the optical fiber ribbon can be formed by surely integrating a plurality of optical fibers, the optical fibers can be easily branched in an optical fiber branching operation, and the increase of transmission loss of the optical fibers can be suppressed at the time of performing live-line branching.

It is also an object of the present invention to provide an optical fiber cable which can perform the intermediate post branching of an optical fiber ribbon housed in an optical fiber cable.

It is another object of the present invention to provide an optical fiber cable which can realize the easy intermediate post branching of an optical fiber ribbon housed in an optical fiber cable and, at the same time, can reduce PMD.

In order to accomplish the object above, the following means are adopted. According to the present invention, there is provided an optical fiber ribbon comprising:

a plurality of optical fibers which are arranged in parallel; and a resin which integrates the plurality of optical fibers over the whole length of the optical fibers, the optical fibers and the resin being in a state that the optical fibers and the resin are closely adhered to each other, wherein assuming a maximum value of a thickness of the optical fiber ribbon as T(μm) and an outer diameter of the optical fiber as d(μm), a relationship $T \leq d+40$ (μm) is established.

In the optical fiber ribbon with such a structure, the sheath and the optical fibers are not separated at manufacturing the optical fiber cable or wiring work because the optical fibers and the sheath are closely adhered to each other. Further, when it needs to branch the optical fiber from a portion other than the end portion of the optical fiber ribbon, because the sheath is thin, the cracks are generated in the sheath, the sheath is peeled off and thus the optical fiber can be easily branched. Furthermore, when the optical fibers which are not used are branched from the optical fiber ribbon already installed in which some optical fibers are used as transmission paths (so called live-line branching operation), the increase of the transmission loss of the optical fiber can be suppressed.

In the optical fiber ribbon, preferably, the plurality of optical fibers are integrated by covering the whole periphery of the plurality of optical fibers in a parallelly arranged state with the resin.

Further, a recessed portion may be formed in the resin corresponding to an indentation between the neighboring optical fibers.

According to the optical fiber ribbon with such a structure, for example, cracks are not generated in the sheath at manufacturing the optical fiber cable or wiring work and thus the optical fibers are securely integrated without separation of the optical fibers. Further, when it needs to branch the optical fibers from the optical fiber ribbon, the sheath can be peeled off easily from the recessed portion of the sheath and thus the optical fibers can be branched. Further, at live-line branching operation, the increase of the transmission loss of the optical fiber can be suppressed.

In order to accomplish the object above, an optical fiber ribbon, according to the present invention, comprising:

a plurality of optical fibers which are arranged in parallel in a state that the optical fibers are in contact with each other; and a resin which integrates the plurality of optical fibers by covering the whole peripheries of the plurality of the optical fibers, wherein the resin is formed over the whole length of the optical fiber ribbon and, at the same time, the resin disposed in a recessed portion formed between the neighboring optical fibers does not exceed a common tangent of the neighboring optical fibers.

According to the optical fiber ribbon with such a structure, since the recessed portion of the sheath which covers the indentation between the optical fibers does not exceed a common tangent of the neighboring optical fibers, the recessed portion of the sheath becomes deeper in accordance with the shape of the indentation between the optical fibers. Since the sheath at the recessed portion can be made thin in the thickness, the sheath can be peeled off easily and thus the optical fibers can be branched when the optical fibers are branched.

Further, in order to accomplish the object above, an optical fiber cable, according to the present invention, having one or a plural sheets of optical fiber ribbons, the optical fiber ribbon comprising a plurality of optical fibers which are arranged in parallel and a resin which integrates the plurality of optical fibers over the whole length of the optical fibers, the optical fibers and the resin being in a state that the optical fibers and the resin are closely adhered to each other, wherein assuming a maximum value of a thickness of the optical fiber ribbon as T (μm) and an outer diameter of the optical fiber as d (μm), a relationship $T \leq d+40$ (μm) is established.

The optical fiber ribbon may configured such that the plurality of optical fibers are integrated by covering the whole periphery of the plurality of optical fibers in a parallelly arranged state with the resin. Further, a recessed portion may be formed in the resin of the optical fiber ribbon corresponding to an indentation between the neighboring optical fibers.

According to the optical fiber cable with such a structure, the thickness of the resin which integrates the plurality of the optical fibers is thinner compared with the related-art thickness, and thus the intermediate post branching work can be performed easily. Therefore, the optical fibers, for which the intermediate post branching are not performed, in the optical fiber ribbon can be taken out from the optical fiber cable at the other potion, and connected, and thus it is possible to effectively make use of the plural optical fibers housed in the optical fiber cable.

The above-mentioned optical fiber cable may further comprises a spacer having an approximately columnar plastic elongated body including a tensile strength body at a center thereof, wherein an approximately spirally grooves are formed on an outer peripheral face of the elongated body, and one or the plural sheets of optical fiber ribbons are stacked and housed in the inside of the groove.

Further, the above-mentioned optical fiber cable may further comprising:

an approximately cylindrical elongated tube in which one or the plural sheets of optical fiber ribbons are housed in a stacked manner.

The above-mentioned optical fiber cable also may further comprising:

a sheath for covering one or-the plural sheets of the optical fiber ribbon.

Furthermore, in order to accomplish the object above, an optical fiber cable, according to the present invention, having one or a plural sheets of optical fiber ribbons, the optical fiber ribbon comprising a plurality of optical fibers which are arranged in parallel in a state that the optical fibers are in contact with each other; and a resin which integrates the plurality of optical fibers by covering the whole peripheries of the plurality of the optical fibers, wherein the resin is formed over the whole length of the optical fiber ribbon and, at the same time, the resin disposed in a recessed portion formed between the neighboring optical fibers does not exceed a common tangent of the neighboring optical fibers.

According to the optical fiber cable with such a structure, the thickness of the resin which integrates the plurality of the optical fibers is thinner compared with the related-art thickness, and thus the intermediate post branching work can be performed easily. Therefore, the optical fibers, for which the intermediate post branching are not performed, in the optical fiber ribbon can be taken out from the optical fiber cable at the other potion, and connected, and thus it is possible to effectively make use of the plural optical fibers housed in the optical fiber cable.

BRIEF DESCRIPTION OF THE DRAWINGS

FIG. 25 is a cross-sectional view showing an optical fiber ribbon housed in an optical fiber cable shown in FIG. 24;

FIG. 27A is a cross-sectional view of another optical fiber cable according to the second embodiment of the present invention;

FIG. 27B is a cross-sectional view of an optical fiber ribbon of an optical fiber cable shown in FIG. 27A;

FIG. 30A and FIG. 30B are schematic views showing the manner of an intermediate post branching test of an optical fiber ribbon in an optical fiber cable;

DETAILED DESCRIPTION OF THE INVENTION

Hereinafter, embodiments of an optical fiber ribbon, a manufacturing method thereof and an optical fiber cable according to the present invention are explained in detail in conjunction with attached drawings.

Figure 1A:
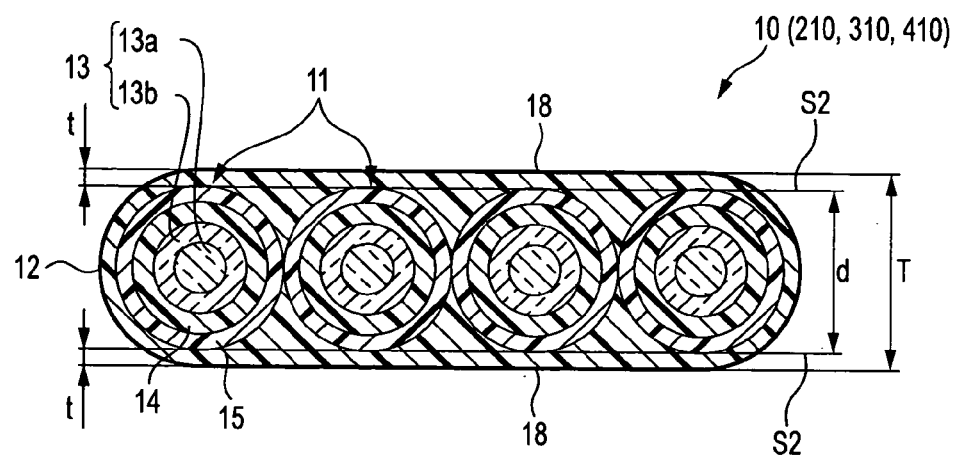
FIG. 1A is a cross-sectional view of an optical fiber ribbon according to a first embodiment of the present invention.
Figure 1B:
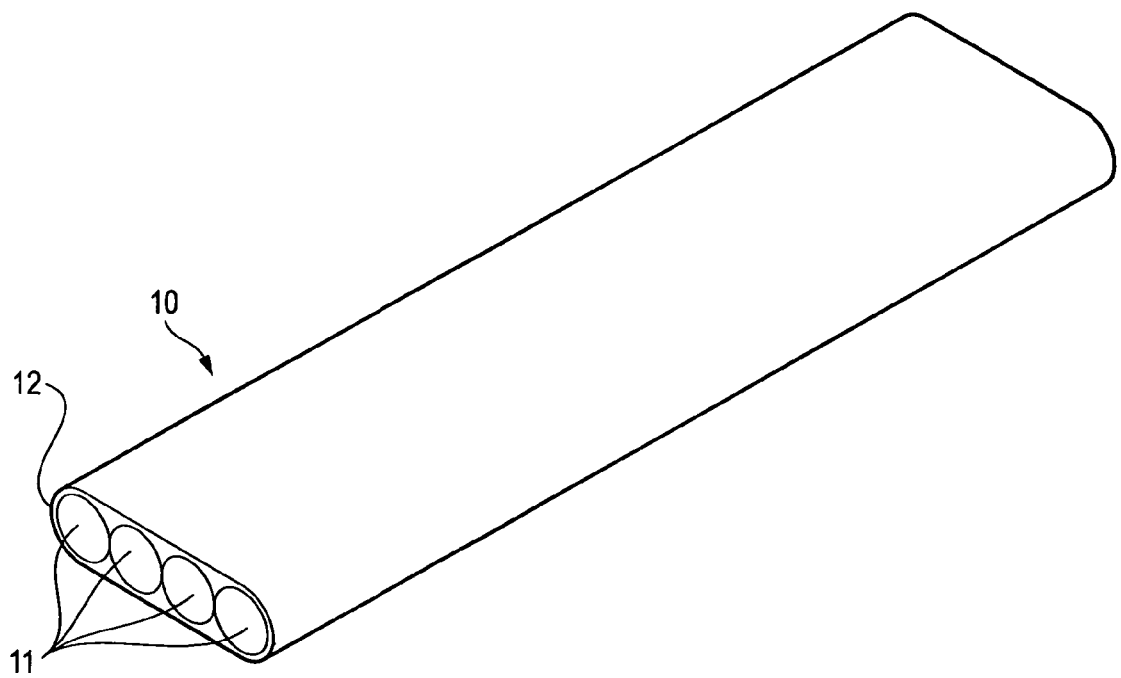
FIG. 1B is a perspective view of an optical fiber ribbon according to the first embodiment of the present invention.

FIG. 1A is a cross-sectional view showing a first embodiment of the optical fiber ribbon according to the present invention and FIG. 1B is a perspective view of the optical fiber ribbon. The optical fiber ribbon 10 is formed by arranging a plurality of (four pieces as an example in this embodiment) optical fibers 11 in parallel and applying a sheath 12 over the whole outer periphery of these optical fibers 11 arranged in parallel and over the entire length of the optical fibers 11. The sheath 12 is closely adhered to the optical fibers 11.

In the optical fiber ribbon according to the present invention, as shown in FIG. 1A, the optical fibers are brought into contact with each other. Here, "brought into contact with" includes a case in which there exists an interval between neighboring optical fibers of the optical fiber ribbon of equal to or less than 10 µm as a manufacturing error. When the optical fibers included in the optical fiber ribbon are brought into contact with each other, the optical fiber ribbon can be easily branched. Even when the optical fibers are not brought into contact with each other, so long as the interval between the neighboring optical fibers of the optical fiber ribbon is equal to or less than 10 µm, an amount of resin which forms the sheath and intrudes between the optical fibers is small and hence, branching can be performed easily. The optical fiber 11 is constituted of a glass fiber 13 which consists of core 13a and a clad 13b, a protective coating 14 which covers an outer periphery of the glass fiber 13, and a color layer which covers an outer periphery 15 of the protective coating 14. Further, the outer periphery 15 may constitute a secondary protective film and the color layer having a thickness of approximately 1 µm to 10 µm may be formed on the outer periphery 15. Further, thin film-like carbon layer may be formed on the periphery of the glass fiber 13 by coating. Here, it is preferable that the optical fiber 11 conforms to G652 prescribed in ITU-T (International Telecommunication Union—Telecommunication standardization sector).

As the glass fiber 13 which can be used in the present invention, a glass fiber having any distribution of refractive index can be used including a glass fiber which is formed of a core and a multi-layered clad or the like. Further, as the optical fiber 11, an optical fiber which is formed by covering an outer periphery of the glass fiber. 13 with the protective coating 14 may be used.

In this optical fiber ribbon 10, an ultraviolet ray curable resin is applied to the outer peripheries of four optical fibers 11 arranged in parallel as the sheath 12. As the material of the sheath 12, a thermoplastic resin, a thermosetting resin or the like can be used besides the ultraviolet ray curable resin.

Figure 9:
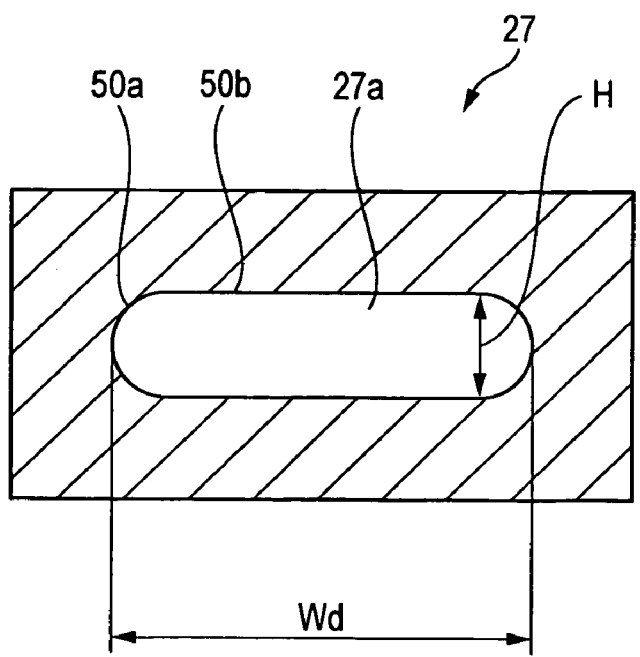
FIG. 9 is a cross-sectional view of a die.

The sheath 12 which covers the optical fibers 11 is formed of a flat portion 18 which is substantially parallel to a common tangent S2 which is formed by the optical fibers 11, 11 at a region where the optical fibers 11, 11 are arranged in parallel. When a wall thickness t of the sheath 12 of the optical fiber ribbon 10 is made small, even when the sheath 12 is formed by applying a resin which forms the sheath 12 to the optical fibers 11 using a die 27 as shown in FIG. 9, there may be a case that a minute indentation is generated on the sheath 12 of the optical fiber ribbon 10 such that the sheath 12 conforms to a contour of the optical fibers 11. The flat portion 18 according to the present invention includes such a case. When the optical fibers 11 are branched from the optical fiber ribbon 10, the optical fibers 11 can be easily branched by peeling off the sheath 12 of the flat portion 18 by a manual operation of an operator or using a branching tool. With respect to the optical fiber ribbon according to the present invention, it has been confirmed that a thickness of the sheath of the optical fiber ribbon has some influence from a viewpoint of achievement of the favorable branching operability and the suppression of the increase of transmission loss at the time of live-line branching.

Table 1 shows the relationship among an outer diameter d of the optical fiber, a maximum thickness T of the optical fiber ribbon and the thickness t of the sheath. The table is served for evaluating the branching property, loose coil PMD and cable PMD of the optical fiber ribbon. Here, the thickness t of the sheath is a wall thickness of the sheath outside the common tangent S2 of respective optical fibers of the optical fiber ribbon.

TABLE 1

| fiber diameter d (μm) | ribbon thickness T (μm) | sheath thickness (μm) | branching property | loose coil PMD | cable PMD |
| --- | --- | --- | --- | --- | --- |
| 250 | 290 | 20 | fair | fair | fair |
| 250 | 280 | 15 | good | fair | fair |
| 250 | 270 | 10 | good | good | good |
| 250 | 260 | 5 | good | good | good |

In Table 1, as shown in FIG. 1, the fiber diameter means the outer diameter d of the optical fiber 11, ribbon thickness is the maximum thickness T of the optical fiber ribbon 10, and the sheath thickness is a length t between the common tangent S2 of the optical fibers 11 and the flat portion 18 of the sheath 12. The outer diameter of the optical fibers of the optical fiber ribbon shown in Table 1 is 250 μm.

Branching property shown in Table 1 indicates the easiness of branching at the time of branching an intermediate portion of the optical fiber ribbon into respective optical fibers while suppressing the increase of transmission loss to 1.0 dB or less. "good" indicates that the branching can be performed in a time exceeding two minutes and within three minutes and "fair" indicates that the branching can be performed in a time exceeding three minutes and within 5 minutes. When the evaluation of branching property is either "good" or "fair", the increase of the transmission loss at the time of branching is equal to or less than 1.0 dB so that the live-line branching can be performed.

The optical fiber ribbon shown in Table 1, exhibits the relationship $T \leq d+40$ (μm) and hence, all of optical fiber ribbons exhibit the branching property superior to "fair", wherein the intermediate post blanching can be performed within five minutes by setting the increase of the transmission loss at the time of branching to equal to or less than 1.0 dB. That is, the live line branching can be performed within 5 minutes. With respect to the related-art optical fiber ribbon, the increment of the transmission loss at the time of branching exceeds 1.0 dB or the related-art optical fiber ribbon requires a given time which exceeds five minutes even when the optical fibers can be separated and hence, the live-line branching cannot be performed from a realistic point of view. According to the optical fiber ribbon shown in Table 1, provided that the ribbon thickness is equal to or less than 280 μm, that is, the relationship $T \leq d+30$ (μm) satisfied the live-line branching can be performed within three minutes.

Figure 2A:
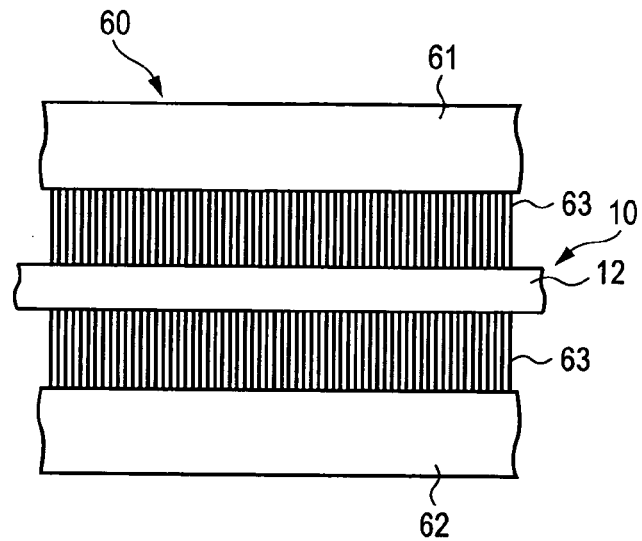
FIG. 2A to FIG. 2C are schematic views showing a method of branching an optical fiber ribbon according to the first embodiment of the present invention.
Figure 2B:
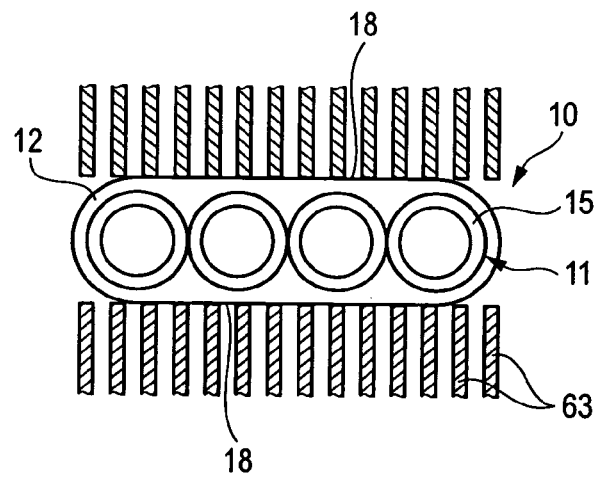
Figure 2C:
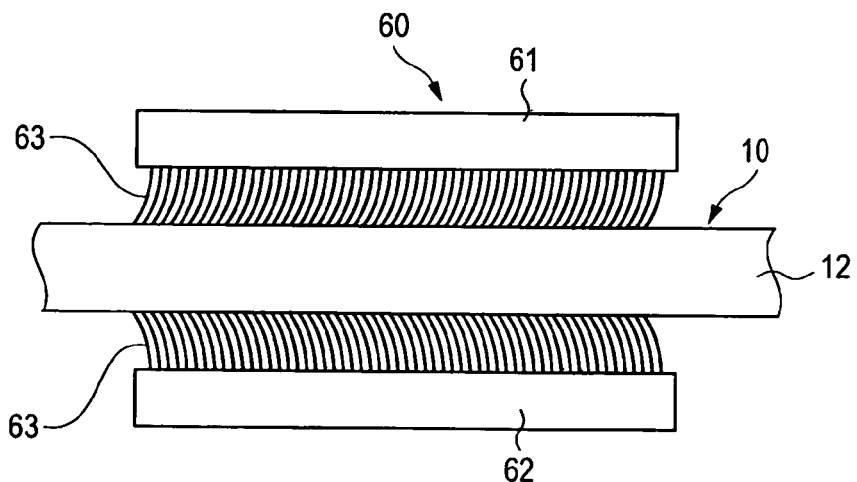

With respect to the above-mentioned live-line branching, one example of the branching method is explained. As shown in FIG. 2A, the optical fiber ribbon 10 is sandwiched between an upper base 61 and a lower base 62 of a branching tool 60, wherein wire rods 63 which are formed on these upper and lower bases 61, 62 in an erected manner are made to approach flat portions 18 of the sheath 12 of the optical fiber ribbon 10. FIG. 2B shows the cross section of such a structure. Further, by pressing the branching tool 60 to the optical fiber ribbon 10, as shown in FIG. 2C, the wire rods 63 are deflected and sharp corners of distal ends of the deflected wire rods 63 are strongly brought into contact with the flat portions 18 of the sheath 12 of the optical fiber ribbon 10.

By moving the branching tool 60 relative to the optical fiber ribbon 10 in the longitudinal direction (the left-and-right direction in FIG. 2C) of the optical fiber ribbon 10 in a state that the branching tool 60 is pressed to the optical fiber ribbon 10, that is, by rubbing the optical fiber ribbon 10 with the branching tool 60, flaws are formed on the flat portions 18 or portions of the sheath are peeled off by the distal ends of the wire rod 63 and hence, the optical fibers 11 are branched. Either one or both of the branching tool 60 and the optical fiber ribbon 10 may be moved. The wire rods 63 are resilient and hence, when the wire rods 63 are pressed to the flat portions of the optical fiber ribbon, the wire rods 63 are deflected and the corner portions of the distal ends of the wire rods 63 are brought into contact with the flat portions 18. By moving the branching tool 60 or the optical fiber ribbon 10 in such a state, the wire rods 63 (flexible member) imparts flaws to the flat portions 18 or peel off the flat portion 18.

By repeating rubbing of the optical fiber ribbon 10 using the branching tool 60, an interface between the color layer 15 of the optical fiber 11 and the sheath 12 of the flat portion 18 is peeled off. When the rubbing is further repeated, portions of the flat portions 18 above or below the center axes of the optical fiber 11 are shaved off and cracks are generated and thereafter, the cracks formed in the flat portions 18 are developed by the stress concentration and hence, the flat portions 18 are peeled off. In this manner, the sheath 12 of the optical fiber ribbon 10 is ruptured and the optical fiber ribbon 10 is branched into the respective optical fibers.

By adjusting the power by which the resilient materials 63 is pressed to the optical fiber ribbon 10, a change amount of transmission loss of optical signals at the time of branching becomes equal to or less than 1.0 dBDb. Further, depending on the manner of branching, such a change amount of transmission loss can be reduced to a value equal to or less than 0.5 dB. Accordingly, even when the optical fiber ribbon includes live lines, the optical fiber ribbon can be branched without cutting the live lines even in a moment.

To review the branching property of the optical fiber ribbons shown in Table 1, the smaller the thickness of the sheath, it is possible to have the better branching property. Although when the thickness of the sheath t is 20 μm, the evaluation of the branching property is "fair", when the thickness of the sheath t is equal to or less than 15 μm, the evaluation of the branching property is "good". That is, the smaller the thickness of the flat portion 18 of the sheath 12, peeling off of the sheath 12 becomes easier.

In the same manner, the evaluation of the loose coil PMD and the cable PMD is examined. The loose coil PMD is the polarized mode dispersion in a state that the optical fiber ribbons are loosely coiled in a circular shape and the cable PMD is the polarized mode dispersion when the optical fiber ribbons are formed into a cable. With respect to the evaluation of the loose coil PMD and the cable PMD, the symbol "good" shows a case in which they assume a value $0.05<PMD \leq 0.1$ (ps/km$^{1/2}$) and the symbol "fair" shows a case in which they assume a value $0.1<PMD \leq 0.2$ (ps/km$^{1/2}$). With respect to the evaluation of the loose coil PMD or the cable PMD shown in Table 1, although when the thickness of the sheath is 20 μm and 15 μm, the evaluation is "fair", when the thickness of the sheath is 10 μm, 5 μm, the evaluation is "good".

That is, when the ribbon thickness assumes the relationship $T \leq d+20$ (μm), the loose coil PMD and the cable PMD are good and the branching property is also good with this thickness of the sheath. When the thickness of the sheath of the optical fiber ribbon is thin, the optical fibers are not separated and the optical fiber ribbons can be easily deflected or easily bent. Therefore, it is easy to bend the optical fiber ribbons in a loose coil state and, further, it is easy to bend the optical fiber ribbons along the curve of the slot grooves of the cable.

Further, it is considered that, by making the sheath thin, the curing shrinking stress at the time of integration of the optical fibers can be made small and the PMD can be improved.

Further, although not shown in Table 1, with respect to the optical fiber ribbon having the thickness of more than 290 μm, that is, the optical fiber ribbon having the thickness exceeding d+40(μm), it is possible to favorably ensure the integrality of the optical fiber ribbon that the optical fibers are not separated when the optical fiber ribbon is formed into a cable. However, this takes a long time at the time of performing the branching and hence, it is favorable that the maximum thickness of the optical fiber ribbon is made equal to or less than d+40 μm. In this case, it is favorable that the thickness t of the sheath t is equal to or less than 20 μm. This implies that it is favorable that, in FIG. 1, the thickness t of the portion of the sheath above the optical fibers and the thickness t of the sheath below the optical fibers are substantially equal. In this case, the cores 13a of the optical fibers 11 are positioned almost at the center in the thickness direction of the optical fiber ribbon 10 and hence, when the optical fiber ribbons are connected to each other, the positions of the cores of both optical fiber ribbons are substantially aligned with each other whereby the connection loss is small.

TABLE 2

| fiber diameter d (μm) | ribbon thickness T (μm) | sheath thickness (μm) | branching property | loose coil PMD | cable PMD |
|---|---|---|---|---|---|
| 125 | 165 | 20 | fair | fair | fair |
| 125 | 155 | 15 | good | fair | fair |
| 125 | 145 | 10 | good | good | good |
| 125 | 35 | 5 | good | good | good |

Table 2 shows the relationship among the outer diameter d of optical fibers of the optical fiber ribbon using optical fibers having an outer diameter of 125 μm, the maximum thickness T of the optical fiber ribbon and the thickness t of the sheath. The explanation of the thickness of the sheath, the branching property of the optical fiber ribbon, the loose coil PMD and the cable PMD and the explanation of the symbol "good" and the symbol "fair" of the evaluation are similar to those explained in conjunction with Table 1 and hence, these explanations are omitted here.

When the ribbon thickness is 165 μm, the relationship $T \leq d+40$ μm is established and the evaluation of the branching property is "fair". This implies that the live-line branching can be performed when it is possible to takes time. Further, with respect to the case in which the ribbon thickness is equal to or less than 155 μm, that is, the relationship $T \leq d+30$ μm is established, the evaluation of the branching property is "good" and the live-line branching were able to be favorably performed within two or three minutes.

Although not shown in Table 2, with respect to the optical fiber ribbon having the ribbon thickness exceeding 165 μm, that is, the fiber diameter of equal to or more than d+40 μm, the time necessary for performing the branching without increasing the loss of the optical fibers is prolonged (for example, it takes more than 5 minutes) and hence, it is favorable that the ribbon thickness T is equal to or less than the fiber diameter d+40 μm. Accordingly, it is favorable that the thickness t of the sheath t is equal to or less than 15 μm in the same manner as Table 1.

In reviewing the loose coil PMD and the cable PMD in Table 2, although the evaluation is "fair" when the thickness of the sheath is 20 μm, 15 μm, the evaluation is "good" when the thickness of the sheath is 10 μm, 5 μm. When the sheath and the flat portions of the sheath are thin, the optical fiber ribbon is easily deflected or easily bent and hence, the optical fibers are not separated and the optical fiber ribbon can be easily formed into a loose coil state and, further, the optical fiber ribbon can easily conform to the curve of the slot grooves of the cable. Further, when the sheath is formed thin, it is considered that the curing shrinking stress at the time of integrating the optical fibers can be decreased and hence, the PMD can be improved. To take the PMD of the optical fibers into consideration, the relationship $T \leq d+20$ μm is favorable.

Figure 3:
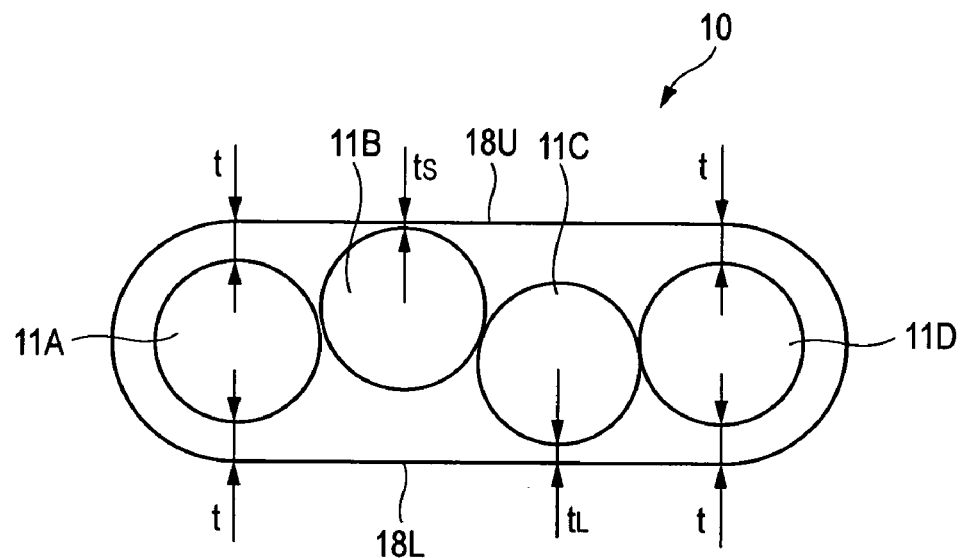
FIG. 3 is a cross-sectional view showing a state in which respective optical fibers of an optical fiber ribbon are not neatly arranged.

In manufacturing the optical fiber ribbon, as shown in FIG. 3, there may be a case that the respective optical fibers 11A, 11B, 11C, 11D are not aligned on the same plane. In the drawing, the sheath 12 has the desired thickness t at the optical fibers 11A, 11D, while the optical fiber 11B, 11C are offset and hence, the sheath does not have the desired thickness at the optical fiber 11B, 11C. The sheath 12 at the optical fiber 11B is thinner than the desired thickness at the upper flat portion 18U and thicker than the desired thickness at the lower flat portion 18L. On the other hand, with respect to the optical fiber 11C, the sheath 12 is made thicker at the upper flat portion 18U and thinner at the lower flat portion 18L. In such an optical fiber ribbon, in regions thereof where the desired thickness of the sheath is not obtained, it is favorable that a ratio between the maximum value and the minimum value, that is, the maximum value/minimum value of the thickness of the sheath at the thinner side is equal to or less than 3.

That is, in the optical fiber ribbon shown in FIG. 3, the thickness tL of the thinner sheath of the lower flat portion 18L of the optical fiber 11C has the maximum value and the thickness tS of the thinner sheath of the upper flat portion 18U of the optical fiber 11B has the minimum value, wherein the relationship tL/tS≦3 is established. Provided that the relationship tL/tS≦3 is established, the irregularity (anisotropy of stress) of the sheath which becomes a cause of the deterioration of the PMD can be prevented. Although the optical fiber ribbon shown in FIG. 3 uses the four optical fibers, it is not limited to this number. That is, with respect to the optical fiber ribbon using a multiplicity of optical fibers, when the thickness of the sheath is offset from the desired thickness, the maximum value and the minimum value of the thickness of the thinner-side sheath are respectively obtained. If the ratio between the maximum value and the minimum value of the thickness of the thinner-side sheath is equal to or less than 3, the optical fiber ribbon can be used properly.

At the time of manufacturing the optical fiber ribbon, curing shrinking is generated when the sheath is cured. There is a tendency that the stress acting on the optical fibers due to this curing shrinking is increased corresponding to the increase of the Young's modulus of the sheath. Further, when a strain is generated in the glass fiber of the optical fiber, the PMD is likely to be increased and an amount of increase of the PMD depends on a magnitude of the stress which reaches to the glass fiber through a coating layer (a color layer, a protective layer or the like) of the glass fiber. Accordingly, by setting a ratio between a product of Young's modulus and a cross-sectional area of the sheath and a product of Young's modulus and a cross-sectional area of the optical fiber (referred to as ES product ratio) to a value within a desired range or to a value equal to or less than a desired value, the PMD can be decreased.

ribbon thickness indicates the maximum thickness of the optical fiber ribbon. The ES product ratio is a ratio between the product of Young's modulus E and the cross-sectional area S of the sheath (resin) 12 and the sum of products of the Young's moduli E and the cross-sectional areas S of the respective optical fibers 11.

Figure 4:
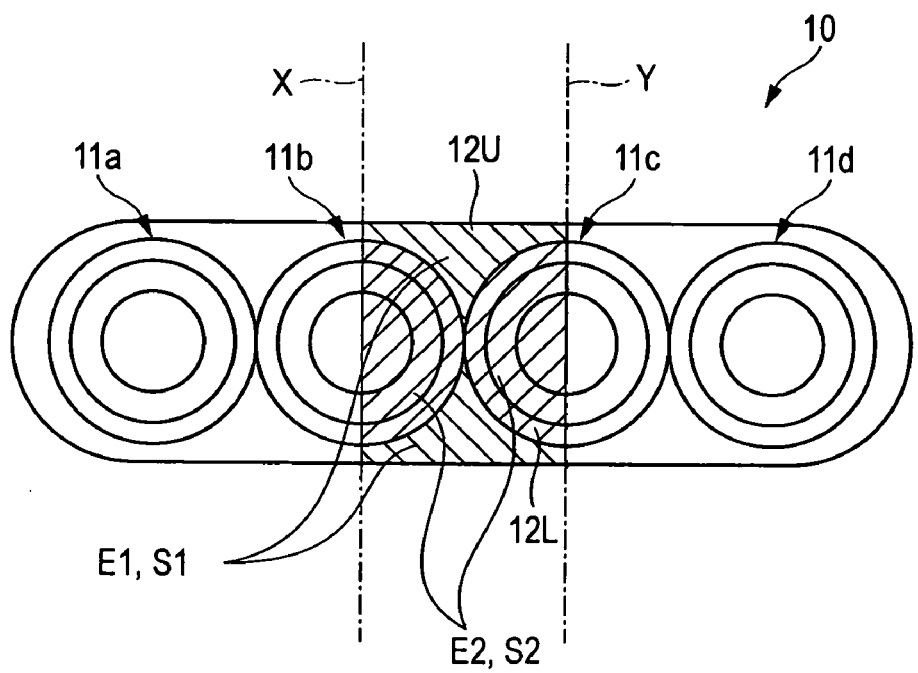
FIG. 4 is an explanatory view for explaining Young's modulus and a cross-sectional area of a sheath of an optical fiber ribbon and an optical fiber.

That is, as shown in FIG. 4, in the transverse cross section of the optical fiber ribbon 10, in an inner region which is defined by two straight lines (for example, dotted lines X, Y shown in FIG. 4) which are orthogonal to a straight line which connects the respective centers of the two neighboring optical fibers 11b, 11c and pass through the respective centers of these two optical fibers 11b, 11c, assuming the cross-sectional areas of the sheaths 12U, 12L as S1, the Young's modulus of these sheath as E1, the sum of the cross-sectional areas of the optical fibers 11b, 11c as S2, and the Young's modulus of the optical fibers 11b, 11c as E2, the ES product ratio can be obtained by an equation ES product ratio=(E1×S1)/(E2×S2). Here, the ES product (E2×S2) of the optical fibers 11b, 11c means the sum of the ES products of the respective materials which constitute the optical fibers. That is, the ES product of the optical fiber 11 shown in FIG. 1 means the sum of the ES products of respective Young's moduli and cross-sectional areas of the core 13a, the clad 13b, the protective film 14 and the color layer 15 which constitute the optical fiber 11.

The optical fiber which is used for the example shown in Table 3 is constituted by applying the first and the second protective coatings to a glass fiber made of a core clad and further by applying the color coating to the outer periphery of the second protective coating. With respect to the Young's modulus of this optical fiber, the Young's modulus of the glass fiber is 73000 (MPa), the Young's modulus of the primary protective coating 1 is 1 (MPa), the Young's modulus of the secondary protective coating is 700 (MPa), and the Young's modulus of the color coating is 1500 (MPa).

With respect to the evaluations of the loose coil PMD in Table 3, "very good" indicates that the polarized mode dispersion (PMD) is equal to or less than 0.05 (ps/km$^{1/2}$), "good" indicates that the polarized mode dispersion (PMD) falls in a range of 0.05 PMD≦0.1 (ps/km$^{1/2}$) and "fair"

TABLE 3

| glass diameter (μm) | 125 | 125 | 125 | 125 | 125 | 80 | 80 | 80 | 80 |
|---|---|---|---|---|---|---|---|---|---|
| outer diameter (μm) | 250 | 250 | 250 | 250 | 250 | 125 | 125 | 125 | 125 |
| ribbon thickness (μm) | 290 | 275 | 270 | 290 | 275 | 165 | 165 | 150 | 145 |
| Young's modulus of sheath (MPa) | 900 | 900 | 900 | 1200 | 1200 | 900 | 1200 | 1200 | 1200 |
| ES product ratio | 0.023 | 0.019 | 0.018 | 0.031 | 0.026 | 0.02 | 0.027 | 0.021 | 0.019 |
| loose coil PMD | good | very good | very good | fair | good | very good | good | good | very good |

Table 3 shows the relationship between the ES product ratio and the loose coil PMD with respect to the optical fiber ribbon using the optical fibers having the diameter of 250 μm and 125 μm. The glass diameter in Table 3 indicates the outer diameter of the glass fiber portion, the outer diameter indicates the outer diameter of the optical fiber, and the indicates that the polarized mode dispersion PMD) falls in a range of 0.1≦PMD≦0.2 (ps/km$^{1/2}$). When the ES product ratio is 0.031, the evaluation of the loose coil PMD is "fair". So long as the ES product ratio falls within a range of 0.026 to 0.021, the evaluation is "good" and when the ES product ratio becomes equal to or less than 0.020, the evaluation is "very good". In the optical fiber ribbon according to the present invention, when the ES product ratio is equal to or less than 0.026, a favorable result that the loose coil PMD is equal to or less than 0.1 (ps/km$^{1/2}$) is obtained. Further, when the ES product ratio is equal to or less than 0.020, the more favorable result that the loose coil PMD is 0.05 (ps/km$^{1/2}$) is obtained. With respect to the optical fiber having the outer diameter of 250 µm, provided that the relationship T≦d+25 µm is established, the ES product ratio becomes equal to or less than 0.019 and hence, the loose coil PMD becomes extremely favorable. Further, with respect to the optical fiber having the outer diameter of 125 µm, provided that the relationship T≦d+25 µm is established, the ES product ratio becomes equal to or less than 0.021 and hence, the loose coil PMD becomes favorable. Further, by using the optical fiber having the sheath whose Young's modulus is equal to or more than 200 MPa, the respective optical fiber ribbons are not separated into respective optical fibers and hence, the sheath thickness can be reduced. Further, when the sheath thickness can be reduced, the sheath can be easily peeled off and hence, the live-line branching can be easily performed. Further, the optical fiber ribbon can be easily bent and hence, the loose coil PMD is enhanced. When the optical fiber ribbon has a multi-layered (n layers) sheath, as the E1×S1 of the optical fiber ribbon, a sum of ES product ratios of the respective layers can be used.

In the optical fiber ribbon according to the present invention, it is favorable that the mode field diameter (MFD) according to the definition of Petermann-I at the wavelength of 1.55 µm of the optical fiber is equal to or less than 10 µm and it is more favorable that the MFD is 8 µm. With such a small MFD, the macrobend loss of the optical fiber can be suppressed. Further, the sheath of the optical fiber ribbon is thin and is easily bendable (easily deflectable) and hence, when the side pressure is applied to the optical fiber ribbon, the increase of the macrobend loss due to the side pressure can be suppressed.

At the same time, it is favorable that the cable cut-off wavelength of the glass fiber of the optical fiber is equal to or less than 1.26 µm. The cable cut-off wavelength indicates a cut-off wavelength of LP$_{11}$ mode at 22 m length and is a value smaller than a 2 m cut-off wavelength.

Further, in the optical fiber ribbon according to the present invention, the adhesive strength between the optical fiber and the sheath sometimes affects the increase of the transmission loss and the live-line operation efficiency at the time of performing the live-line branching. With respect to the adhesive strength of the optical fiber 11 and the sheath 12, to take the prevention of the increase of the transmission loss and the branching operability into consideration, it is favorable that the adhesive strength per one optical fiber falls within a range 0.245 (mN) to 2.45 (mN). When the above-mentioned adhesive strength is smaller than the above-mentioned range, there may arise a case that the sheath 12 is ruptured at the time of being formed into a cable and the optical fibers 11 are separated from each other. On the other hand, when the adhesive strength is larger than the above-mentioned range, the branching property is deteriorated.

Figure 5:
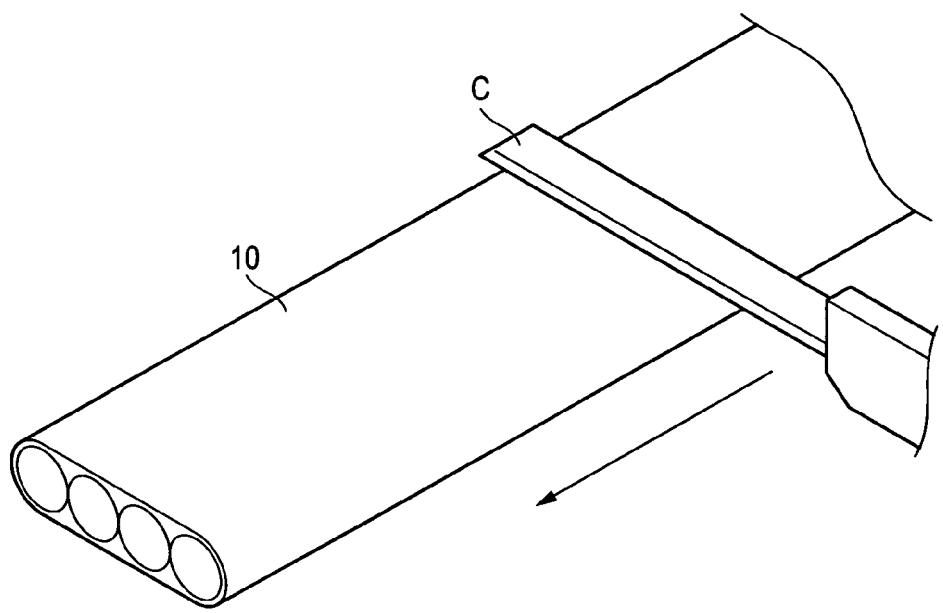
FIG. 5 is an explanatory view for explaining a method of measuring an adhesive strength between an optical fiber and a sheath.
Figure 6:
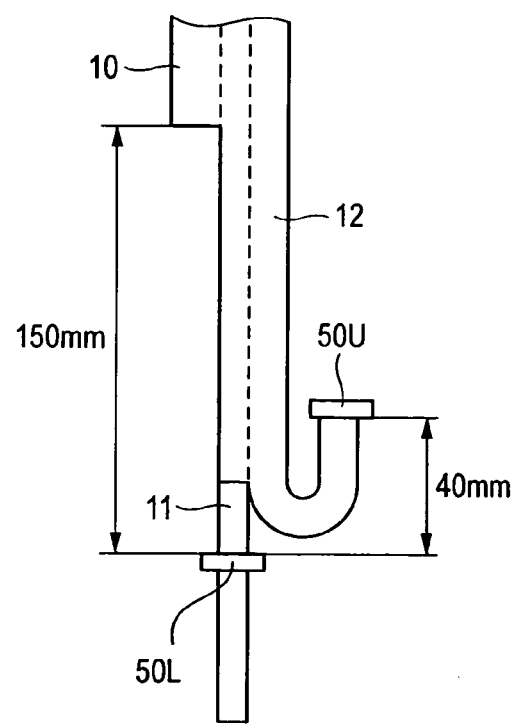
FIG. 6 is an explanatory view for explaining the method of measuring the adhesive strength between the optical fiber and the sheath.

The adhesive strength between the optical fibers and the sheath can be measured by a following method. As shown in FIG. 5, a blade C of a retractable knife is brought into contact with one side of the optical fiber ribbon 10 and the blade cuts into the optical fiber ribbon 10 until the blade reaches an interface between the optical fibers and the sheath. By moving the blade in the longitudinal direction toward an end portion of the optical fiber ribbon 10, the sheath at one side of the ribbon is peeled off. The sheath 12 at the opposite side of the end portion of the optical fiber ribbon 10 is peeled off and is folded back using a hand. As shown in FIG. 6, the optical fiber 11 whose sheath is peeled off is held by a lower chuck 50L and a distal end of the sheath 12 which is folded back is clamped by an upper chuck 50U. The distance between the upper and the lower chucks 50L, 50U is set to approximately 40 mm. The upper chuck 50U and the lower chuck 50L are moved in directions which make a relative angle of 180 degree therebetween at a speed of 200 mm/minute by 50 mm and hence, the sheath 12 is peeled off.

Four values in total consisting of a maximum value, a minimum value, a second maximum value and a second minimum value are sampled from measured values, an average value thereof is obtained and, then, a value obtained by dividing the average value by the number of optical fibers included in the optical fiber ribbon is used as the adhesive strength per an optical fiber ribbon.

In the optical fiber ribbon 10 according to the present invention, when a main object of the invention lies in that the optical fibers 11 keep the integrity without being separated from each other, it is favorable that the thickness of the sheath is equal to or more than 0.5 µm. In this case, the maximum thickness T of the optical fiber ribbon 10 becomes T≧outer diameter of the optical fiber d+1 (µm).

Also depending on the properties of the sheath 12 of the optical fiber ribbon 10, in some cases, these properties affect the increase of the transmission loss and the branching operation efficiency at the live-line branching. It is preferable that the yield point stress, as the property of material of the sheath, falls within a range of 20 MPa to 45 Mpa. This is because that the branching operation can be performed easily and the transmission loss at the time of performing the live-line branching can be suppressed. In accordance with JIS K7113, the yield point stress is measured with respect to a No. 2 test piece at a tension speed of 50 mm/minute. When the yield point stress is less than 20 MPa, there arises a case in which the respective optical fibers are separated by an external force which is applied to the optical fibers during a step of assembling the optical fiber ribbons to form a cable and hence, the cable cannot be formed. On the other hand, when the yield point stress exceeds 45 MPa, it is difficult to rupture the sheath and hence, the intermediate post blanching of the optical fiber ribbon is hard to perform. The yield point stress can be adjusted by changing the material of the sheath. When an ultraviolet ray curable resin is used as the sheath material, by increasing the oligomer concentration and by increasing the urethane group concentration or the double bond concentration, the yield point stress is increased. Further, as the sheath material, a monomer which includes a polar group such as N-vinyl-pyrrolidone, N-vinyl-caprolactum or the like also can be used.

The Young's modulus E can be measured in the following manner. First, a sheet is prepared by using a resin which forms the sheath 12. Then, by using a test piece which is formed into a JIS No. 2 dumbbell defined in JIS K7113, the sheet is pulled under the condition that the distance between gage marks is 25 mm and the tension speed is 1 mm/min. Here, the tension secant elastic modulus is calculated based on the tension strength at the time of 2.5% elongation.

According to the experiment, it is understood that, when the Young's modulus of the sheath 12 exceeds 1200 MPa, the sheath 12 is too hard, while when the thickness of the sheath 12 is large, the branching property of the optical fiber 11 is deteriorated. On the other hand, when the Young's modulus of the sheath 12 is equal to or less than 200 MPa, the sheath 12 is too soft and is broken during a next step of manufacturing of cables and hence, the integrated state cannot be maintained. Accordingly, it is favorable that the Young's modulus of the sheath 12 is set to equal to or less than 1200 MPa and more than 200 MPa.

Further, the branching and integration also relate to the rupture elongation of the resin which forms the sheath 12. When the elongation is equal to or less than 60%, the optical fibers 11 can be easily branched. However, when the elongation is equal to or less than 10%, the optical fibers are cracked during the next process of manufacturing the cable and hence, the integration state cannot be maintained. Accordingly, it is favorable that the rupture elongation is equal to or less than 60% and more than 10%.

Further, the tension rupture elongation can be measured in the following manner. First, a sheet is prepared by using a resin which forms the sheath 12. Then, a tension rupture elongation ratio (%) is obtained based on the elongation ratio of the JIS NO.2 test piece which is defined in JIS K7113 when the test piece is ruptured by tension under the condition that the tension speed is 50 mm/min.

To prepare the blending of the ultraviolet ray curable resin having the above-mentioned Young's modulus, the Young's modulus can be increased by reducing a molecular weight of the oligomer or by increasing an addition amount of bifunctional monomer such as ethylene oxide modified bisphenol A diacrylate or the like.

Further, in performing the blending of the resin to make the resin have the above-mentioned rupture elongation, it is possible to increase the rupture elongation by increasing a molecular weight in diol in the oligomer molecules such as PTMG or the like or by reducing an addition amount of bifunctional monomer such as ethylene oxide modified bisphenol A diacrylate or the like.

Even when such conditions are satisfied, when the transmission loss at the time of branching the optical fibers 11 is large, the optical fiber cable is not suitable as a product. That is, when the increase of the transmission loss at the time of branching becomes larger than 1.0 dB, there is a possibility that the communication is interrupted. Accordingly, the optical fiber ribbon whose increase of transmission loss at the time of branching is equal to or less than 1.0 dB is the optical fiber ribbon which can be served for live-line branching and hence is preferable. It is more preferable that the transmission loss at the time of branching is equal to or less than 0.5 dB.

Here, the measurement of the transmission loss at the time of branching the optical fiber 11 is performed as follows, for example. One end face of the optical fiber ribbon 10 is connected to a light source and the other end face of the optical fiber ribbon 10 is connected to a light receiver. Then, light having a wavelength of 1.55 μm which is emitted from a light source is incident on the optical fibers 11 and power (for example, waveforms converted into voltage) received by the receiver is monitored. When the loss is generated due to the disturbance generated by branching, the power is attenuated and hence, the transmission loss can be calculated based on this attenuation amount.

Further, with respect to the glass fiber 13 of the optical fiber 11, the macrobend loss at the bending diameter of 15 mm at a wavelength of 1.55 μm is set to a value equal to or less than 0.1 dB/turn. The macrobend loss is obtained by dividing the difference in transmission loss before and after winding the optical fiber around a metal rod or the like by ten and some turns by the number of turns.

As described above, the optical fiber ribbon 10 of the present invention has an advantage that the polarization mode dispersion (PMD) in a loose coil state becomes equal to or less than $0.2 \text{ ps/km}^{1/2}$. Further, the optical fiber ribbon 10 of the present invention also has an advantage that the PMD of the optical fibers which constitute the optical fiber ribbon become $0.2 \text{ ps/km}^{1/2}$ after the optical fiber ribbon is formed into a cable. Since the sheaths 12, 12A which cover the optical fibers 11, 11A are thin and hence, the optical fiber ribbon is easily bendable. Accordingly, even when the optical fiber ribbon is formed in a loose coil state, no excessive external force is applied and the PMD can be reduced. Since the PMD affects the long-distance transmission, the optical fiber ribbon exhibiting the small PMD can perform the long-distance transmission. It is more preferable that the polarization mode dispersion (PMD) in a loose coil state is equal to or less than $0.1 \text{ ps/km}^{1/2}$.

On the other hand, with respect to the related-art tape ribbon structure, usually, all of the optical fibers are covered with coating of a sheath having a thickness of 25 to 40 μm it is considered that at the time of curing of the coating, a strain which is generated due to a stress or the like attributed to the curing shrinking remains in the optical fibers and hence, the polarization mode dispersion is increased.

Here, as the method of measuring the polarization mode dispersion (PMD) after forming the optical ribbon into a cable, a reference testing method (RTM) and an alternative testing method (ATM) can be named. As the RTM, the Jones-Matrix (JME) method and the Poincare sphere (PS) method can be named. On the other hand, as the ATM, the polarized state (SOP) method, the interference method, a fixed analyzer (FA) method and the like can be named. The polarization mode dispersion of the optical fibers of the optical fiber ribbon is measures using the above-mentioned methods in a loose coil state, wherein it is preferable that the maximum value is equal to or less than $0.2 \text{ ps/km}^{1/2}$ and it is more preferable that the maximum value is equal to or less than $0.1 \text{ ps/km}^{1/2}$.

Next, the method of manufacturing the optical fiber ribbon according to the present invention is explained.

Figure 7:
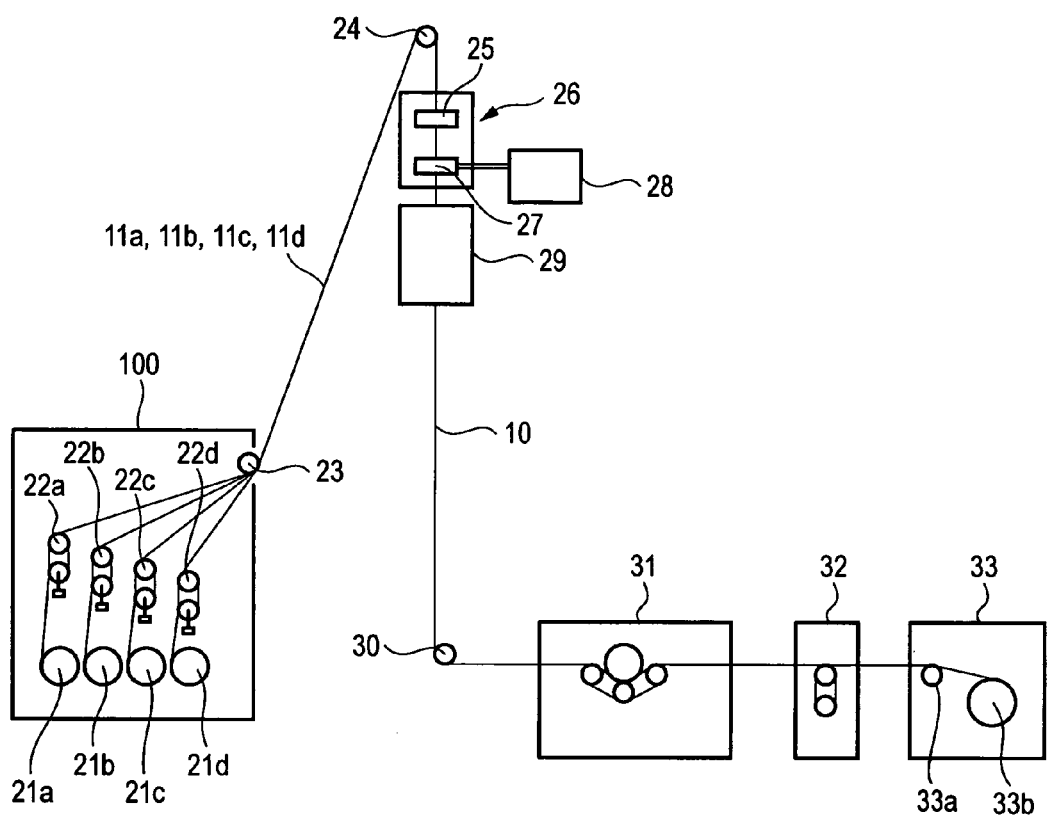
FIG. 7 is an explanatory view showing a method of manufacturing an optical fiber ribbon according to the first embodiment of the present invention.

FIG. 7 is an explanatory view showing the method of manufacturing the optical fiber ribbon 10 according to the present invention. In the inside of a supply device 100, reels 21a to 21d, dancer rollers 22a to 22d and a guide roller 23 are disposed. Optical fibers 11a, 11b, 11c, 11d are respectively wound around the reels 21a, 21b, 21c, 21d. These optical fibers correspond to the optical fibers 11 which are explained in conjunction with the optical fiber ribbon shown in FIG. 1. Here, although the explanation is made with respect to an example which manufactures the optical fiber ribbon using four optical fibers, the number of the optical fibers is not limited.

The optical fibers 11a, 11b, 11c, 11d are respectively paid off from the reels 21a, 21b, 21c, 21d and a tension of ten and some gf are applied to the optical fibers 11a, 11b, 11c, 11d by the dancer rollers 22a, 22b, 22c, 22d. When the optical fibers 11a, 11b, 11c, 11d pass over the guide roller 23, the optical fibers 11a, 11b, 11c, 11d are arranged on one arrangement row surface. Further, the optical fibers 11a, 11b, 11c, 11d are further assembled by an overhead guide roller 24 and are fed to a coating device 26. The coating device 26 includes a nipple 25 and a die 27. The optical fibers 11a to 11d which are fed to the coating device 26 are guided by the nipple 25.

Figure 8:
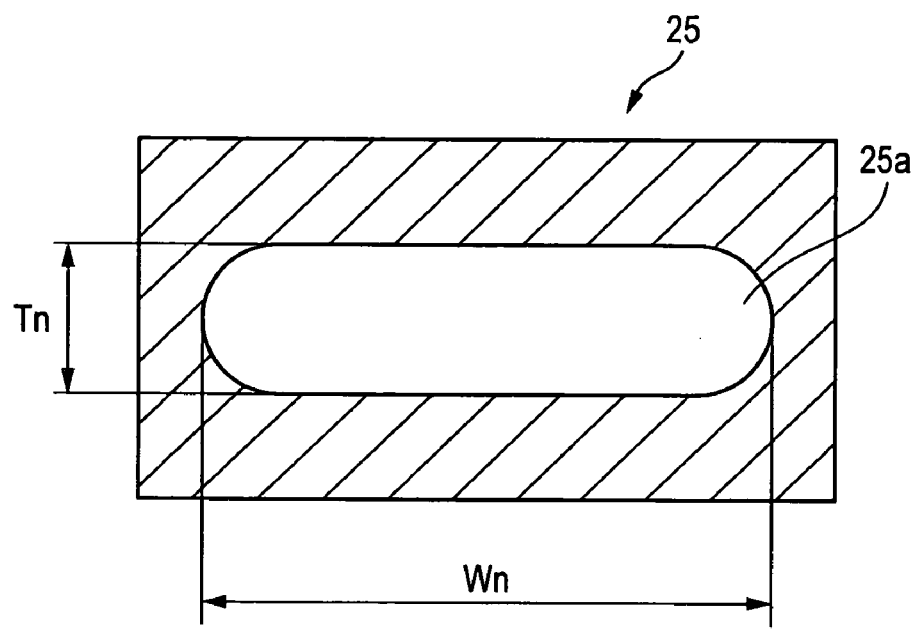
FIG. 8 is a cross-sectional view of a nipple.

As shown in FIG. 8, the nipple 25 has an oblong line exit opening 25a. With respect to sizes of the line exit opening 25a, it is preferable that, assuming the number of the optical fibers 11 as N (here four), a width Wn and a thickness Tn are respectively expressed by following formulae.

$Wn$=outer diameter of optical fiber×$N$+0.03 to 0.08 mm

When the optical fibers are arranged such that they are brought into contact with each other, it is preferable to set such that Wn=outer diameter of optical fiber×N+0.03 to 0.05 mm.

It is preferable to set the thickness Tn such that the thickness is expressed by the formula that Tn=outer diameter of optical fiber+0.005 to 0.01 mm.

In the coating device 26, a die 27 shown in FIG. 9 is disposed. The die 27 is provided with an oblong hole 27a through which four respective optical fibers 11a, 11b, 11c, 11d pass.

It is preferable that a height H of the hole 27a of the die 27 is set such that H=outer diameter of optical fiber+0.005 to 0.05 mm. Further, a widgth Wd of the hole 27a of the die 27 is set such that Wd=H×N. Here, since the die 27 is exclusively manufactured by wire electric discharge machining, H becomes large than at least the wire diameter. H is approximately 0.05 to 0.08 at a minimum. Further, to prevent the hole 27a of the die 27 from damaging the optical fibers 11 even when the optical fibers 11 are brought into contact with the hole 27a, a smooth curved shape such as R (a round shape), for example, is imparted to peripheral portions and corner portions of the hole 27a of the die 27. The sizes of the hole 27a of the die 27 are designed corresponding to the outer diameter of the optical fiber and the thickness of the sheath. Assuming the maximum thickness of the optical fiber ribbon as T, it is possible to manufacture the optical fiber ribbon having the thickness T which takes values such as T≦d+40 (μm), T≦d+20 (μm). In the die 27 shown in FIG. 9, when the hole 27a is formed of arcuate portions 50a and straight line portions 50b, a resin can be uniformly applied to the straight line portions 50b and hence, the change of thickness of the optical fiber ribbon and the coating of the resin are not interrupted. Accordingly, it is preferable to adopt such a constitution. Since the sheath of the optical fiber ribbon according to the present invention has a small thickness and hence, a gap between the optical fibers and the die is small. To prevent the interruption of the resin or to set the ribbon thickness to a fixed value, it is preferable that the viscosity of the resin at the coating temperature falls in a range of 1000 Pa·s to 20000 Pa·s.

Four optical fibers 11a, 11b, 11c, 11d are arranged in parallel on one planar face in a state that they are brought into contact with each other at a point of time that the optical fibers 11a, 11b, 11c, 11d reach the coating device 26, wherein an ultraviolet ray curable resin is applied to the periphery of the optical fibers 11a, 11b, 11c, 11d. The ultraviolet ray curable resin is supplied from a pressurized resin tank 28. To four optical fibers 11a, 11b, 11c, 11d to which the ultraviolet ray curable resin is applied, ultraviolet rays are irradiated by an ultraviolet ray irradiation device 29 so as to cure the ultraviolet ray curable resin. The cured ultraviolet ray curable resin forms the sheath 12 and hence, 4-fibered optical fiber ribbon 10 can be formed.

The optical fiber ribbon 10 which is cured by the irradiation of the ultraviolet rays from the ultraviolet ray irradiation device 29 is fed to a winding device 33 by way of a guide roller 30, a pay-off capstan 31,and a winding tension control dancer roller 32. In the winding device 33, the optical fiber ribbon 10 is wound around a reel 33b by way of a guide 33a. A winding tension of the whole optical fiber ribbon is set to several tens gf to several hundreds gf.

As described above, according to the method of manufacturing optical fiber ribbon, four optical fibers 11a, 11b, 11c, 11d are arranged in parallel in a state that they are brought into contact with each other, and the sheath 12 is formed on the outside of the optical fibers 11a, 11b, 11c, 11d so as to integrate them. Since the maximum value of the thickness of the optical fiber ribbon can be set to a value which falls in a range from the diameter of the optical fibers to a value which is 40 m larger than the diameter of the optical fiber ribbon, the respective optical fibers 11 can be easily branched (live-line branching).

The optical fiber ribbon and the manufacturing method of the same according to the present invention are not limited to the above-mentioned embodiments and proper modifications and improvements can be made.

Figure 10:
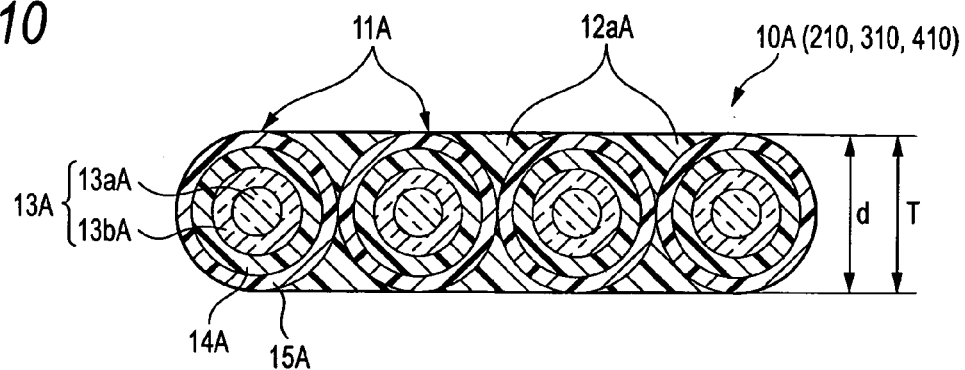
FIG. 10 is a cross-sectional view of another optical fiber ribbon according to the first embodiment of the present invention.

A modification of the optical fiber ribbon according to the first embodiment of the present invention is shown in FIG. 10. In an optical fiber ribbon 10A shown in FIG. 10, the neighboring optical fibers 11A are integrally formed over the whole length using a resin 12aA. The resin 12aA is formed such that the resin 12aA fills the indentation between the optical fibers 11A and adheres the neighboring optical fibers 11A together. Further, a maximum thickness of the optical fiber ribbon 10A is set such that the thickness does not exceed the outer diameter d of the optical fibers 11A. To this end, the maximum thickness T of the optical fiber ribbon 10A is set equal to the outer diameter d of the optical fibers 11A.

Next, an optical fiber ribbon and a manufacturing method thereof according to the second embodiment of the present invention are explained in detail in conjunction with attached drawings.

Figure 11A:
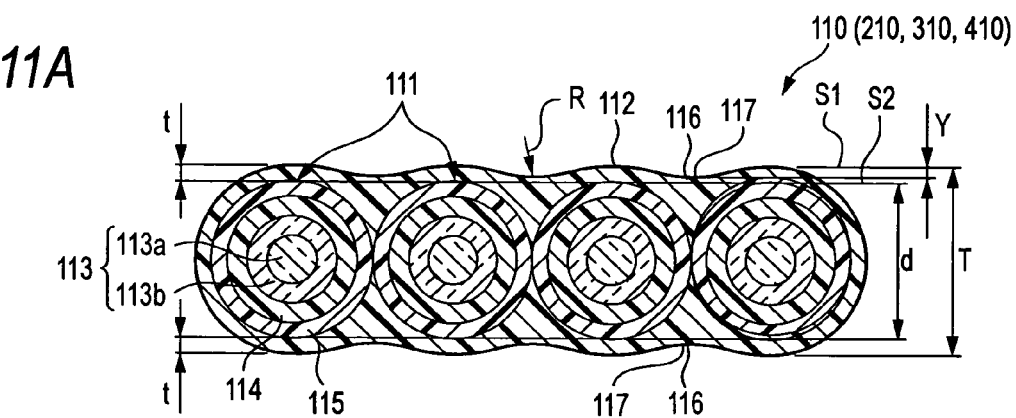
FIG. 11A is a cross-sectional view of an optical fiber ribbon according to a second embodiment of the present invention.
Figure 11B:
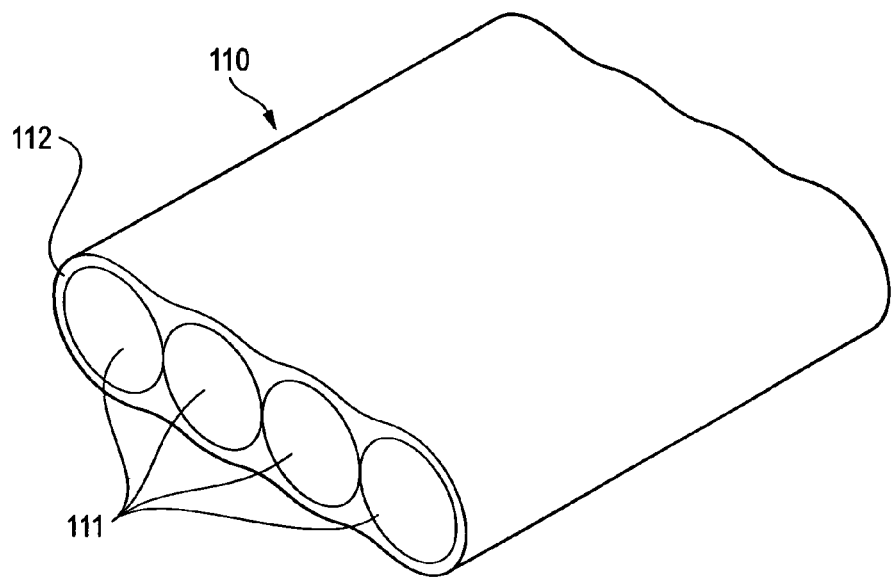
FIG. 11B is a perspective view of an optical fiber ribbon according to the second embodiment of the present invention.

FIG. 11A is a cross-section al view showing a second embodiment of the optical fiber ribbon according to the present invention and FIG. 11B is a perspective view of the optical fiber ribbon. The optical fiber ribbon 110 is formed by arranging a plurality of (four pieces as an example in this embodiment) optical fibers 111 in parallel and applying a sheath 112 over the whole outer periphery of these optical fibers 111 arranged in parallel and over the entire length of the optical fibers 111. In the optical fiber ribbon according to the present invention, as shown in FIG. 11A, the optical fibers are brought into contact with each other. Here, "brought into contact with" includes a case in which there exists an interval between neighboring optical fibers of the optical fiber ribbon of equal to or less than 10 μm as a manufacturing error. To compare a case in which the optical fibers included in the optical fiber ribbon are brought into contact with each other and a case in which the optical fibers included in the optical fiber ribbon are not brought into contact with each other, the optical fiber ribbon can be easily branched when the optical fibers are brought into contact with each other. Even when the optical fibers are not brought into contact with each other, so long as the interval between the neighboring optical fibers of the optical fiber ribbon is equal to or less than 10 μm, an amount of resin which forms the sheath and intrudes between the optical fibers is small and hence, branching can be performed easily. The optical fiber 111 is constituted of a glass fiber 113 which consists of core 113a and a clad 113b, a protective coating 14 which covers an outer periphery of the glass fiber 13, and a color layer which covers an outer periphery 115 of the protective coating 114. Further, the outer periphery 115 may constitute a secondary protective film and the color layer having a thickness of approximately 1 μm to 10 μm may be formed on the outer periphery 115. Further, thin film-like carbon layer may be formed on the periphery of the glass fiber 113 by coating. Here, it is preferable that the optical fiber 111 conforms to G652 prescribed in ITU-T (International Telecommunication Union—Telecommunication standardization sector).

As the glass fiber 113 which can be used in the present invention, a glass fiber having any distribution of refractive index can be used including a glass fiber which is formed of a core and a multi-layered clad. Further, as the optical fiber 111, an optical fiber which is formed by covering an outer periphery of the glass fiber 113 with the protective coating 114 may be used.

In this optical fiber ribbon 110, an ultraviolet ray curable resin is applied to the outer peripheries of four optical fibers 111 arranged in parallel as the sheath 112. As the material of the sheath 112, a thermoplastic resin, a thermosetting resin or the like can be used besides the ultraviolet ray curable resin.

In the sheath 112 which covers the optical fibers 111, recessed portions 116 are formed in the sheath 12 in conformity with indentations formed between the neighboring optical fibers 111, 111.

The recessed portions 116 formed in the sheath 112 are effective at the time of branching the optical fibers 111 by peeling off the sheath 112 from the optical fiber ribbon 110. At the time of performing the branching operation of the optical fibers 111, cracks or peeling-off are generated in the sheath 12 by a manual operation of an operator or a branching tool and hence, the sheath 112 can be easily peeled off.

To take the achievement of the favorable branching operability and the suppression of increase of transmission loss at the time of live-line branching into consideration, it has been confirmed that in the optical fiber ribbon according to the present invention, there exists a fixed range with respect to the thickness of the sheath.

Table 4 shows the relationship among an outer diameter d of the optical fiber, a maximum thickness T of the optical fiber ribbon, a thickness t of the sheath and a depth Y of the recessed portion of the sheath. The table is served for exhibiting the branching property, loose coil PMD and cable PMD of the optical fiber ribbon. Here, the thickness t of the sheath is a wall thickness of the sheath outside the common tangent of respective optical fibers of the optical fiber ribbon.

tangent S1 of the sheath 112 and the common tangent S2 of the optical fibers 111 and can be obtained by a formula t=(T−d)/2. The depth of the recessed portions of the sheath is a length Y between the common tangent S1 of the sheath 112 and bottoms 117 of the recessed portions 116 of the sheath 112. The outer diameter of the optical fibers of the optical fiber ribbon shown in Table 4 is 250 μm.

Branching property shown in Table 4 indicates the easiness of branching at the time of branching an intermediate portion of the optical fiber ribbon into respective optical fibers while suppressing the increase of transmission loss to 1.0 dB or less. "very good" indicates that the branching can be performed within two minutes, "good" indicates that the branching can be performed in a time exceeding two minutes and within three minutes, and "fair" indicates that the branching can be performed in a time exceeding three minutes and within 5 minutes. The fact that the increase of the transmission loss at the time of branching is equal to or less than 1.0 dB means that the live-line branching can be performed.

The optical fiber ribbon shown in Table 4 exhibits the relationship T≦d+40 (μm) and hence, all of optical fiber ribbons exhibit the branching property superior to "fair", wherein the intermediate post blanching can be performed within five minutes by setting the increase of the transmission loss at the time of branching to equal to or less than 1.0 dB. That is, the live line branching can be performed within 5 minutes. With respect to the related-art optical fiber ribbon, the increment of the transmission loss at the time of branching exceeds 1.0 dB or the related-art optical fiber ribbon requires a given time which exceeds five minutes even when the optical fibers can be separated and hence, the live-line branching cannot be performed from a realistic point of view.

Figure 12A:
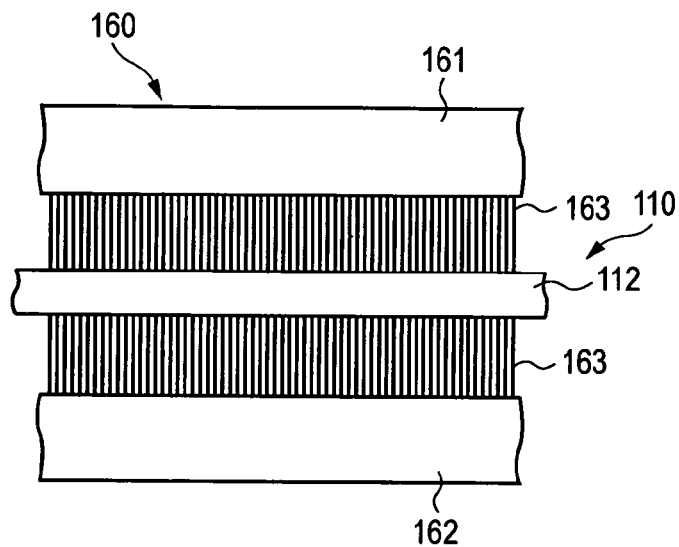
FIG. 12A to FIG. 12C are schematic views showing a method of branching an optical fiber ribbon according to the second embodiment of the present invention.

With respect to the above-mentioned live-line branching, one example of the branching method is explained. As shown in FIG. 12A, the optical fiber ribbon 110 is sandwiched between an upper base 161 and a lower base 162 of a branching tool 160, wherein wire rods 163 which are formed on these upper and lower bases 161, 162 in an

TABLE 4

| fiber diameter d (μm) | ribbon thickness T (μm) | sheath thickness t (μm) | depth of recessed portion of sheath Y (μm) | ratio (T − d)/2Y | ribbon thickness at recessed portion g (μm) | ratio g/d | branching property | loose coil PMD | cable PMD |
|---|---|---|---|---|---|---|---|---|---|
| 250 | 290 | 20.0 | 1 | 20.00 | 288 | 1.152 | fair | fair | fair |
| 250 | 290 | 20.0 | 2 | 10.00 | 286 | 1.144 | fair | fair | fair |
| 250 | 290 | 20.0 | 5 | 4.00 | 280 | 1.120 | good | good | fair |
| 250 | 290 | 20.0 | 10 | 2.00 | 270 | 1.080 | good | good | fair |
| 250 | 290 | 20.0 | 20 | 1.00 | 250 | 1.000 | very good | very good | good |
| 250 | 280 | 15.0 | 1 | 15.00 | 278 | 1.112 | good | fair | fair |
| 250 | 280 | 15.0 | 2 | 7.50 | 276 | 1.104 | good | fair | fair |
| 250 | 280 | 15.0 | 5 | 3.00 | 270 | 1.080 | very good | good | fair |
| 250 | 280 | 15.0 | 10 | 1.50 | 260 | 1.040 | very good | good | fair |
| 250 | 270 | 10.0 | 1 | 10.00 | 268 | 1.072 | good | good | good |
| 250 | 270 | 10.0 | 2 | 5.00 | 266 | 1.064 | good | good | good |
| 250 | 270 | 10.0 | 5 | 2.00 | 260 | 1.040 | very good | good | good |
| 250 | 270 | 10.0 | 10 | 1.00 | 250 | 1.000 | very good | very good | good |
| 250 | 260 | 5.0 | 1 | 5.00 | 258 | 1.032 | good | good | good |
| 250 | 260 | 5.0 | 2 | 2.50 | 256 | 1.024 | very good | good | good |
| 250 | 260 | 5.0 | 5 | 1.00 | 250 | 1.000 | very good | very good | good |

Figure 12B:
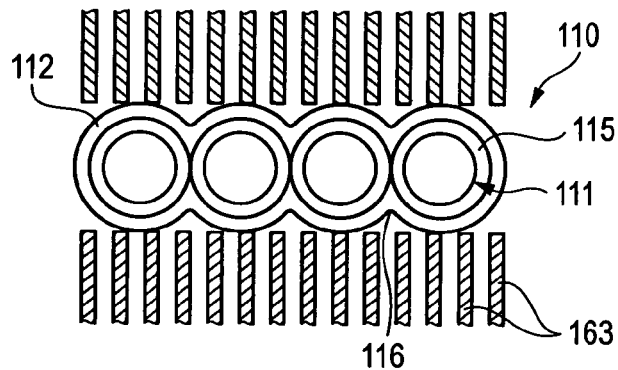
Figure 12C:
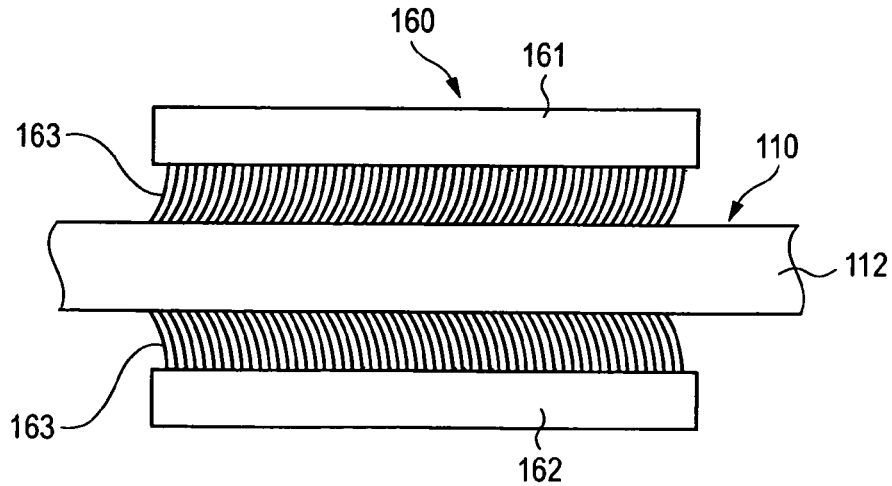

In Table 4, as shown in FIG. 11A, fiber diameter means the outer diameter d of the optical fiber 111, ribbon thickness is the maximum thickness T of the optical fiber ribbon 110, and sheath thickness is a length t between the common erected manner are made to approach the sheath 112 of the optical fiber ribbon 110. FIG. 12B shows the cross section of such a structure. Further, by pressing the branching tool 160 to the optical fiber ribbon 110, as shown in FIG. 12C, the wire rods 163 are deflected and sharp corners of distal ends of the deflected wire rods 163 are strongly brought into contact with the sheath 112 of the optical fiber ribbon 110.

By moving the branching tool 160 relative to the optical fiber ribbon 110 in the longitudinal direction (the left-and-right direction in FIG. 12C) of the optical fiber ribbon 110 in a state that the branching tool 160 is pressed to the optical fiber ribbon 110, that is, by rubbing the optical fiber ribbon 110 with the branching tool 160, flaws are formed on the sheath 112 or the sheath 12 is peeled off by the distal ends of the wire rods 63 and hence, the optical fibers 111 are branched. Either one or both of the branching tool 160 and the optical fiber ribbon 110 may be moved. The wire rods 163 are resilient and hence, when the wire rods 163 are pressed to the sheath 12 of the optical fiber ribbon 110, the wire rods 163 are deflected and the corner portions of the distal ends of the wire rods 163 are brought into contact with the sheath 112. By moving the branching tool 160 or the optical fiber ribbon 110 in such a state, the wire rods 163 (flexible member) impart flaws to the sheath 112 or peel off the sheath 112. By repeating rubbing of the optical fiber ribbon 110 using the branching tool 160, an interface between the color layer 115 of the optical fiber 111 and the sheath 112 is peeled off. When the rubbing is further repeated, portions of the sheath 12 above or below the center axes of the optical fiber 11 are shaved off and cracks are generated and thereafter, the cracks are developed to the recessed portions 116 of the sheath 112 by the stress concentration and hence, the sheath 112 are peeled off. In this manner, the sheath 112 of the optical fiber ribbon 110 is ruptured and the optical fiber ribbon 110 is branched into the respective optical fibers.

By adjusting the power by which the resilient materials 163 is pressed to the optical fiber ribbon 110, a change amount of transmission loss of optical signals at the time of branching becomes equal to or less than 1.0. Further, depending on the manner of branching, such a change amount of transmission loss can be reduced to a value equal to or less than 0.5 dB. Accordingly, even when the optical fiber ribbon includes live lines, the optical fiber ribbon can be branched without cutting the live lines even in a moment.

To review the branching property of the optical fiber ribbons shown in FIG. 4, the smaller the thickness of the sheath, it is possible to have the better branching property even when the depth of the recessed portions of the sheath is small. Although in case the thickness t of the sheath is 20 μm, when the depth Y of the recessed portions of the sheath is 20 μm the evaluation of the branching property is "very good". On the other hand, in case the thickness of the sheath t is equal to or less than 15 μm when the depth Y of the recessed portions of the sheath is equal to or more than 5 μm, the evaluation of the branching property is "very good". Accordingly, provided that the thickness t of the sheath is equal to or less than 15 μm, even when the depth of the recessed portions of the sheath 12 is shallow, it is possible to obtain the extremely favorable branching property. In other words, when the maximum thickness T of the optical fiber ribbon is T≦d+30, provided that the shallow recessed portions exist, it is possible to have the extremely excellent branching property.

When the ribbon thickness is 290 μm, provided that the value of the ratio (T−d)/2Y between the sheath thickness ((T−d)/2 and the depth of the recessed portion Y of the sheath is equal to or less than 4, the evaluation of the branching property becomes "very good" or "good" and hence, the branching property can be enhanced.

In the same manner, the evaluation of the loose coil PMD and the cable PMD is examined. The loose coil PMD is the polarized mode dispersion in a state that the optical fiber ribbons are loosely coiled in a circular shape and the cable PMD is the polarized mode dispersion when the optical fiber ribbons are formed into a cable. With respect to the evaluation of the loose coil PMD and the cable PMD, the symbol "very good" shows a case in which they assume a value 0.05 (ps/km$^{1/2}$) or less, "good" shows a case in which the polarization mode dispersion assumes a value 0.05<PMD≦0.1 (ps/km$^{1/2}$), and the symbol "fair" shows a case in which the polarization mode dispersion assumes a value 0.1<PMD≦0.2 (ps/km$^{1/2}$). With respect to the loose coil PMD, when the ratio between the sheath thickness and the depth of recessed portions of the sheath (T−d)/2Y is 4 or less, the evaluation is "very good" or "good" and hence is favorable. To the contrary, when the ratio (T−d)/2Y is larger than 4, the evaluation is "fair" when the ribbon thickness is 290 μm. In the cable PMD, provided that the difference between the ribbon thickness and the optical fiber diameter is 30 μm or more, the evaluation is "good" when the (T−d)/2Y is 1 or less, and the evaluation is "fair" when the (T−d)/2Y is larger than 1. When the difference between the ribbon thickness and the diameter of the optical fibers is 20 μm or less, the evaluation is "good".

Although not shown in Table 4, with respect to the optical fiber ribbon having the thickness of more than 290 μm, that is, the optical fiber ribbon having the thickness exceeding d+40 (μm), it is possible to favorably ensure the integrality of the optical fiber ribbon. However, this takes a long time at the time of performing the branching and hence, it is favorable that the maximum thickness of the optical fiber ribbon is made equal to or less than d+40 μm. In this case, it is favorable that the thickness t of the sheath is equal to or less than 20 μm. This implies that it is favorable that, in FIG. 11A, the thickness t of the portion of the sheath above the optical fibers and the thickness t of the sheath below the optical fibers are substantially equal. In this case, the cores 113a of the optical fibers 111 are positioned almost at the center in the thickness direction of the optical fiber ribbon 110 and hence, when the optical fiber ribbons are connected to each other, the positions of the cores of both optical fiber ribbons are substantially aligned with each other whereby the connection loss is small.

Next, the evaluation of the branching property when the ribbon thickness of the optical fiber ribbon is 280 (μm), 270 (μm), 260 (μm). In all cases in which the ribbon thickness of the optical fiber ribbon is 280 (μm), 270 (μm) and 260 (μm), so long as the ratio (T−d)/2Y between the sheath thickness and the depth of the recessed portion of the sheath is 4 or less, the evaluation is "good" or "very good" and hence, the branching property is favorable.

TABLE 5

| fiber diameter d (μm) | ribbon thickness T (μm) | sheath thickness t (μm) | depth of recessed portion of sheath Y (μm) | ratio (T − d)/2Y | ribbon thickness at recessed portion g (μm) | ratio g/d | branching property | loose coil PMD | cable PMD |
|---|---|---|---|---|---|---|---|---|---|
| 125 | 165 | 20.0 | 1 | 20.00 | 163 | 1.304 | fair | fair | fair |
| 125 | 165 | 20.0 | 2 | 10.00 | 161 | 1.288 | fair | fair | fair |
| 125 | 165 | 20.0 | 5 | 4.00 | 155 | 1.240 | good | good | fair |
| 125 | 165 | 20.0 | 10 | 2.00 | 145 | 1.160 | good | good | fair |
| 125 | 165 | 20.0 | 20 | 1.00 | 125 | 1.000 | very good | very good | good |
| 125 | 155 | 15.0 | 1 | 15.00 | 153 | 1.224 | good | fair | fair |
| 125 | 155 | 15.0 | 2 | 7.50 | 151 | 1.208 | good | fair | fair |
| 125 | 155 | 15.0 | 5 | 3.00 | 145 | 1.160 | very good | good | fair |
| 125 | 155 | 15.0 | 10 | 1.50 | 135 | 1.080 | very good | good | fair |
| 125 | 145 | 10.0 | 1 | 10.00 | 143 | 1.144 | good | good | good |
| 125 | 145 | 10.0 | 2 | 5.00 | 141 | 1.128 | good | good | good |
| 125 | 145 | 10.0 | 5 | 2.00 | 135 | 1.080 | very good | good | good |
| 125 | 145 | 10.0 | 10 | 1.00 | 125 | 1.000 | very good | very good | good |
| 125 | 135 | 5.0 | 1 | 5.00 | 133 | 1.064 | good | good | good |
| 125 | 135 | 5.0 | 2 | 2.50 | 131 | 1.048 | very good | good | good |
| 125 | 135 | 5.0 | 5 | 1.00 | 125 | 1.000 | very good | very good | good |

Table 5 shows the relationship among the outer diameter d of optical fibers of the optical fiber ribbon using optical fibers having an outer diameter of 125 μm, the maximum thickness T of the optical fiber ribbon, the thickness t of the sheath and the depth Y of the recessed portions in the sheath. The explanation of the thickness of the sheath, the depth of the recessed portions of the sheath, the branching property of the optical fiber ribbon, the loose coil PMD and the cable PMD and the explanation of the symbol "very good", the symbol "good" and the symbol "fair" of the evaluation are similar to those explained in conjunction with Table 4 and hence, these explanations are omitted here.

When the ribbon thickness is 165 μm, the relationship T≦d+40 μm is established and the evaluation of the branching property is better than "fair". This implies that the live-line branching can be performed.

Although not shown in Table 5, with respect to the optical fiber ribbon having the ribbon thickness exceeding 165 μm, that is, the fiber diameter of equal to or more than d+40 μm, the time necessary for performing the branching without increasing the loss of the optical fibers is prolonged (for example, it takes more than 5 minutes) and hence, it is favorable that the ribbon thickness T is equal to or less than the fiber diameter d+40 μm. Accordingly, it is favorable that the thickness t of the sheath is equal to or less than 20 μm in the same manner as Table 4.

To review the sheath thickness t and the depth Y of the recessed portions of the sheath with respect to the branching property of the optical fiber ribbons shown in Table 5, the smaller the thickness t of the sheath, even when the depth Y of the recessed portions of the sheath is made shallow, it is possible to obtain the extremely favorable branching property. The evaluation of the branching property becomes "very good" in case that the depth Y of the recessed portions of the sheath is 20 μm when the thickness of the sheath wall t is 20 μm and in case that the depth Y of the recessed portions of the sheath is equal to or more than 5 μm when the thickness of the sheath wall t is 15 μm. Accordingly, by setting the thickness t of the sheath to 15 μm or less, that is, as long as the relationship T≦fiber outer diameter d+30 μm is established, the branching operation can be performed within a short time even when the recessed portions of the sheath is shallow.

In Table 5, when the thickness of the sheath wall t is equal to ore less than 15 μm, provided that the ratio (T−d)/2Y is 4 or less, the evaluation of the branching property is "very good" and this implies that the branching operation can be performed in a short period.

Figure 13A:
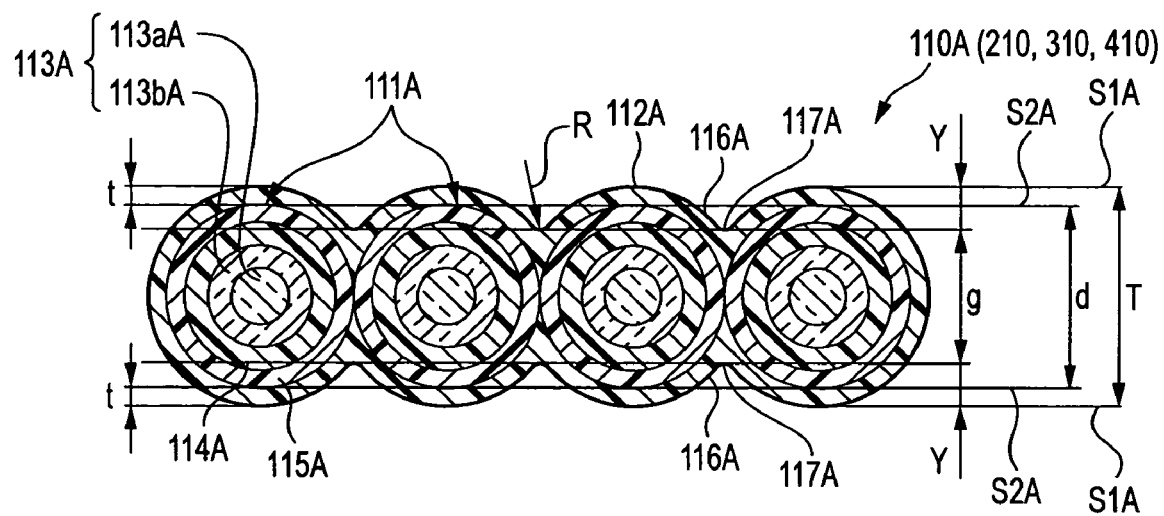
FIG. 13A is a cross-sectional view of another optical fiber ribbon according to the second embodiment of the present invention.
Figure 13B:
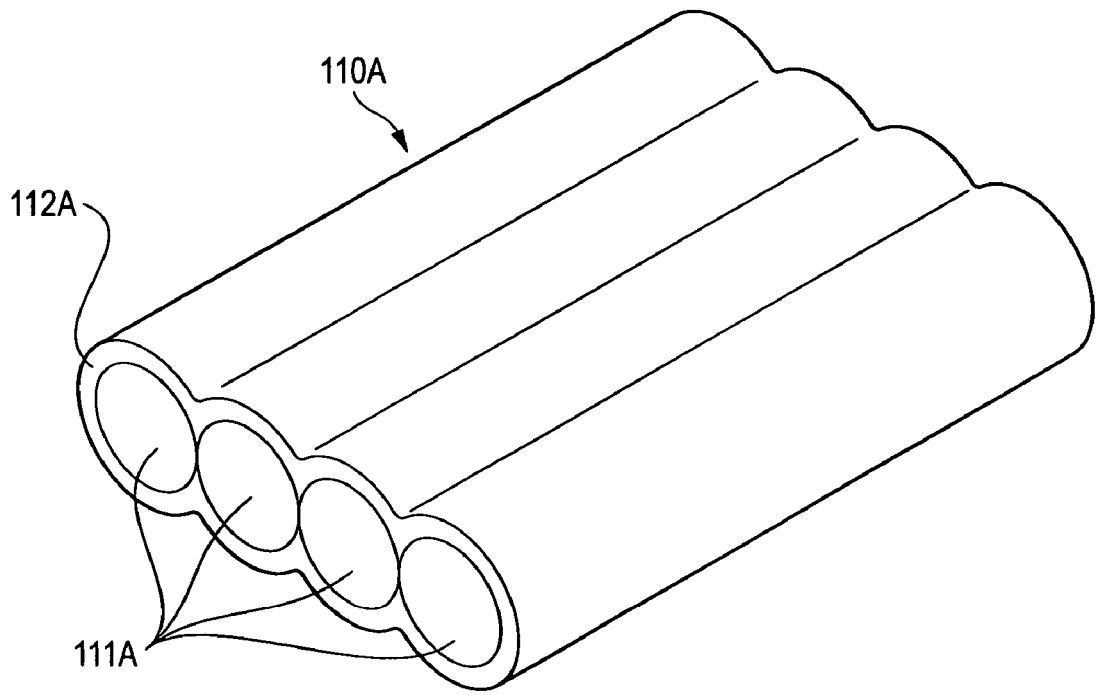
FIG. 13B is a perspective view of another optical fiber ribbon according to the second embodiment of the present invention.

FIG. 13A is a cross-sectional view of another optical fiber ribbon according to the second embodiment of the present invention and FIG. 13B is a perspective view of the optical fiber ribbon. The basic structure of the optical fiber ribbon 110A is substantially equal to the basic structure of the optical fiber ribbon 110 shown in FIG. 11A and hence, the explanation of the constitutions which are common between them is not made.

A sheath 112A which covers outer peripheries of the optical fibers 111A has a recessed shape in conformity with the indentations formed by the neighboring optical fibers 111A, 111A. The recessed portions 116A of the sheath has a deeper recessed shape compared to the case shown in FIG. 11A.

The prevention of separation of the optical fiber at the time of manufacturing the optical fiber ribbon by arranging a plurality of optical fibers in parallel and by integrating them using a sheath, the prevention of peeling-off (becomes a cause of separation of the optical fibers) at the time of performing the installation operation of the optical fiber ribbon, or the increase or decrease of transmission loss during the favorable branching operation or the live-line branching are reviewed. As a result, it is preferable that the recessed portions 116A are formed such that the recessed portions 116A do not exceed a common tangent S2A which is formed by the neighboring optical fibers 11A, 11A. That is, it is favorable that the recessed portions 116A are formed at the inner side than the common tangent S2A.

TABLE 6

| fiber diameter d (µm) | ribbon thickness T (µm) | sheath thickness t (µm) | depth of recessed portion of sheath Y (µm) | ratio (T − d)/ 2Y | ribbon thickness at recessed portion g (µm) | ratio g/d | branching property | loose coil PMD | cable PMD |
|---|---|---|---|---|---|---|---|---|---|
| 250 | 290 | 20.0 | 20 | 1.00 | 250 | 1.000 | very good | very good | good |
| 250 | 290 | 20.0 | 30 | 0.67 | 230 | 0.920 | very good | very good | good |
| 250 | 290 | 20.0 | 40 | 0.50 | 210 | 0.840 | very good | very good | good |
| 250 | 290 | 20.0 | 50 | 0.40 | 190 | 0.760 | very good | very good | very good |
| 250 | 290 | 20.0 | 60 | 0.33 | 170 | 0.680 | very good | very good | very good |
| 250 | 280 | 15.0 | 20 | 0.75 | 240 | 0.960 | very good | very good | good |
| 250 | 280 | 15.0 | 30 | 0.50 | 220 | 0.880 | very good | very good | good |
| 250 | 280 | 15.0 | 40 | 0.38 | 200 | 0.800 | very good | very good | very good |
| 250 | 280 | 15.0 | 50 | 0.30 | 180 | 0.720 | very good | very good | very good |
| 250 | 280 | 15.0 | 60 | 0.25 | 160 | 0.640 | very good | very good | very good |
| 250 | 270 | 10.0 | 10 | 1.00 | 250 | 1.000 | very good | very good | good |
| 250 | 270 | 10.0 | 20 | 0.50 | 230 | 0.920 | very good | very good | good |
| 250 | 270 | 10.0 | 30 | 0.33 | 210 | 0.840 | very good | very good | good |
| 250 | 270 | 10.0 | 40 | 0.25 | 190 | 0.760 | very good | very good | very good |
| 250 | 270 | 10.0 | 50 | 0.20 | 170 | 0.680 | very good | very good | very good |
| 250 | 270 | 10.0 | 100 | 0.10 | 70 | 0.280 | very good | very good | very good |
| 250 | 260 | 5.0 | 5 | 1.00 | 250 | 1.000 | very good | very good | good |
| 250 | 260 | 5.0 | 10 | 0.50 | 240 | 0.960 | very good | very good | good |
| 250 | 260 | 5.0 | 20 | 0.25 | 220 | 0.880 | very good | very good | good |
| 250 | 260 | 5.0 | 30 | 0.17 | 200 | 0.800 | very good | very good | very good |
| 250 | 260 | 5.0 | 40 | 0.13 | 188 | 0.720 | very good | very good | very good |
| 250 | 260 | 5.0 | 50 | 0.10 | 160 | 0.640 | very good | very good | very good |
| 250 | 260 | 5.0 | 100 | 0.05 | 60 | 0.240 | very good | very good | very good |

Table 6 shows the relationship among the fiber diameter d, the ribbon thickness T the sheath thickness t, the depth Y of the recessed portions of the sheath and the ribbon thickness g at the recessed portions shown in FIG. 13A and indicates the branching properties, the loose coil PMD and the cable PMD of the optical fiber ribbons. The evaluations "very good" and "good" on the branching property, the loose coil PMD and the cable PMD in Table 6 are substantially equal to those used in the evaluations in Table 4 and hence, their explanation is omitted.

The distance between the common tangents S2A, S2A of the neighboring optical fibers 111A, 111A can be set as the outer diameter d of the optical fiber, wherein provided that the ratio g/d shown in Table 6 is equal to or less than 1.0, the recessed portions 116A formed in the sheath 112 do not exceed the common tangent S2A of the optical fiber. As shown in FIG. 13A which is a cross-sectional view, the recessed portion 116A is positioned inside (center axis directions of optical fibers) of the common tangents S2A, S2A of the optical fibers 11A.

The optical fiber ribbons shown in Table 6 exhibit the ratio g/d≦1.0 and hence, the optical fiber ribbons do not exceed the common tangent of the optical fibers. To review the evaluation of branching properties, all optical fiber ribbons exhibit the evaluation "very good". In this case, since the recessed portion 116A of the sheath 112A is deeply formed along the indentation formed by the optical fibers 111A, 111A, the thickness of the recessed portions 116A of the sheath 112A can be reduced whereby the optical fibers 111A can be branched more easily.

Figure 14:
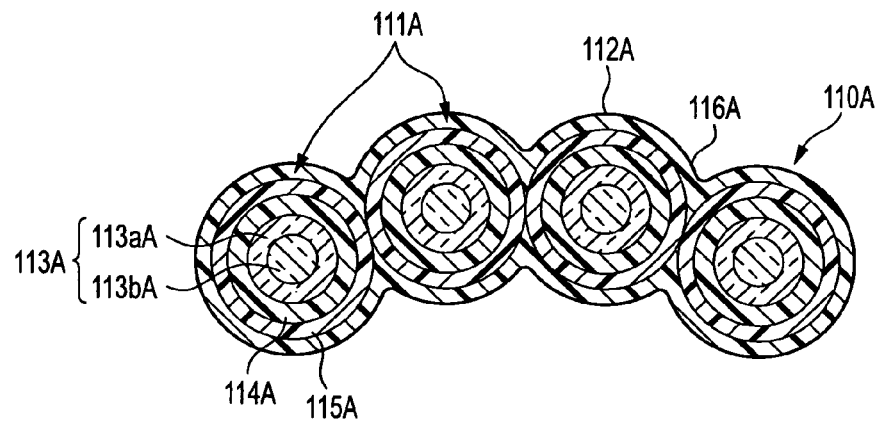
FIG. 14 is across-sectional view of another optical fiber ribbon in a deflected state according to the second embodiment of the present invention.

To review the evaluation of the loose coil PMD, all of optical fiber ribbons exhibit "very good" and hence, the loose coil PMD is extremely favorable. With respect to these optical fibers, since the sheath at the recessed portions 116A is made thin not to exceed the common tangent, the optical fibers are easily bendable in the longitudinal direction and the recessed portions are deep. On the other hand, as shown in FIG. 14, the optical fibers are easily deflectable in the widthwise direction and hence, when the optical fiber ribbon 110A is formed in a loose coil state, no excessive force is applied to the optical fiber ribbon whereby it is considered that the loose coil PMD can be enhanced. Further, the sheath 112A of the optical fiber ribbon 110A approximates a circular shape along the outer peripheries of the optical fibers 111A and hence, the anisotropy of the curing shrinking stress of the sheath which may occur in manufacturing the optical fiber ribbon can be reduced whereby it is considered that the PMD of the optical fiber ribbon in a loose coil state can be enhanced.

To review the evaluation of the cabled PMD, when the ratio g/d is equal to or less than 0.8, the cabled PMD becomes a value which is below 0.5 (ps/km$^{1/2}$) and hence, the extremely favorable cabled PMD characteristics are obtained. When the ratio g/d is equal to or less than 0.8, with respect to the sheath 112A of the optical fiber ribbon 110A, the sheath at the recessed portions 116A can be made extremely thin and hence, the optical fiber ribbons 110A are easily bendable in the longitudinal direction along the groove shape of the slots and the in the widthwise direction. Accordingly, even when the optical fiber ribbon is twisted when the optical fiber ribbon is formed into a cable, the optical fiber ribbon is bended so that the stress attributed to twisting can be released whereby it is considered that the cabled PMS can be enhanced.

TABLE 7

| fiber diameter d (µm) | ribbon thickness T (µm) | sheath thickness t (µm) | depth of recessed portion of sheath Y (µm) | ratio (T − d)/2Y | ribbon thickness at recessed portion g (µm) | ratio g/d | branching property | loose coil PMD | cable PMD |
|---|---|---|---|---|---|---|---|---|---|
| 125 | 165 | 20.0 | 20 | 1.00 | 125 | 1.000 | very good | very good | good |
| 125 | 165 | 20.0 | 30 | 0.7 | 105 | 0.840 | very good | very good | good |
| 125 | 165 | 20.0 | 40 | 0.5 | 85 | 0.680 | very good | very good | very good |
| 125 | 165 | 20.0 | 50 | 0.4 | 65 | 0.520 | very good | very good | very good |
| 125 | 165 | 20.0 | 60 | 0.3 | 45 | 0.360 | very good | very good | very good |
| 125 | 155 | 15.0 | 20 | 0.8 | 115 | 0.920 | very good | very good | good |
| 125 | 155 | 15.0 | 30 | 0.5 | 95 | 0.760 | very good | very good | very good |
| 125 | 155 | 15.0 | 40 | 0.4 | 75 | 0.600 | very good | very good | very good |
| 125 | 155 | 15.0 | 50 | 0.3 | 55 | 0.440 | very good | very good | very good |
| 125 | 155 | 15.0 | 60 | 0.3 | 35 | 0.280 | very good | very good | very good |
| 125 | 145 | 10.0 | 10 | 1.00 | 125 | 1.000 | very good | very good | good |
| 125 | 145 | 10.0 | 20 | 0.5 | 105 | 0.840 | very good | very good | good |
| 125 | 145 | 10.0 | 30 | 0.3 | 85 | 0.680 | very good | very good | very good |
| 125 | 145 | 10.0 | 40 | 0.3 | 65 | 0.520 | very good | very good | very good |
| 125 | 145 | 10.0 | 50 | 0.2 | 45 | 0.360 | very good | very good | very good |
| 125 | 145 | 10.0 | 60 | 0.2 | 25 | 0.200 | very good | very good | very good |
| 125 | 135 | 5.0 | 5 | 1.00 | 125 | 1.000 | very good | very good | good |
| 125 | 135 | 5.0 | 10 | 0.5 | 115 | 0.920 | very good | very good | good |
| 125 | 135 | 5.0 | 20 | 0.3 | 95 | 0.760 | very good | very good | very good |
| 125 | 135 | 5.0 | 30 | 0.2 | 75 | 0.600 | very good | very good | very good |
| 125 | 135 | 5.0 | 40 | 0.1 | 55 | 0.440 | very good | very good | very good |
| 125 | 135 | 5.0 | 50 | 0.1 | 35 | 0.280 | very good | very good | very good |
| 125 | 135 | 5.0 | 60 | 0.1 | 15 | 0.120 | very good | very good | very good |

Table 7 shows the relationship among the fiber diameter d, the ribbon thickness T, the sheath thickness t, the depth Y of the recessed portions of the sheath and the ribbon thickness g at the recessed portions of the optical fiber ribbon using the optical fibers having the outer diameter of 125 μm. The explanation of the sheath thickness, the depth of the recessed portions of the sheath, the branching properties of the optical fiber ribbon, the loose coil PMD and the cable PMD and the explanation of the evaluations "very good", "good" and "fair" are substantially equal to those used in Table 4 and hence, their explanation is omitted.

In any one of optical fiber ribbons having the sheath thickness of 20 (μm), 15 (μm), 10 (μm) and 5 (μm), provided that the ratio g/d is equal to or less than 1.0, the evaluations of the branching property and the loose coil PMD become "very good", while provided that the ratio g/d is equal to or less than 0.8, the evaluation of the cable PMD also becomes "very good". The factors which bring about such evaluations are equal to those factors shown in Table 6.

Although not shown in Table 7, with respect to the optical fiber ribbon having the ribbon thickness exceeding 165 μm, that is, the fiber diameter d of equal to or more than d+40 μm, the time necessary for performing the branching without increasing the loss of the optical fibers is prolonged (for example, it takes more than 5 minutes) and hence, it is favorable that the ribbon thickness T is equal to or less than the fiber diameter d+40 μm.

TABLE 8

| optical fiber outer diameter 250 μm | | | | |
|---|---|---|---|---|
| thickness g (μm) | 200 | 160 | 120 | 80 |
| branching property | good | good | good | good |
| cabled | good | good | good | good |

Table 8 shows a table indicating the relationship between the thickness g of the optical fiber ribbon at the recessed portion 116A and the branching property and the cabling (integrity) when the outer diameter d of the optical fibers is 250 μm in an optical fiber ribbon similar to the optical fiber ribbon shown in FIG. 13A. The cabled "good" in the table indicates that although the optical fiber ribbon is twisted when the optical fibers are cabled by assembling the optical fibers, the optical fiber ribbon is not separated into respective optical fibers due to the twisted stress. The evaluation of the branching property is performed in the same manner as Tables 4 to 7. As shown in Table, when the thickness g of the optical fiber ribbon at the recessed portion 116A is 80 μm to 200 μm, both of the branching property and the ribbon forming are favorable. Here, from a viewpoint of ribbon forming, it is preferable to ensure 40 μm or more as the thickness g of the optical fiber ribbon.

As shown in FIG. 11A and FIG. 13A, in the optical fiber ribbon according to the present invention, it is desirable that the recessed portions of the sheath are formed in a smooth curved shape R. This is because when the recessed portions 116A of the sheath 112A have acute distal ends thereof along the shape of the optical fiber ribbon, a stress is concentrated on the distal ends of the recessed portions and hence, ruptures and cracks are liable to be easily generated.

Further, in the optical fiber ribbon according to the present invention, the adhesive strength between the optical fiber and the sheath sometimes affects the increase of the transmission loss and the live-line operation efficiency at the time of performing the live-line branching. With respect to the adhesive strength of the optical fibers 111, 111A and the sheath 112, 112A, to take the prevention of the increase of the transmission loss and the branching operability into consideration, it is favorable that the adhesive strength per one optical fiber falls within a range of 0.245 (mN) to 2.45 (mN) When the above-mentioned adhesive strength is smaller than the above-mentioned range, there may arise a case that the sheath 112, 112A is ruptured at the time of being formed into a cable and the optical fibers 111, 111A are separated from each other. On the other hand, when the adhesive strength is larger than the above-mentioned range, the branching property is deteriorated.

The adhesive strength between the optical fiber and the sheath is measured by the above-mentioned method explained in conjunction with FIG. 5 and FIG. 6.

In the optical fiber ribbon 110, 110A according to the present invention, when a main object of the invention lies in that the optical fibers 111, 111A keep the integrity without being separated from each other, it is favorable that the thickness of the sheath 112, 112A is equal to or more than 1 μm. In this case, the maximum thickness T of the optical fiber ribbon 110, 110A becomes T≧outer diameter of the optical fiber d+1 (μm).

Also depending on the properties of the sheath 112, 112A of the optical fiber ribbon 110, 110A, in some cases, these properties affect the increase of the transmission loss and the branching operation efficiency at the live-line branching. It is preferable that the yield point stress, as the property of material of the sheath, falls within a range of 20 MPa to 45 Mpa. This is because that the branching operation can be performed easily and the transmission loss at the time of performing the live-line branching can be suppressed. When the yield point stress is less than 20 MPa, the respective optical fibers are separated from each other due to an external force applied in a step for forming a cable by assembling the optical fiber ribbon and hence, there may be a case that the cabling cannot be performed. On the other hand, when the yield point stress exceeds 40 MPa, it is difficult to rupture the sheath and hence, it is difficult to perform the intermediate post blanching of the optical fiber ribbon.

The branching property and the integrity of the optical fiber ribbon according to the present invention are also related with the physical properties of the sheath. For example, with respect to the sheath 112, 112A having the large Young's modulus, even when the thickness g of the optical fiber ribbon 110, 110A at the recessed portion 116, 116A is smaller or the thickness t of the sheath is small, it is possible to ensure a sufficient constraining force to integrate the optical fibers. From a viewpoint of branching property, when the Young's modulus is large, it is preferable to reduce the thickness g of the optical fiber ribbon 110, 110A or the thickness t of the sheath at the recessed portions 116, 116A.

According to the experiment, it is understood that, when the Young's modulus of the sheath 112, 112A exceeds 1000 MPa, provided that the thickness g of the optical fiber ribbon 110, 110A at the recessed portions 116, 116A is 40 μm or more, the sheath 112, 112A is too hard and hence, the branching property of the optical fiber 111, 111A is deteriorated. On the other hand, it is found that when the Young's modulus of the sheath 112,112A becomes equal to or less than 100 MPa, the sheath 12 is too soft and is broken during a next step of manufacturing of cables unless the thickness g of the optical fiber ribbon at the recessed portion 116, 116A is set to 200 μm or more and hence, the integrated state cannot be maintained. Accordingly, it is favorable that the Young's modulus of the sheath 112, 112A is set to equal to or less than 1000 MPa. It is, however, preferable to set the Young's modulus of the sheath 112, 112A to more than 100 MPa.

Further, the branching and integration relate also to the rupture elongation of the resin which forms the sheath 112, 112A. When the elongation is equal to or less than 35%, the optical fibers 111, 111A can be easily branched. However, when the elongation is equal to or less than 10%, the optical fibers are cracked during the next process of manufacturing the cable and hence, the integration state cannot be maintained. Accordingly, it is favorable that the rupture elongation is equal to or less than 35% and equal to or more than 10%.

To prepare the blending of the ultraviolet ray curable resin having the above-mentioned Young's modulus, the Young's modulus can be increased by reducing a molecular weight of the oligomer or by increasing an addition amount of bifunctional monomer such as ethylene oxide modified bisphenol A diacrylate or the like.

Further, in performing the blending of the resin to make the resin have the above-mentioned rupture elongation, it is possible to increase the rupture elongation by increasing a molecular weight in diol in the oligomer molecules such as PTMG or the like or by reducing an addition amount of bifunctional monomer such as ethylene oxide modified bisphenol A diacrylate or the like.

Even when such conditions are satisfied, when the transmission loss at the time of branching the optical fibers 111, 111A is large, the optical fibers are not suitable as a product. That is, when the increase of the transmission loss at the time of branching becomes larger than 1.0 dB, there is a possibility that the communication is interrupted. Accordingly, the optical fiber ribbon whose increase of transmission loss at the time of branching is equal to or less than 1.0 dB is the optical fiber ribbon which can be served for live-line branching and hence is preferable. It is more preferable that the transmission loss at the time of branching is equal to or less than 0.5 dB.

Here, the measurement of the yield point stress, the Young's modulus and the tensile rupture elongation and the measurement of the transmission loss at the time of branching the optical fibers 111, 111A are performed in the same manner as the measurements explained in conjunction with the above-mentioned optical fiber ribbon of the first embodiment.

It is favorable that the mode field diameter according to the definition of Petermann-I at the wavelength of 1.55 μm of the optical fiber 111, 111A is equal to or less than 10 μm. At the same time, it is favorable that the cable cut-off wavelength of the glass fiber 113, 113A of the optical fiber 111, 111A is equal to or less than 1.26 μm. The cable cut-off wavelength indicates a cut-off wavelength of $LP_{11}$ mode at 22 m length and is a value smaller than a 2 m cut-off wavelength.

Further, with respect to the glass fiber 113, 113A of the optical fiber 111, 111A, the macrobend loss at the bending diameter of 15 mm at a wavelength of 1.55 μm is set to a value equal to or less than 0.1 dB/turn. The macrobend loss is obtained by dividing the difference in transmission loss before and after winding the optical fiber around a metal rod or the like by ten and some turns by the number of turns.

As described above, the optical fiber ribbon 110, 110A of the present invention has an advantage that the polarization mode dispersion (PMD) in a loose coil state becomes equal to or less than 0.2 $ps/km^{1/2}$. Further, the optical fiber ribbon 10 of the present invention also has an advantage that the PMD of the optical fiber which constitutes the optical fiber ribbon becomes 0.2 $ps/km^{1/2}$ after the optical fibers 111, 111A are formed into a cable. Since the sheaths 112, 112A which cover the optical fibers 111, 111A are thin and hence, the optical fiber ribbon is easily bendable. Due to the presence of the recessed portions 116, 116A, the optical fiber ribbon is easily bendable in the widthwise direction and the anisotropy of the curing shrinking stress of the sheath is also small. Accordingly, even when the optical fiber ribbon is formed in a loose coil state, no excessive external force is applied and the PMD can be reduced. Since the PMD affects the long-distance transmission, the optical fiber ribbon exhibiting the small PMD can perform the long-distance transmission.

On the other hand, with respect to the related-art ribbon structure, it is considered that, usually, all of the optical fibers are covered with coating of a sheath having a thickness of 25 to 40 μm. It is considered that at the time of curing of the coating, a strain which is generated due to a stress or the like attributed to the curing shrinking remains in the optical fibers and hence, the polarization mode dispersion is increased.

Here, as the method of measuring the polarization mode dispersion (PMD) after forming the optical ribbon into a cable, a reference testing method (RTM) and an alternative testing method (ATM) can be named. As the RTM, the Jones-Matrix (JME) method and the Poincare sphere (PS) method can be named. On the other hand, as the ATM, the polarized state (SOP) method, the interference method, a fixed analyzer (FA) method and the like can be named. The polarization mode dispersion of the optical fibers of the optical fiber ribbon is measured in a loose coil state using the above-mentioned methods, wherein it is preferable that the maximum value is equal to or less than 0.2 $ps/km^{1/2}$.

Next, the method of manufacturing the optical fiber ribbon according to the present invention is explained.

Figure 15:
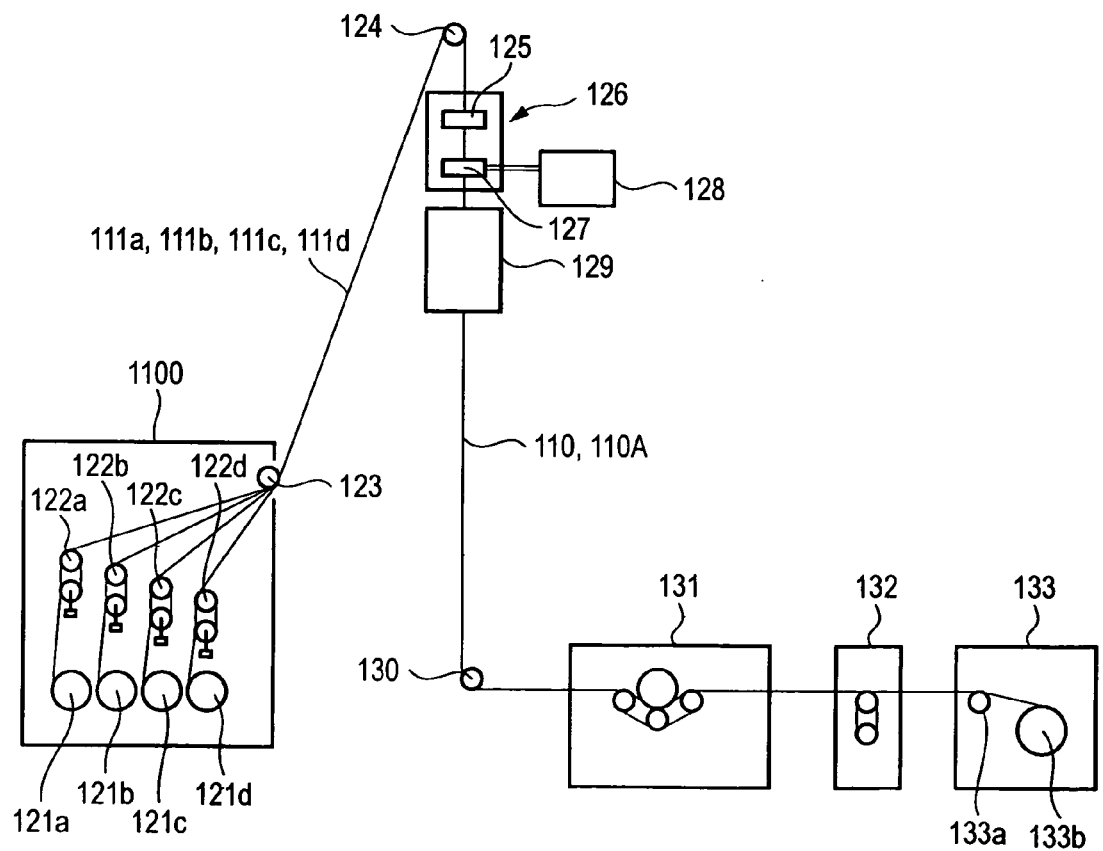
FIG. 15 is an explanatory view showing a method of manufacturing an optical fiber ribbon according to the second embodiment of the present invention.

FIG. 15 is an explanatory view showing the method of manufacturing the optical fiber ribbon 110,110A according to the present invention. In the inside of a supply device 100, reels 121a to 121d, dancer rollers 122a to 122d and a guide roller 123 are disposed. Optical fibers 111a, 111b, 111c, 111d are respectively wound around the reels 121a, 121b, 121c, 121d. These optical fibers correspond to the optical fibers 111, 111A which are explained in conjunction with the optical fiber ribbon shown in FIG. 11A and FIG. 13A. Here, although the explanation is made with respect to an example which manufactures the optical fiber ribbon using four optical fibers, the number of the optical fibers is not limited to 4.

The optical fibers 111a, 111b, 111c, 111d are respectively paid off from the reels 121a, 121b, 121c, 121d and a tension of ten and some gf are applied to the optical fibers 111a, 111b, 111c, 111d by the dancer rollers 122a, 122b, 122c, 122d. When the optical fibers 111a, 111b, 111c, 111d pass over the guide roller 123, the optical fibers 111a, 111b, 111c, 111d are arranged on one arrangement row surface. Further, the optical fibers 111a, 111b, 111c, 111d are further assembled by an overhead guide roller 124 and are fed to a coating device 126. The coating device 126 includes a nipple 125 and a die 127. The optical fibers 111a to 111d which are fed to the coating device 126 are guided by the nipple 125 and are set to a desired arrangement.

Figure 16:
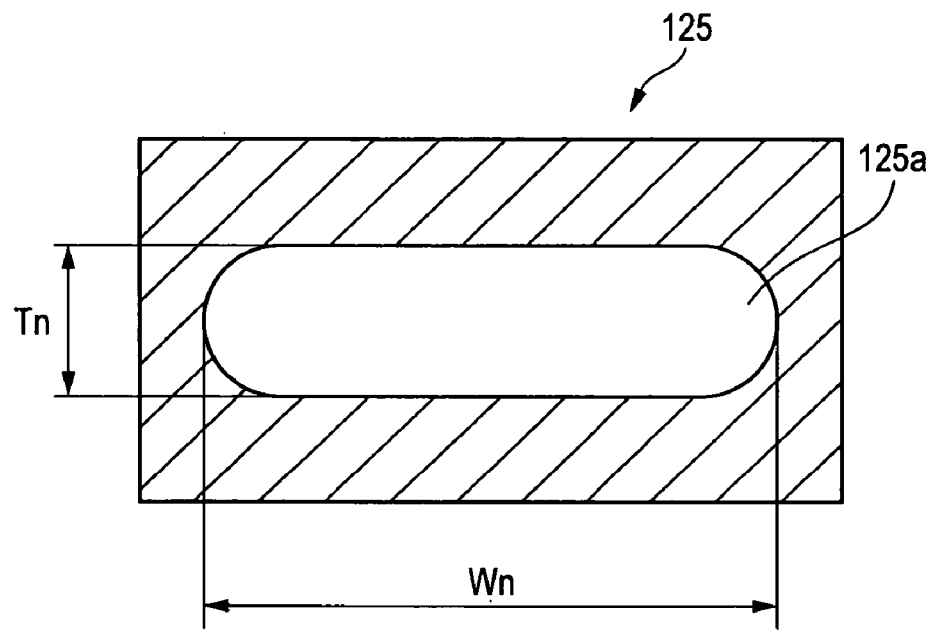
FIG. 16 is a cross-sectional view of a nipple.

As shown in FIG. 16, the nipple 125 has an oblong line exit opening 125a. With respect to sizes of the line exit opening 125a, it is preferable that, assuming the number of the optical fibers 111, 111A as N (here, four), a width Wn and a thickness Tn are respectively expressed by following formulae.

$$Wn = \text{outer diameter of optical fiber} \times N + 0.03 \text{ to } 0.08 \text{ mm}$$

When the optical fibers are arranged such that they are brought into contact with each other, it is preferable to set such that Wn=outer diameter of optical fiber×N+0.03 to 0.05 mm.

It is preferable to set the thickness Tn such that the thickness Tn is expressed by the formula Tn=outer diameter of optical fiber+0.005 to 0.01 mm.

Figure 17:
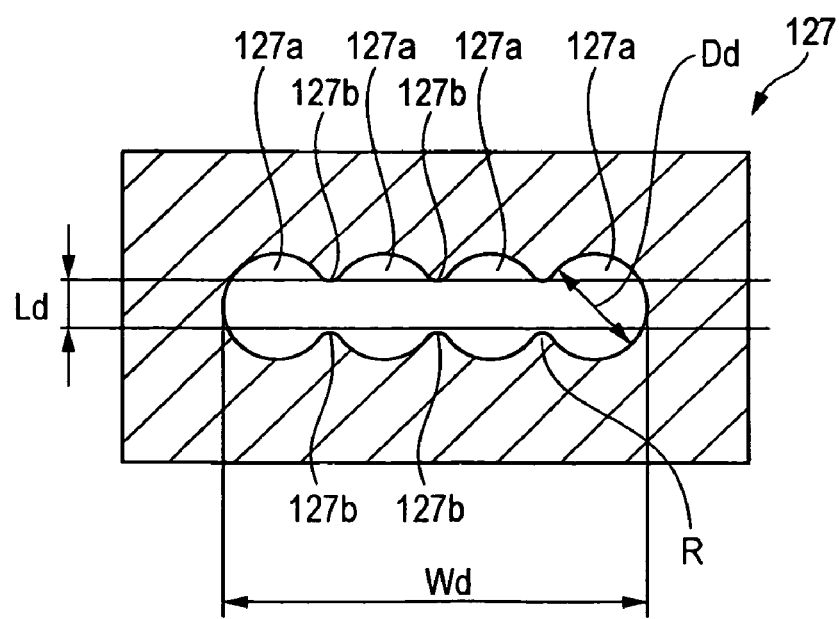
FIG. 17 is a cross-sectional view of a die.

In the coating device 126, a die 127 shown in FIG. 17 is disposed. The die 127 is provided with an elongated hole 127a in a contacting manner through which four respective optical fibers 111a, 111b, 111c, 111d pass.

It is preferable that a diameter Dd of the hole 127a of the die 127 is set such that Dd=outer diameter of optical fiber+0.005 to 0.05 mm. Further, a width Wd of the hole 27a of the die 27 is set such that Wd=Dd×N. A projecting portion 127b formed between the neighboring optical fibers 111, 111A corresponds to the recessed portion 116 in FIG. 11A and the recessed portion 116A in FIG. 13A. It is preferable that a distal end of the projecting portion 127b is set such that a formula (T−d)/2/Y≦4.0 is satisfied. Further, in FIG. 13A, the projecting portion 127b is always positioned inside the common tangent S2A of the neighboring optical fibers 11A. To be more specific, a distance Ld between distal ends of the projecting portions 127b corresponds to the thickness g of the optical fiber ribbon at the recessed portion of the sheath. The distance Ld is set based on the design of the thickness g of the optical fiber ribbon at the recessed portions of the sheath such as a value equal to or less than 200 μm, a value equal to or less than 1.0 d, a value equal to or less than 0.8 d (outer diameter of optical fiber—0.05 mm) or the like.

Here, since the die 127 is exclusively manufactured by wire electric discharge machining, the distance Ld becomes larger than at least the wire diameter. The distance Ld is approximately 0.05 to 0.08 mm even at a minimum. Further, to prevent the distal ends of the projecting portions 127b from damaging the optical fibers 111 even when the optical fibers 111 are brought into contact with the projecting portions 127b, the distal ends of the projecting portions 127b are formed in a smooth curved shape such as R (a round shape), for example. When the distal ends of the projecting portions 127b are formed in a projecting arcuate shape toward the inside of the ribbon, the radius of curvature R is preferably approximately 0.02 to 0.05 mm.

Four optical fibers 111a, 111b, 111c, 111d are arranged in parallel on one planar face in a state that they are brought into contact with each other at a point of time that the optical fibers 111a, 111b, 111c, 111d reach the coating device 126, wherein an ultraviolet ray curable resin is applied to the periphery of the optical fibers 111a, 111b, 111c, 111d. The ultraviolet ray curable resin is supplied from a pressurized resin tank 128. To four optical fibers 111a, 111b, 111c, 111d to which the ultraviolet ray curable resin is applied, ultraviolet rays are irradiated by an ultraviolet ray irradiation device 129 so as to cure the ultraviolet ray curable resin. The cured ultraviolet ray curable resin forms the sheath 112, 112A and hence, 4-fibered optical fiber ribbon 110, 110A are formed.

The optical fiber ribbon 110 which is cured by the irradiation of the ultraviolet rays from the ultraviolet ray irradiation device 129 is fed to a winding device 133 by way of a guide roller 130, a pay-off capstan 131, and a winding tension control dancer roller 132. In the winding device 133, the optical fiber ribbon 110, 110A is wound around a reel 133b by way of a guide 133a. Here, a winding tension of the whole optical fiber ribbon is set to ten and some gf to several hundreds gf.

As described above, according to the method of manufacturing optical fiber ribbon, four optical fibers 111a, 111b, 111c, 111d are arranged in parallel in a state that they are brought into contact with each other, and the sheath 112, 112A is formed on the outside of the optical fibers 111a, 111b, 111c, 111d to integrate the optical fibers. The recessed portion 116, 116A is formed between the neighboring optical fibers 111, 11A. Since the maximum value of the thickness of the optical fiber ribbon can be set to a value which falls in a range from the diameter of the optical fibers to a value which is 40 m larger than the diameter of the optical fiber ribbon, the respective optical fibers 111 can be easily branched (live-line branching). When the optical fiber ribbon 110, 110A satisfies the related formula (T−d)/2/Y≦4.0, the branching property can be further enhanced. When the sheath 112A is formed such that the recessed portion 116A does not exceed the common tangent of the neighboring optical fibers 111, the PMD is enhanced.

Here, in the above-mentioned method of manufacturing the optical fiber ribbon, the explanation is made with respect to a case in which four optical fibers 111a, 111b, 111c, 111d are arranged in parallel and the outer sheath 112, 112A is integrally formed on the outside of these optical fibers. Besides such a constitution, it may be possible that an ultraviolet ray curable resin is separately applied to four optical fibers 111a, 111b, 111c, 111d respectively and, thereafter, four optical fibers 111a, 111b, 111c, 111d are arranged close to each other and, then, the sheath 112, 112A is cured.

Figure 18:
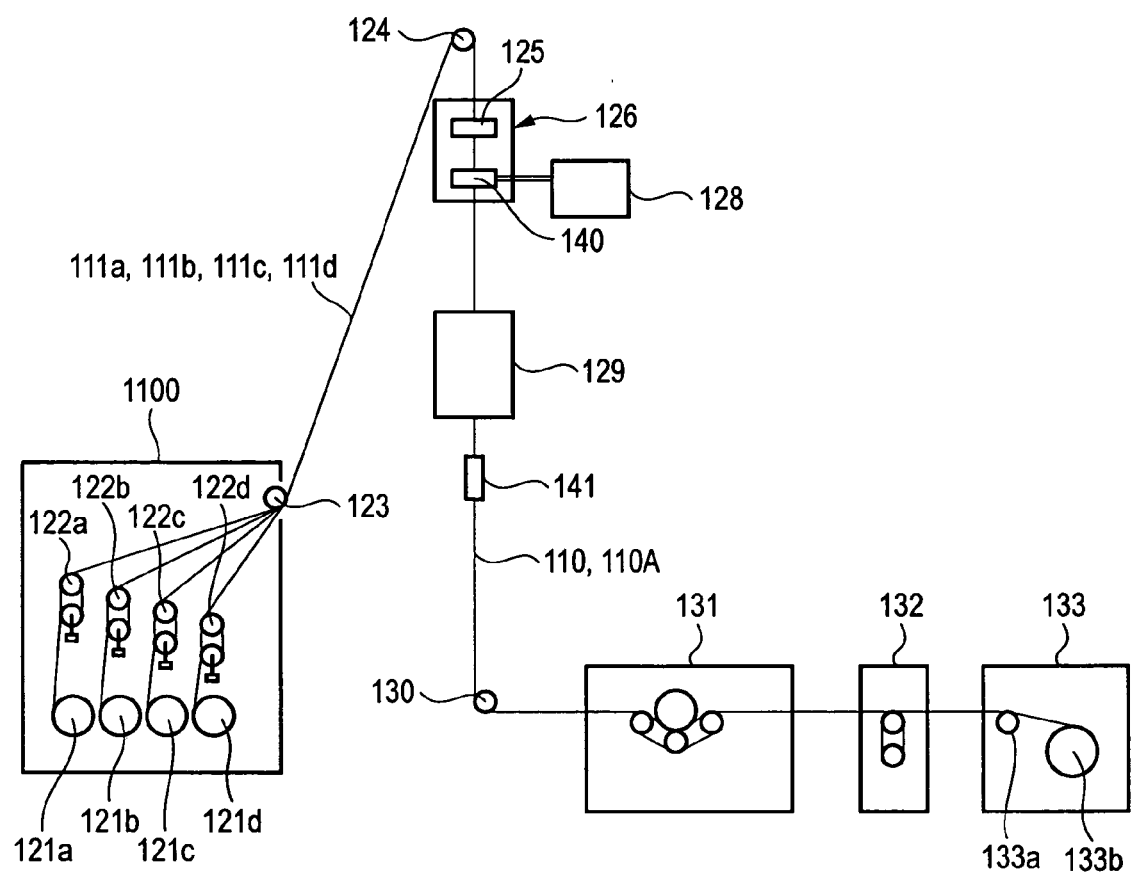
FIG. 18 is an explanatory view showing a method of manufacturing another optical fiber ribbon according to the second embodiment of the present invention.
Figure 19:
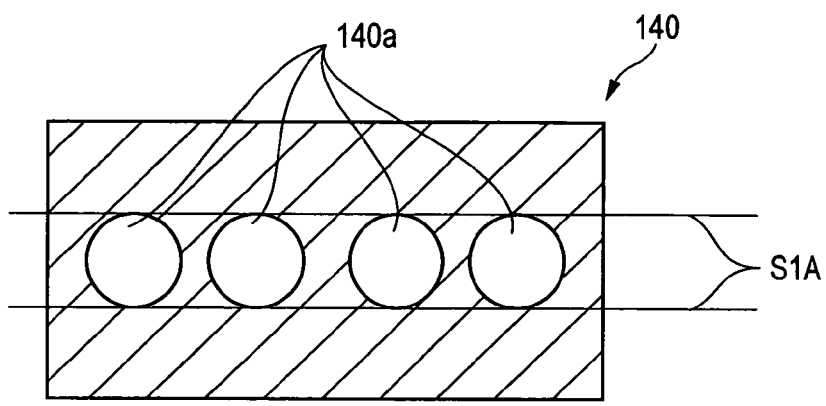
FIG. 19 is a cross-sectional view of a die.

That is, as shown in FIG. 18, four optical fibers 111a, 111b, 111c, 111d are made to pass through a coating device 126. The coating device 126 uses a die 140 shown in FIG. 19. In the die 140, exit openings 140a are arranged separately and the ultraviolet ray curable resin is applied to respective optical fibers 111a, 111b, 111c, 111d separately. Thereafter, using a guide roller 141 for assembling which is provided at the downstream of an ultraviolet ray irradiating device 129, four optical fibers 111a, 111b, 111c, 111d are arranged in a row close to each other in the inside of the ultraviolet ray irradiation device 129 and they are integrally formed by the irradiation of the ultraviolet rays. Here, the resin between the neighboring optical fibers is extruded to the peripheries of the optical fibers so that the optical fibers are brought into contact with each other. By adjusting an amount of resin to be applied to the respective optical fibers, the recessed portions 116, 116A are formed between the neighboring optical fibers in, 111A and, thereafter, the resin is cured.

With respect to other constitutions, since they are in common with the constitutions which are explained in conjunction with FIG. 15 and hence, parts which are served in common are given same symbols and their explanation is omitted.

Also in the method of manufacturing the optical fiber ribbon, in the same manner as the above-mentioned case, the optical fiber ribbon 110, 110A is configured such that the respective optical fibers 111, 111A can be easily branched. Further, they exhibit the small PMD.

Here, the optical fiber ribbon and the manufacturing method thereof according to the present invention are not limited to those in the previously-mentioned embodiments and can be suitably modified and improved.

(Experiments)

Hereinafter, several specific experiments of the optical fiber ribbon having the constitution shown in FIG. 13A are explained hereinafter. Using four optical fibers each of which has an outer diameter of 250 μm and includes a protective coating 114A and a color layer 115A as the optical fibers 111A, the optical fiber ribbon 110A is manufactured. As the ribbon material, an ultraviolet ray curable resin is used. As the ultraviolet ray curable resin, for example, a resin which uses, as a base, urethane acrylate-based oligomer which is a copolymer of PTMG (polytetramethylene glycol), TDI (tolylene diisocyanate) and HEA (hydroxyl ethylacrylate) is used. As a diluting monomer for resin of the ribbon material, a resin to which N-vinyl-pyrrolidone, ethylene oxide modified bisphenol A diacrylate and Irugacure 184 as a light start material are added is used. The Young's modulus and the elongation are changed by changing the resin and method for blending the resin.

The used nipple 125 is formed into a shape having a width Wn of 1.04 mm, a thickness Tn of 0.260 mm by machining. The die 127 is formed into a shape in which a hole diameter Dd is 0.260 mm, a width Wd is 1.04 mm, a distance Ld is 0.08 to 0.20 mm, and a thickness g of the optical fiber ribbon at the recessed portions 116A assumes a given value by machining.

Table 9 shows the results of the first to the eleventh experiments which satisfy the above-mentioned various conditions. Here, the manufacturing method of the first to the tenth experiments adopts, as explained in conjunction with Table 4, the method in which four optical fibers 111a, 111b, 111c, 111d are arranged close to each other in parallel, a resin is collectively applied to these optical fibers in this state so as to integrate the optical fibers. On the other hand, the eleventh experiment adopts a method in which, as explained in conjunction with FIG. 18, a resin is applied to respective four optical fibers 111a, 111b, 111c, 111d and, thereafter, the optical fibers are assembled to be integrated.

wavelength of 1.55 μm is 9.8 μm and the cable cutoff wavelength is 1.2 μm are used. In the tenth experiment, optical fibers which has a mode field diameter of 7.6 μm at a wavelength of 1.55 μm and a cable cutoff wavelength of 1.2 μm are used. In this case, it is understood that the transmission loss at the time of branching can be further reduced.

Next, the optical fiber cables using the optical fiber ribbon according to the present invention are explained in conjunction with FIG. 20 to FIG. 38.

First of all, the optical fiber cable according to the first embodiment of the present invention is explained in conjunction with FIG. 20 to FIG. 25.

Figure 20:
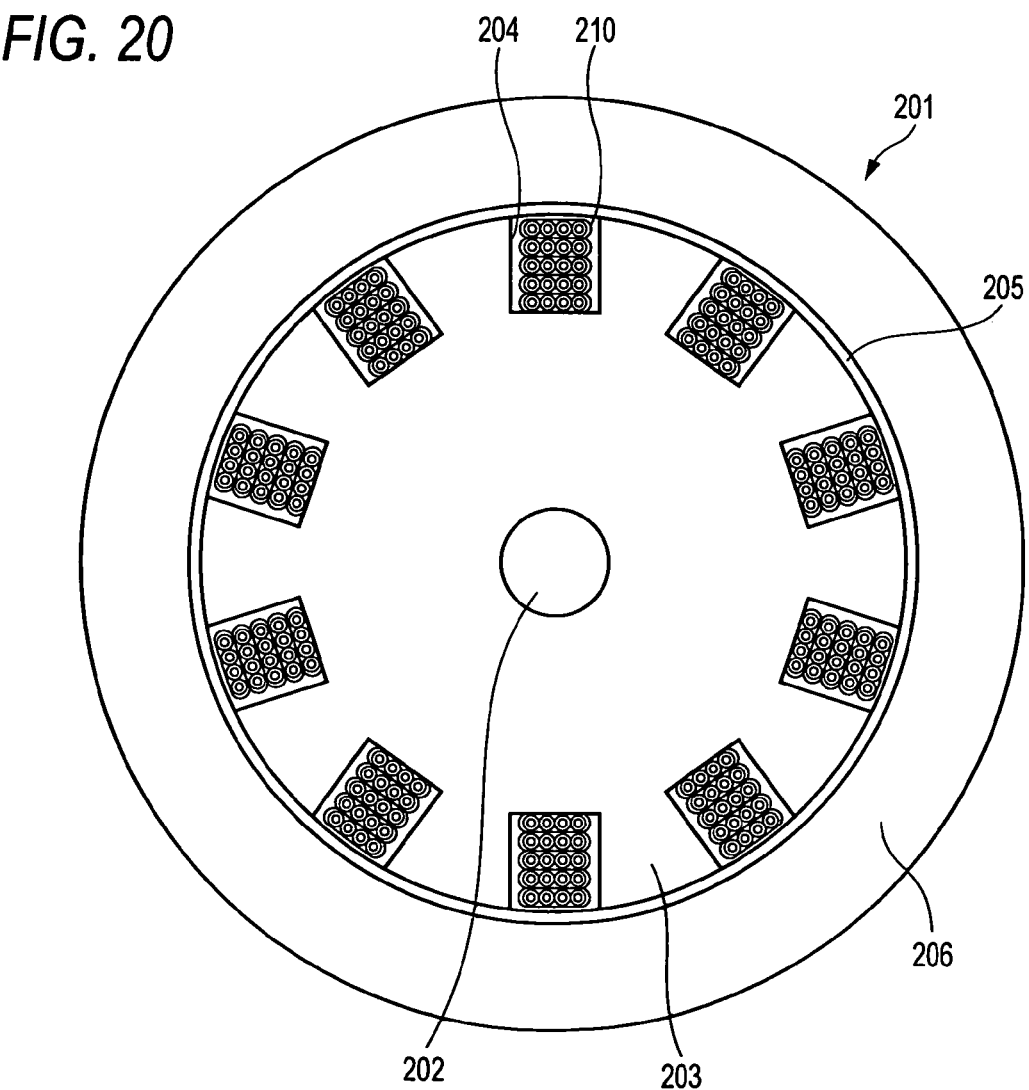
FIG. 20 is a cross-sectional view of an optical fiber cable according to a first embodiment of the present invention.

As shown in FIG. 20, in the optical fiber cable 201 of this embodiment, a plurality of optical fiber ribbons 210 are housed in grooves 204 formed in a spacer 203 having a tensile strength body 202 at the center thereof. The optical fiber cable 201 is a 200-core type optical fiber cable, wherein five sheets of four-fibered optical fiber ribbons 210 are stacked and housed in each one of ten grooves 204. Further, ten grooves 204 are formed spirally in the alternatingly inverted manner in the circumferential direction while maintaining a state in which they are arranged parallel to each other in the longitudinal direction. That is, the spacer 203 is an SZ spacer. Further, the twisting pitch of the grooves 204 is 500 mm. Here, an outer diameter of the spacer 203 is, for example, 12 mm.

Further, to prevent the removal of the optical fiber ribbons 210 from the grooves 204, a press winding 205 is wound around a periphery of the spacer 203 and, at the same time, on an outside of the press winding 205, a sheath 206 made of plastic (for example, polyethylene) is formed. An outer diameter of the sheath 206 is, for example, 16 mm.

Further, the tensile strength body 202 is a tensile strength body which is provided for preventing the direct transfer of

TABLE 9

| No. | inter-fiber thickness g (μm) | thickness t (μm) | Young's modulus of ribbon material (MPa) | elongation of ribbon material (%) | branching property | integration at cabled | loss increase at branching (dB) |
|---|---|---|---|---|---|---|---|
| embodiment 1 | 150 | 5 | 200 | 25 | good | good | 0.2 |
| embodiment 2 | 200 | ↑ | ↑ | ↑ | good | good | ↑ |
| embodiment 3 | 80 | ↑ | ↑ | ↑ | good | good | ↑ |
| embodiment 4 | 150 | 2 | ↑ | ↑ | good | good | ↑ |
| embodiment 5 | ↑ | 10 | ↑ | ↑ | good | good | ↑ |
| embodiment 6 | ↑ | 5 | 800 | ↑ | good | good | ↑ |
| embodiment 7 | ↑ | ↑ | 500 | ↑ | good | good | ↑ |
| embodiment 8 | ↑ | ↑ | 200 | 12 | good | good | ↑ |
| embodiment 9 | ↑ | ↑ | ↑ | 30 | good | good | ↑ |
| embodiment 10 | ↑ | ↑ | 200 | 25 | good | good | 0.05 |
| embodiment 11 | ↑ | ↑ | ↑ | ↑ | ↑ | ↑ | 0.2 |

As shown in Table 9, it is understood that in all experiments, it is possible to obtain the favorable result with respect to both of the branching property and the integrity at the time of forming cables.

Further, in the first experiment, when the PMD of the optical fiber is measured after formation of the cable, the PMD is 0.04 ps/km$^{1/2}$.

Here, in the first experiment to the ninth experiment, the optical fibers in which the mode field diameter at the a tensile strength to the optical fiber ribbons 210 when the tensile strength is applied to the optical fiber cable 201 and a steel wire is used as the tensile strength body 202.

Since the optical fiber cable 201 has the direction that the grooves 204 are twisted periodically inverted and hence, it is possible to easily take out the optical fiber ribbon 210 from an inverted portion of the groove 204 by removing an arbitrary portion of the sheath 620 and the press winding 205. Accordingly, the optical fiber cable 201 using the SZ spacer is the structure suitable for the intermediate post branching.

Here, the mode of the optical fiber ribbon 210 housed in the groove 204 is explained.

As the optical fiber ribbon 210, for example, the optical fiber ribbon 10 shown in FIG. 1A can be used. That is, the optical fiber ribbon 210 is, as shown in FIG. 1A, configured such that a plurality of (four in this embodiment, for example) optical fibers 11 are arranged in parallel and a sheath 12 made of a resin integrally covers the whole outer peripheries of the optical fibers 11 arranged in parallel over the entire length of the optical fibers 11.

Further, since the optical fiber ribbon 210 covers the optical fibers 11 with the sheath 12 made of resin over the entire length of the optical fibers 11, the optical fiber ribbon 210 provides the structure which enables the easy branching of a single fiber from any portion by rupturing or removing the sheath 12 at any position.

Further, with respect to the glass fiber 13, it is favorable that the mode field diameter (MFD) according to the definition of Petermann-I at the wavelength of 1.55 μm is equal to or less than 10 μm. It is more preferable that the mode field diameter (MFD) is equal to or less than 8 μm.

In this manner, since the thickness t of the sheath 12 of the optical fiber ribbon 210 is small, the sheath 12 can be easily peeled off by generating cracks and peeling-off by a manual operation of an operator or using a branching tool. Accordingly, the optical fiber 11 can be easily branched by peeling off the sheath 12 from the optical fiber ribbon 210. That is, the optical fiber ribbon 210 adopts the structure which enables the easy intermediate post branching operation.

With respect to the above-mentioned intermediate post branching method, the branching method which has been explained in conjunction with FIG. 2A to FIG. 2C is used.

Here, the relationship between the operability of the intermediate post branching and the increase of live-line loss during such an operation due to the difference in the thickness of the sheath 12 is shown in Table 10. Further, in Table 10, the polarization mode dispersion (PMD) in a state that the optical fibers are housed in the SZ spacer in the optical fiber cable 201 and the results of the separation experiment showing the strength of integrity of the optical fibers are shown. Here, the outer diameter d of the optical fibers in the optical fiber ribbon shown in Table 10 is 250 μm. Further, the Young's modulus of resin which constitutes the sheath 12 is 900 MPa.

TABLE 10

| ribbon thickness T (μm) | 250 | 251 | 260 | 270 | 275 | 280 | 290 | 300 | 310 | 320 |
|---|---|---|---|---|---|---|---|---|---|---|
| sheath thickness t (μm) | 0.0 | 0.5 | 5 | 10 | 12.5 | 15 | 20 | 25 | 30 | 35 |
| intermediate post branching | very good | very good | good | good | good | good | fair | not good | not good | not good |
| live-line loss increase | good | good | good | good | good | fair | fair | not good | not good | not good |
| SZ cable PMD with or without fiber separation | good / not good | good / good | good / good | good / good | good / good | fair / good | fair / good | fair / good | fair / good | fair / good |

By decreasing the mode field diameter, it is possible to reduce the microbend loss and macrobend loss. Accordingly, it is possible to suppress the increase of transmission loss attributed to an external force which the optical fiber ribbon 210 receives in the groove. Further, since the increase of the transmission loss is small even when the optical fiber 11 is bent with a small bending radius, it is possible to perform the live-line branching easily.

The optical fiber ribbon 210 is formed with a thickness of the sheath 12 which is smaller than a thickness of a sheath of the related-art optical fiber ribbon. Here, assuming a maximum value of thickness of the optical fiber ribbon 210 as T (μm) and an outer diameter of the optical fiber 11 as d (μm), the thickness t of the sheath 12 can be obtained by a formula $t=(T-d)/2$, wherein the thickness of the sheath 12 is set such that the optical fiber ribbon 210 satisfies $T \leq d+40$ (μm), that is, the thickness t of the sheath 12 assumes 20 μm or less.

With the use of the optical fiber ribbon 210 having the thin sheath 12, it is possible to obtain, at a low cost, the optical fiber cable 201 from which the optical fiber ribbon can be extremely easily taken out at an intermediate portion while ensuring the high packing density and mechanical properties which the related-art optical fiber cable adopting the SZ spacer has.

Here, the optical fiber ribbon with the sheath having the thickness t of 0.0 in Table 10 indicates the optical fiber ribbon in which the resin does not cover the whole optical fibers as shown in FIG. 10.

The intermediate post branching property shown in Table 10 indicates the level of easiness for branching with the increase of the transmission loss held at 1.0 dB or less when an intermediate portion of the optical fiber ribbon is branched into respective optical fibers. With respect to the evaluation criteria used in this specification, "very good" means that the branching can be performed within 2 minutes, "good" means that the branching can be performed in an operation time exceeding two minutes and within three minutes and "fair" indicates that the branching can be performed in an operation time exceeding three minutes and within 5 minutes. Further, "not good" indicates that the branching requires an average operation time which exceeds 5 minutes.

Here, the fact that the increase of the transmission loss at the time of branching is equal to or less than 1.0 dB means that the live-line branching can be performed.

Here, the test on the intermediate post branching property is explained.

Figure 21A:
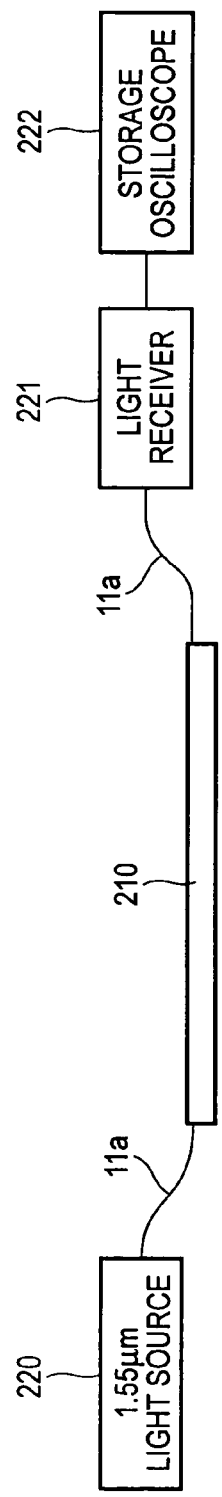
FIG. 21A and FIG. 21B are schematic views showing the manner of intermediate post branching test of an optical fiber ribbon.

First of all, as shown in FIG. 21A, with respect to the optical fiber ribbon 210, in a state that the sheath having a length of approximately 1 m is left, a light source 220 for allowing the incidence of light having a wavelength of 1.55 µm into a first optical fiber 11a is connected to the optical fiber 11a at one end of the optical fiber ribbon 210, while a storage oscilloscope 222 and a light receiver 221 are connected to the optical fiber 11a at the other side of the optical fiber ribbon 210. In this state, the light having a wavelength of 1.55 µm is incident on the first optical fiber 11a from the light source 220. The incident light is transmitted to the other side of the optical fiber 11a and is received by the receiver 221. An received light quantity of the received light is observed by the storage oscilloscope 222 at proper times.

Figure 21B:
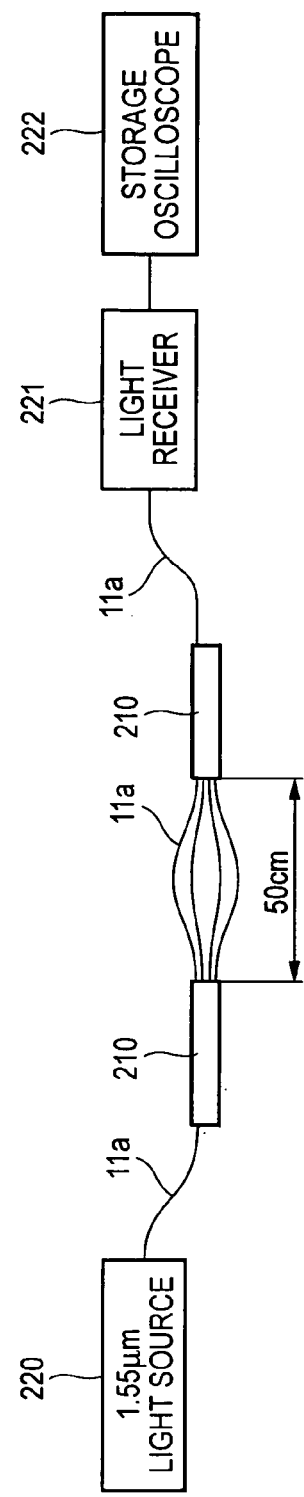

Then, in a state that the incidence of light from the light source 220 is continued, as shown in FIG. 21B, the intermediate post branching of the optical fiber ribbon 210 is performed. That is, the first optical fiber 11a is branched as a single fiber from the optical fiber ribbon 210 in a live-line state (live-line branching). Here, an increased amount (increment) of the transmission loss due to the intermediate post branching is measured by the storage oscilloscope 222.

A length of the optical fiber ribbon 210 which is subjected to the intermediate post branching is set to 50 cm. Further, the method for performing the intermediate post branching is conducted in accordance with the steps explained in conjunction with FIG. 2A to FIG. 2C.

Among the optical fiber ribbons shown in Table 10, the optical fiber ribbons which exhibit the evaluations "very good", "good" and "fair" with respect to the intermediate post branching property have the ribbon thickness of 290 µm or less, that is, satisfy T≦d+40 (µm). All of these optical fiber ribbons can complete the intermediate post branching within five minutes while restricting the increase of the transmission loss at the time of branching to 1.0 dB or less. That is, it is possible to perform the live-line branching within five minutes.

To the contrary, with respect to the related-art optical fiber ribbon having a large thickness of the sheath which exceeds the outer diameter d of the optical fiber by 40 µm, the intermediate post branching property exhibits "not good". That is, the increment of the transmission loss at the time of branching exceeds 1.0 dB or even when the optical fiber can be branched, or the branching operation requires a given time which exceeds five minutes and hence, the live-line branching cannot be performed from a realistic viewpoint.

The increase of live-line loss shown in Table 10 indicates an increase amount (increment) of the transmission loss generated during the intermediate post branching operation. As the evaluation criteria in this specification, "very good" means that the transmission loss is not increased by exceeding 0.1 dB during the branching operation, "good" means that the transmission loss is not increased by exceeding 0.5 dB during the branching operation, and "fair" means that the transmission loss is not increased by exceeding 1.0 dB during the branching operation. Further, "not good" means that increased value of the transmission loss exceeds 1.0 dB during the branching operation.

Among the optical fiber ribbons shown in Table 10, the optical fiber ribbons which exhibit the evaluations "good" and "fair" with respect to the increase of the live-line loss have the ribbon thickness of 290 µm or less, that is, satisfy T≦d+40 (µ) All of these live-line optical fiber ribbons can complete the intermediate post branching while restricting the increase of the transmission loss at the time of branching to 1.0 dB or less. Particularly, with respect to the optical fiber ribbons which have the ribbon thickness T of 275 µm or less, that is, satisfy T≦d+25 (µm), the increase of the live-line loss exhibits "good" and hence, the increase of the transmission loss can be further suppressed to a low level. Accordingly, these optical fibers are more preferable.

To the contrary, with respect to the related-art optical fiber ribbon whose thickness T exceeds the outer diameter d of the optical fiber by 40 µm, the increase of the live-line loss exhibits "not good". Further, the increased value of the transmission loss exceeds 1.0 dB during the branching operation.

The SZ cable PMD shown in Table 10 indicates the link polarization mode dispersion in a state that the optical fiber ribbon 210 is housed in the groove 204 as shown in FIG. 20. Here, the link polarization mode dispersion indicates the maximum value of the PMD which can be generated when the values of polarization mode dispersion (PMD) of all optical fibers 11 which are housed in the optical fiber cable 201 are processed statistically and a large number of equivalent optical fiber cables are connected in series. Here, the statistical process is performed based on the center limit theorem. Further, the measurement of the PMD is performed under the condition that the length of the optical fiber cable 201 is 1000 m or more and uses a measuring equipment based on the interference method (6000B made by Suntec inc).

As the evaluation criteria in this specification, "very good" means that the link polarization mode dispersion (PMD) is equal to or less than 0.05 (ps/km$^{1/2}$), "good" means that the link polarization mode dispersion exceeds 0.05 (ps/km$^{1/2}$) and is equal to or less than 0.1 (ps/km$^{1/2}$), "fair" means that the link polarization mode dispersion exceeds 0.1 (ps/km$^{1/2}$) and is equal to or less than 0.2 (ps/km$^{1/2}$), and "not good" means that the link polarization mode dispersion exceeds 0.2 (ps/km$^{1/2}$).

In the tape slot type optical fiber cable, the optical fiber ribbons are arranged in the groove in a stacked manner and hence, a stress from a fixed direction is generated and birefringence is generated in the optical fibers. Further, the birefringence is also liable to be easily generated also due to the curing shrinking of the sheath of the optical fiber ribbons. The sheath (resin) of the optical fiber ribbon shrinks by approximately 5% due to curing at the time of manufacturing thereof. Due to this curing shrinking, an external force is applied to the optical fiber and a stress is generated in the inside of the optical fiber. However, the optical fiber ribbon has a cross-sectional shape which is broadened in a widthwise direction and hence, the stress differs between the widthwise direction and the thickness direction. Particularly, the sheath arranged in the thickness direction of the optical fiber ribbon with respect to the optical fibers is contiguously formed in the widthwise direction of the optical fiber ribbon and hence, when the thickness of the sheath at these portions is large, the stress which is generated in the widthwise direction is increased whereby the difference in stress in the widthwise direction and the thickness direction is increased.

In this manner, in the tape slot type optical fiber cable, the PMD is liable to be easily increased. Particularly, with respect to the optical fiber cable using the SZ spacer, the optical fiber is bent in a complicated manner due to the inverted groove shape and hence, a tendency that the PMD is easily increased is observed.

In this embodiment, the optical fiber ribbon having the thinner sheath than the related-art optical fiber ribbon is used, the birefringence which is generated due to curing shrinking can be suppressed to an extremely small value. Accordingly, the optical fiber cable of this embodiment can suppress the PMD to a low level.

Among the optical fiber ribbons shown in Table 10, when the optical fiber cable satisfies T≦d+25 (µm), the SZ cable PMD becomes "good" and hence, it is understood that this optical fiber cable is particularly favorable.

The presence or non-presence of fiber separation shown in Table 10 shows the result of a separation test which indicates the strength of integrity of the optical fibers.

Figure 22:
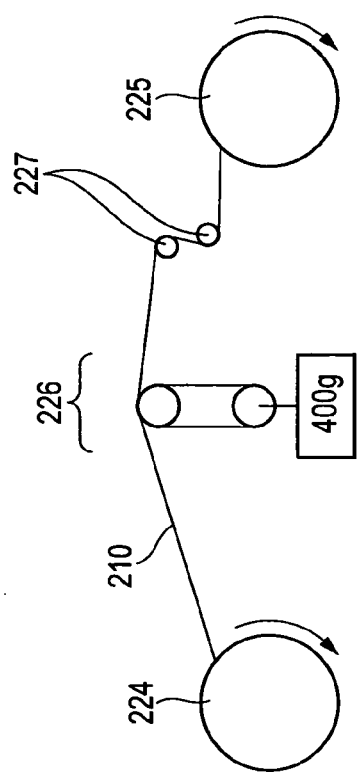
FIG. 22 is a schematic view showing the manner of a separation test of an optical fiber ribbon.

In this separation test, as shown in FIG. 22, from a pay-off bobbin 224 around which the optical fiber ribbon 210 which constitutes an object to be tested is wound, the optical fiber ribbon 210 is fed to and is wound around a winding bobbin 225, and an external force is applied to the optical fiber ribbon 210 in the course of a pass line. The external force applied to the optical fiber ribbon 210 is generated by giving a fixed tension to the optical fiber ribbon 210 by means of a weight loading part 226 which is constituted of a dancer roller and a weight and, at the same time, by imparting bending of a small diameter to the optical fiber ribbon 210 in the reverse direction using two rods 227 having a diameter of 3 mm.

As the evaluation criteria on the separation of fibers in this specification, "good" means that there is no separation between the optical fiber and the sheath (resin) and the optical fiber ribbon is held in an integrated form in the longitudinal direction, and "not good" means that there arise a portion where the optical fiber and the sheath (resin) are separated from each other.

Among the optical fiber ribbons shown in Table 10, when the optical fiber ribbons satisfy the relationship $T \geq d+1$ (μm), the separation of the optical fiber ribbon is not generated and hence, the optical fibers are favorable. That is, it is found that when the thickness t of the sheath is equal to or more than 0.5 μm, the optical fiber cable can have the sufficient strength to integrate the respective optical fibers.

Among the optical fiber ribbons shown in Table 10, the optical fiber ribbon which satisfies the relationship T=d (see FIG. 10) generates the separation portions in the separation experiment. However, by taking the fact that the external force such as ironing which is applied to the optical fiber ribbons is reduced in the line at the time of manufacturing the optical fiber cable into consideration, it is possible to prevent the drawback that the separation of ribbon occurs in the manufacturing step for forming the optical fibers into a cable. Further, with respect to the optical fiber ribbon which satisfies the relationship T=d, since the sheath is substantially eliminated at the portion in the thickness direction of the optical fiber ribbon which passes the centers of the respective optical fibers, the respective optical fibers can be easily peeled off in the widthwise direction of the optical fiber ribbon and hence, the intermediate post branching can be perform favorably compared to the optical fiber ribbon having a shape which covers the whole of respective optical fibers with the sheath.

With respect to the optical fiber ribbon 10A shown in FIG. 10 in which the resin 12aA does not cover the whole of respective optical fibers 11A, the respective optical fibers 11A are integrated by merely using an adhesive strength between the resin 12aA and the optical fibers. To the contrary, with respect to the optical fiber ribbon 10 shown in FIG. 1A, the resin integrally covers the whole of respective optical fibers 11 with the resin which constitutes the sheath 12 and hence, the optical fiber ribbon 10 easily maintains a state in which the whole of the optical fiber ribbon 10 is integrated due to a force which intends to hold the shape of the sheath 12 per se besides the adhesive strength between the resin and the optical fibers.

Further, in the above-mentioned optical fiber ribbon (see FIG. 1A), by setting the ratio between the product of Young's modulus E and the cross-sectional area S of the sheath (resin) 12 and the sum of products of the Young's moduli E and the cross-sectional areas S of the respective optical fibers 11 to a proper value, the PMD can be reduced. An amount of stress which acts on the optical fiber 11 when the sheath 12 generates the curing shrinking is increased corresponding to the increase of the Young's modulus of the resin which constitutes the sheath 12 and the increase of the thickness of the sheath 12. Here, a cause which brings about the increase of the PMD is a strain which is generated in the glass fiber 13 of the optical fiber 11. An amount of strain is determined based on an amount of force which reaches the glass fiber 13 through a coating layer including a primary protective coating 14, a second protective coating 15 and a color layer and the Young's modulus of the glass fiber 13.

Then, the relationship between the ES product ratio of the sheath 12 with respect to the optical fibers 11 and the SZ cable PMD is reviewed under the respective conditions that the Young's modulus of the sheath 12 assumes 700 MPa, 900 MPa, 1200 MPa and 1500 MPa respectively when the thickness T of the optical fiber ribbon 210 differ, that is, when the thickness of the sheath 12 differs.

Here, the glass fiber 13 has the Young's modulus of 73000 MPa and has the outer diameter of 125 μm. The primary protective coating 14 has the Young's modulus of 1 MPa and has the outer diameter of 200 μm. The secondary protective coating 15 has the Young's modulus of 700 MPa and has the outer diameter of 240 μm. The color layer has the Young's modulus of 1500 MPa and has the outer diameter of 250 μm.

The relationship between the ES product ratio and the SZ cable PMD when the Young's modulus of the sheath 12 is 700 MPa is shown in Table 11.

TABLE 11

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| Resin ES product (N) | 10.264 | 10.789 | 12.014 | 12.889 | 13.764 | 14.639 | 16.389 |
| ES product ratio | 0.0113 | 0.0118 | 0.0132 | 0.0141 | 0.0151 | 0.160 | 0.0180 |
| SZ cable PMD | good | good | good | good | good | fair | fair |

The relationship between the ES product ratio and the SZ cable PMD when the Young's modulus of the sheath 12 is 900 MPa is shown in Table 12.

TABLE 12

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| Resin ES product (N) | 13.196 | 13.871 | 15.446 | 16.571 | 17.696 | 18.821 | 21.071 |
| ES product ratio | 0.0145 | 0.0152 | 0.0169 | 0.0182 | 0.0194 | 0.0206 | 0.0231 |
| SZ cable PMD | good | good | good | good | good | fair | fair |

The relationship between the ES product ratio and the SZ cable PMD when the Young's modulus of the sheath 12 is 1200 MPa is shown in Table 13.

TABLE 13

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| Resin ES product (N) | 17.595 | 18.495 | 20.595 | 22.095 | 23.595 | 25.095 | 28.095 |
| ES product ratio | 0.0193 | 0.0203 | 0.0226 | 0.0242 | 0.0259 | 0.0275 | 0.0308 |
| SZ cable PMD | good | fair | fair | fair | fair | not good | not good |

The relationship between the ES product ratio and the SZ cable PMD when the Young's modulus of the sheath 12 is 1500 MPa is shown in Table 14.

TABLE 14

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| Resin ES product (N) | 21.994 | 23.119 | 25.744 | 27.619 | 29.494 | 31.369 | 35.119 |
| ES product ratio | 0.0241 | 0.0253 | 0.0282 | 0.0303 | 0.0323 | 0.0344 | 0.0385 |
| SZ cable PMD | fair | fair | not good | not good | not good | not good | not good |

Here, the fiber ES product shown in Table 11 to Table 14 is the sum of respective ES products of regions which are constituted of the glass fiber 13, the primary protective coating 14, the secondary protective coating 15 and the color layer, 10 while the resin ES product is an ES product of the sheath 12. The ES product ratio can be expressed as "resin ES product/fiber ES product".

As shown in Table 11 to Table 14, the condition that the SZ cable PMD obtain "good" or "fair", that is, the condition that the link PMD of all fibers of the optical fibers housed in the optical fiber cable having the SZ spacer assumes 0.2 $(ps/km^{1/2})$ is a case that the ES product ratio assumes a value equal to or less than 0.026. Further, the condition that the SZ cable PMD obtain "very good", that is, the condition that the link PMD of all fibers of the optical fibers housed in the optical fiber cable having the SZ spacer assumes 0.1 $(ps/km^{1/2})$ is a case that the ES product ratio assumes a value equal to or less than 0.020.

In this manner, by setting the ES product ratio of the sheath 12 with respect to the optical fibers 11 to a given value, it is possible to suppress the PMD of the optical fibers 11 to a low level.

Further, as the optical fiber ribbon 210 which is housed in the optical fiber cable according to the first embodiment of the present invention, the optical fiber ribbon 110 shown in FIG. 11A can be named. That is, with respect to the optical fiber ribbon 210, recessed portions 16 are formed in the sheath 12 in conformity with the indentations formed between the neighboring optical fibers 111, 111. In the sheath 112 which covers the optical fibers 111, the recessed portion 116 includes a bottom portion 117 as a portion having the largest indentation.

As described above, the thickness of the sheath which is formed on the periphery of the optical fiber 11 is preferably small from a viewpoint of reduction of the PMD and it is more preferable that the thickness of the sheath 12 is approximately 0.5 µm. However, in manufacturing such an optical fiber ribbon actually, it is preferable that a certain degree of thickness is ensured. The reason is that in an attempt to make the thickness of the resin which constitutes the sheath thin, there is a possibility that the resin is not applied partially (this phenomenon being referred to as "shortage of resin". Accordingly, it is preferable to form the sheath having a thickness of 2.5 µm or more with respect to the optical fibers 111. In this case, to reduce an amount of the resin in the thickness direction of the optical fiber ribbon while ensuring a given sheath thickness, the sheath formed between the indentation of the neighboring optical fibers may be reduced. Portions where the shortage of resin is liable to occur are portions where the outer diameter of the optical fiber assumes the largest value in the thickness direction of the optical fiber ribbon and hence, the reduction of an amount of the resin between the neighboring optical fibers does not obstruct the reliable coating of the resin.

Accordingly, the formation of the recessed portions 116 as shown in FIG. 11A can suppress the increase of the PMD while preventing the shortage of resin.

Further, the recessed portions 116 formed in the sheath 112 are effective in branching the optical fibers 111 by peeling off the sheath 112 from the optical fiber ribbon 210. The larger the number of portions where the sheath 112 is thin, the rupture of the sheath 112 is liable to occur and hence, the branching operation can be performed easily. Further, since the branching operation can be performed easily, an external force imparted to the optical fiber can be made small during the branching operation and hence, the increase of the live-line branching loss can be suppressed to a minimum amount.

In the optical fiber ribbon 110 shown in FIG. 11A, the depth Y of the recessed portions 116 is set shorter than a distance between the common tangent S1 of the sheath 112 and the common tangent S2 of the respective optical fibers 111. That is, the recessed portion 116 is formed such that the position of the bottom portion 117 is disposed outside the common tangent S2 of the respective optical fibers 111.

Further, it is possible to use the optical fiber ribbon 110A shown in FIG. 13A which is another embodiment obtained by partially modifying the constitution of the optical fiber ribbon 110 shown in FIG. 11A.

In FIG. 13A, the sheath 112A which covers the outer peripheries of the optical fibers 111A is formed into a recessed or corrugated shape in conformity with the indentation formed between the neighboring optical fibers 111A. In this case, the recessed portions 116A formed in the sheath are made deeper than the recessed portions 116 shown in FIG. 11A. That is, the optical fiber ribbon 110A is formed such that the bottom portions 117A of the recessed portions 116A are positioned inside the common tangent S2A of the optical fibers 111A.

Here, in housing the optical fiber ribbon in the groove shown in FIG. 20, the distance from the center of the spacer differs between the optical fiber which is positioned at the end portion in the widthwise direction of the optical fiber ribbon and the optical fiber which is positioned inside the former optical fiber. Accordingly, in the state that the optical fibers are housed in the inside of the spirally formed groove, the difference in length arises in the inside of the groove between the optical fiber at the end portion and the optical fiber at the inside and hence, a stress is generated in the optical fibers. This stress imparts the anisotropic stress to the glass fiber together with a stress generated by bending of the optical fibers in the groove and hence, the birefringence is generated and this becomes a cause of the increase of the PMD.

To the contrary, in the optical fiber ribbon 110A shown in FIG. 13A, the recessed portions are formed in the sheath and hence, as shown in FIG. 14, the optical fiber ribbon 110A is easily deflectable in the widthwise direction. Accordingly, when the optical fiber ribbon 110A is housed in the groove, no excessive force is imparted to the optical fiber ribbon 110A and hence, the difference in length in the inside of the groove which is generated between the optical fiber at the end portion and the optical fiber at the inside is resolved whereby it is considered that the cable PMD can be improved. Further, the sheath 112A of the optical fiber ribbon 110A approximates a circular shape along the outer peripheries of the optical fibers 111A and hence, the anisotropy of the curing shrinking stress of the sheath 12A which may occur in manufacturing the optical fiber ribbon 110A can be reduced whereby it is considered that the reduction of the PMD of the optical fiber ribbon 110A in a cable state can be enhanced. Here, this advantageous effect is also obtained by the optical fiber ribbon 110 shown in FIG. 11A, the optical fiber ribbon 110A having the deeper recessed portions can exhibit the advantageous effect more apparently.

Here, with respect to the depth of the recessed portions formed in the sheath shown in FIG. 11 and FIG. 13A, the prevention of separation of the optical fiber at the time of manufacturing the optical fiber ribbon by arranging a plurality of optical fibers in parallel and by integrating them using the sheath, the prevention of peeling-off of the sheath (becomes a cause of separation of the optical fibers) at the time of performing the installation operation of the optical fiber ribbon, or the increase or decrease of transmission loss during the favorable branching operation or the live-line branching are reviewed. As a result, it is found that it is preferable that the recessed portions are formed such that the recessed portions do not exceed the common tangent which is formed by the neighboring optical fibers. That is, it is found that it is favorable that the recessed portions are formed at the inner side than the common tangent.

The result of the review is specifically explained hereinafter.

With respect to cases in which the thickness T(µm) of the optical fiber ribbon is set to 270 µm, 280 µm and 290 µm, a ratio t/Y which is a ratio of the thickness t(µ) of the sheath with respect to the depth Y(m) of the recessed portion and a ratio g/d which is a ratio of thickness g(µm) of the optical fiber ribbon at the recessed portion with respect to the outer diameter d(µm) of the optical fiber when the depth Y(µm)of the recessed portion differs are calculated, and the intermediate post branching property, the increase of live-line loss and the SZ cable PMD in respective cases are reviewed.

The relationship among the intermediate post branching property, the increase of live-line loss and the SZ cable PMD when the thickness T of the optical fiber ribbon is 270 µm is shown in Table 15. Here, the ratio (T−d)/2Y in the table is an equivalent value as t/Y.

TABLE 15

| ribbon thickness T (μm) | 270 | 270 | 270 | 270 | 270 | 270 | 270 | 270 | 270 |
|---|---|---|---|---|---|---|---|---|---|
| sheath thickness t (μm) | 10 | 10 | 10 | 10 | 10 | 10 | 10 | 10 | 10 |
| recessed portion depth Y (μm) | 1 | 2 | 5 | 10 | 20 | 30 | 40 | 50 | 100 |
| ratio (T-d)/2Y | 10 | 5 | 2 | 1 | 0.5 | 0.333 | 0.25 | 0.2 | 0.1 |
| ratio (g/d) | 1.072 | 1.064 | 1.04 | 1 | 0.92 | 0.84 | 0.76 | 0.68 | 0.28 |
| intermediate post branching property | good | good | very good | very good | very good | very good | very good | very good | very good |
| live-line loss increase | good | good | good | very good | very good | very good | very good | very good | very good |
| SZ cable PMD | good | good | good | good | good | good | very good | very good | very good |

The relationship among the intermediate post branching property, the increase of live-line loss and the SZ cable PMD when the thickness T of the optical fiber ribbon is 280 μm is shown in Table 16.

TABLE 16

| ribbon thickness T (μm) | 280 | 280 | 280 | 280 | 280 | 280 | 280 | 280 | 280 |
|---|---|---|---|---|---|---|---|---|---|
| sheath thickness t (μm) | 15 | 15 | 15 | 15 | 15 | 15 | 15 | 15 | 15 |
| recessed portion depth Y (μm) | 1 | 2 | 5 | 10 | 20 | 30 | 40 | 50 | 100 |
| ratio (T-d)/2Y | 15 | 7.5 | 3 | 1.5 | 0.75 | 0.5 | 0.375 | 0.3 | 0.15 |
| ratio (g/d) | 1.112 | 1.104 | 1.08 | 1.04 | 0.96 | 0.88 | 0.8 | 0.72 | 0.32 |
| intermediate post branching property | good | good | very good | very good | very good | very good | very good | very good | very good |
| live-line loss increase | fair | fair | fair | good | very good | very good | very good | very good | very good |
| SZ cable PMD | fair | fair | fair | fair | good | good | very good | very good | very good |

The relationship among the intermediate post branching property, the increase of live-line loss and the SZ cable PMD when the thickness T of the optical fiber ribbon is 290 μm is shown in Table 17.

TABLE 17

| ribbon thickness T (μm) | 290 | 290 | 290 | 290 | 290 | 290 | 290 | 290 | 290 |
|---|---|---|---|---|---|---|---|---|---|
| sheath thickness t (μm) | 20 | 20 | 20 | 20 | 20 | 20 | 20 | 20 | 20 |
| recessed portion depth Y (μm) | 1 | 2 | 5 | 10 | 20 | 30 | 40 | 50 | 100 |
| ratio (T-d)/2Y | 20 | 10 | 4 | 2 | 1 | 0.667 | 0.5 | 0.4 | 0.2 |
| ratio (g/d) | 1.152 | 1.144 | 1.12 | 1.08 | 1 | 0.92 | 0.84 | 0.76 | 0.36 |

TABLE 17-continued

| | | | | | | | | | |
|---|---|---|---|---|---|---|---|---|---|
| intermediate post branching property | fair | fair | good | good | very good | very good | very good | very good | very good |
| live-line loss increase | fair | fair | fair | fair | fair | fair | fair | fair | fair |
| SZ cable PMD | fair | fair | fair | fair | good | good | good | very good | very good |

As shown in Table 15 to Table 17, in any one of the intermediate post branching property, the increase of live-line loss and the SZ cable PMD, the larger the depth Y of the recessed portions, the favorable results are obtained.

Further, when the thickness T of the optical fiber ribbon is either 270 μm or 280 μm, that is, when the thickness T of the optical fiber ribbon satisfies T≦d+30 (μm), it is possible to obtain the particularly favorable results with respect to the intermediate post branching property, the increase of live-line loss. The reason is considered that when the branching tools shown in FIG. 12A to FIG. 12C are used, due to the advantageous effects of the recessed portions, the branching property is improved than the optical fiber ribbon which merely reduces the thickness of the sheath. For example, while the evaluation of the intermediate post blanching property is "good" when the ribbon thickness T is set to 270 μm as shown in Table 10, the evaluation of the intermediate post blanching property is "very good" when the ribbon thickness is set to 280 μm and the depth Y of the recessed portions is set to 5 μm as shown in Table 16 and hence, the advantageous effect of the recessed portion can be confirmed.

Further, to focus on the intermediate post branching property, it is understood that the intermediate post branching property is particularly associated with the value of the ratio (T−d)/2Y. For example, when the ratio (T−d)/2Y is equal to or less than 4, it is possible to obtain the favorable intermediate post branching property.

Further, to focus on the SZ cable PMD, it is understood that the SZ cable PMD is particularly associated with the value of the ratio g/d. For example, when the ratio g/d is equal to or less than 1.0, that is, when the bottom portion is inside the common tangent, it is possible to obtain the remarkable PMD suppression effect while sufficiently reducing an amount of the resin.

When the ratio g/d is equal to or less than 1.0, the sheath is thin to prevent the bottom portion from being disposed outside the common tangent and hence, the sheath is easily bendable in the longitudinal direction and, at the same time, the recessed portion is deep and hence, the deflection shown in FIG. 14 is easily generated whereby it is considered that the cable PMD can be effectively suppressed.

Further, when the ratio g/d is equal to or less than 0.8, the PMD in a state that the optical fibers is housed in the spacer can be further effectively suppressed.

In general coating of the optical fibers, the primary protective coating which exhibits the low Young's modulus covers the periphery of the glass fiber and the outer periphery of the primary protective coating is covered with the secondary protective coating and the color layer having the high Young's modulus. Further, the outer diameter of the primary protective coating is approximately 0.8 times as large as the thickness of the outer diameter d of the optical fiber. Then, when the resin in the recessed portion is in a range which does not exceed the primary protective coating, the sheath is liable to be easily deformed and hence, the deflection shown in FIG. 14 is easily generated. Accordingly, the PMD can be further suppressed.

In the optical fiber ribbon having the recessed portions shown in FIG. 11A and FIG. 13A, it is desirable that the recessed portions of the sheath are formed in a smooth curved shape R. This is because, for example, when the recessed portions have bottom portions thereof formed in an acute shape along the shape of the optical fiber ribbon, a stress is concentrated on the bottom portions of the recessed portions and hence, ruptures and cracks are liable to be easily generated.

Further, in the optical fiber ribbon used for the optical fiber cable according to the present invention shown in FIG. 1A, FIG. 10, FIG. 11A and FIG. 13A, the adhesive strength between the optical fiber and the sheath sometimes affects the increase of the transmission loss and the live-line operation efficiency at the time of performing the live-line branching. With respect to the adhesive strength of the optical fiber and the sheath (resin), to take the prevention of the increase of the transmission loss and the branching operability into consideration, it is favorable that the adhesive strength per one optical fiber falls within a range 0.245 (mN) to 2.45 (mN) When the above-mentioned adhesive strength is smaller than the above-mentioned range, there may arise a case that the sheath is ruptured at the time of being formed into a cable and the optical fibers are separated from each other. On the other hand, when the adhesive strength is larger than the above-mentioned range, the branching property is deteriorated.

Here, the adhesive strength between the optical fiber and the sheath is measured using the above-mentioned method explained in conjunction with FIG. 5 and FIG. 6.

In the optical fiber ribbon used in the present invention, when the main object of the invention lies in that the optical fibers keep the integrity without being separated from each other, it is favorable that the thickness of the sheath is equal to or more than 0.5 μm. In this case, the maximum thickness T of the optical fiber ribbon becomes T≧outer diameter of the optical fiber d+1 (μm).

Also depending on the properties of the sheath of the optical fiber ribbon, in some cases, these properties affect the increase of the transmission loss and the branching operation efficiency at the live-line branching. It is preferable that the yield point stress, as the property of material of the sheath, falls within a range of 20 MPa to 45 Mpa. This is because that the branching operation can be performed easily and the transmission loss at the time of performing the live-line branching can be suppressed. In accordance with JIS K7113, the yield point stress is measured with respect to a No.2 test piece at a tension speed of 50 mm/minute. When the yield point stress is less than 20 MPa, there arises a case in which the respective optical fibers are separated by an external force which is applied to the optical fibers during a step of assembling the optical fiber ribbons to form a cable and hence, the cable cannot be formed. On the other hand, when the yield point stress exceeds 45 MPa, it is difficult to rupture the sheath and hence, the intermediate post branching of the optical fiber ribbon is hard to perform.

Further, in this embodiment, with respect to the optical fiber cable 201 shown in FIG. 20, the transmission loss value and the polarization mode dispersion (PMD) value at a wavelength of 1.55 μm are measured. Further, an amount of increase (increment) of the transmission loss at the time of performing the intermediate post branching is measured.

Here, the optical fiber ribbon used here is the optical fiber ribbon 110A shown in FIG. 13A and a thickness T of the optical fiber ribbon 11A is 260 μm. The outer diameter d of the optical fiber 11A is 250 μm. Further, the thickness t of the sheath is 5 μm and the depth Y of the recessed portions is 30 μm. The thickness g of the optical fiber ribbon at the recessed portions is 200 μm.

However, among the optical fibers which are integrated as the optical fiber ribbon, 100 fibers are selected from optical fibers which conform to G652 and the remaining 100 fibers have the mold filed diameter of equal to or less than 10 μm.

With respect to the transmission loss value of the optical fibers in a state that they are housed in the optical fiber cable 201, the optical fibers which conform to G652 exhibit the maximum value of 0.23 dB/km and the average value of 0.21 dB/km, while the optical fibers whose mode field diameter is 10 μm or less exhibit the maximum value of 0.21 dB/km and the average value of 0.20 dB/km.

Further, with respect to the polarization mode dispersion value, the optical fibers which conform to G652 exhibit the average value of 0.025 (ps/km$^{1/2}$), the standard deviation of 0.020 (ps/km$^{1/2}$) and the link PMD of 0.046 (ps/km$^{1/2}$), while the optical fibers whose mode field diameter is 10 μm or less exhibit the average value of 0.022 (ps/km$^{1/2}$), the standard deviation of 0.018 (ps/km$^{1/2}$) and the link PMD of 0.042 (ps/km$^{1/2}$).

In this manner, with respect to the transmission loss and the PMD of the optical fibers after being formed into the cable, the optical fibers whose mode field diameter is 10 μm or less exhibit the more favorable characteristics.

Further, as mentioned above, the optical fiber cable adopting the SZ spacer exhibits the favorable intermediate post branching property. Accordingly, this optical fiber cable is, in many cases, used as a subscriber-system communication path which connects between a station and an ordinary subscriber. Accordingly, the length of the optical fiber cable adopting the SZ spacer is, in many cases, shorter than the optical fiber cable for a relay system which connects stations and is several tens km at the longest. However, when one optical fiber is allocated to one subscriber from the station to the subscribers, in case the number of the subscribers is large, the optical fiber cable capable of housing a large number of optical fibers becomes necessary and hence, the diameter of the optical fiber cable becomes large-sized. This situation is not favorable in installing the optical fiber cable in a conduit. Accordingly, the wavelength division multiplexing (WDM) technique which superposes signals of many subscribers in one optical fiber is effective and there exists a strong demand for an optical fiber cable which can transmit signals at a high speed.

As in the case of the optical fiber cable according to the present invention, when the link PMD is equal to or less than 0.2 (ps/km$^{1/2}$), the transmittable distance becomes 156 km in case the transmission rate is 400 Gbps and hence, it is possible to ensure a sufficient communication quantity to the subscriber system.

Further, when link PMD is equal to or less than 0.1 (ps/km$^{1/2}$), the transmittable distance becomes 625 km in case the transmission rate is 40 Gbps and the transmittable distance becomes 156 km in case the transmission rate is 80 Gbps and hence, it is more preferable.

Figure 23:
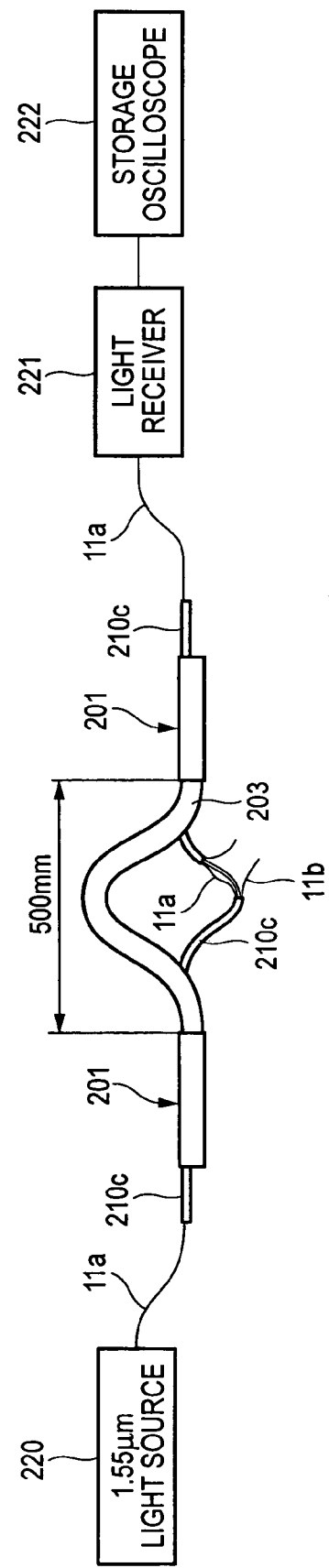
FIG. 23 is a schematic view showing the manner of performing test an intermediate post branching operation of an optical fiber ribbon from an optical fiber cable.

Here, the method for measuring the transmission loss by performing the intermediate post branching from the optical fiber cable is explained in conjunction with FIG. 23.

First of all, as shown in FIG. 23, out of an arbitrary optical fiber ribbon, a light source 220 for allowing the incidence of light having a wavelength of 1.55 μm into a first optical fiber 11a is connected to the optical fiber 11a at one end side of the optical fiber cable 201, while a light receiver 221 and a storage oscilloscope 222 are connected to the optical fiber 11a at the other side of the optical fiber cable 201. In this state, a light having a wavelength of 1.55 m is incident on the first optical fiber 11a from the light source 220. The incident light is transmitted to the other side of the optical fiber 11a and is received by the receiver 221. An received light quantity of the received light is observed by the storage oscilloscope 222 at proper times.

Then, in a state that the incidence of light from the light source 220 is continued, the sheath and the press winding are removed at an intermediate portion of the optical fiber cable 201 by a length of approximately 500 mm, a spacer 203 is bent while being twisted and the optical fiber ribbon 10c including the optical fiber 11a on which the light of the light source 220 is incident is taken out from the groove. Then, the optical fiber ribbon 10c is branched into a plurality of single fibers and a fourth fiber 11b is cut. Here, the method for branching the optical fiber ribbon 10c is performed in accordance with the above-mentioned steps explained in conjunction with FIG. 2A to FIG. 2C.

The measurement of the transmission loss is performed by observing the steps ranging from the removal of the sheath from the optical fiber cable 201 to the completion of the operation using the storage oscilloscope 222.

As a result, the increase of the transmission loss of 1.0 dB or more is not recognized with respect to the optical fibers which conform to the G652, while the increase of the transmission loss of 0.5 dB or more is not recognized with respect to the optical fibers whose mode field diameter is equal to or below 10 μm.

Further, the experiment is performed with respect to another mode of the optical fiber cable according to the present invention in the same manner as the above-mentioned optical fiber cable 201.

Although the optical fiber cable 201 shown in FIG. 20 is the optical fiber cable having the SZ spacer, the transmission loss value and the polarization mode dispersion (PMD) value at a wavelength of 1.55 m are measured with respect to the 200 fibered type optical fiber cable (not shown in the drawing) having a spacer twisted in one direction. Further, an amount of increase (increment) of the transmission loss at the time of performing the intermediate post branching is measured.

The optical fiber cable which is an object of the experiment is substantially equal to the optical fiber cable 201 whose cross-section is shown in FIG. 20, wherein a diameter of the spacer is 12 mm and a diameter of the sheath is 16 mm. A tensile strength body which is arranged at the center is made of a steel wire and ten grooves are formed spirally in one direction along the longitudinal direction in a state that the grooves are arranged parallel to each other. The twisting direction of the grooves is the left twisting and the twisting pitch is 500 mm.

Here, the optical fiber ribbon used here is equal to the optical fiber ribbon of the above-mentioned optical fiber cable 201. However, all of 200 fibers are formed of optical fibers which conform to G652.

With respect to the transmission loss value of the optical fibers in a state that they are housed in the optical fiber cable 201, the optical fibers exhibit the maximum value of 0.22 dB/km and the average value of 0.20 dB/km. Further, with respect to the polarization mode dispersion value, the average value is 0.027 (ps/km$^{1/2}$), the standard deviation is 0.021 (ps/km$^{1/2}$) and the link PMD is 0.048 (ps/km$^{1/2}$).

Further, in the intermediate post branching experiment which is substantially similar to the above-mentioned optical fiber cable 201, the increase of the transmission loss of 1.0 dB or more is not recognized.

Figure 24:
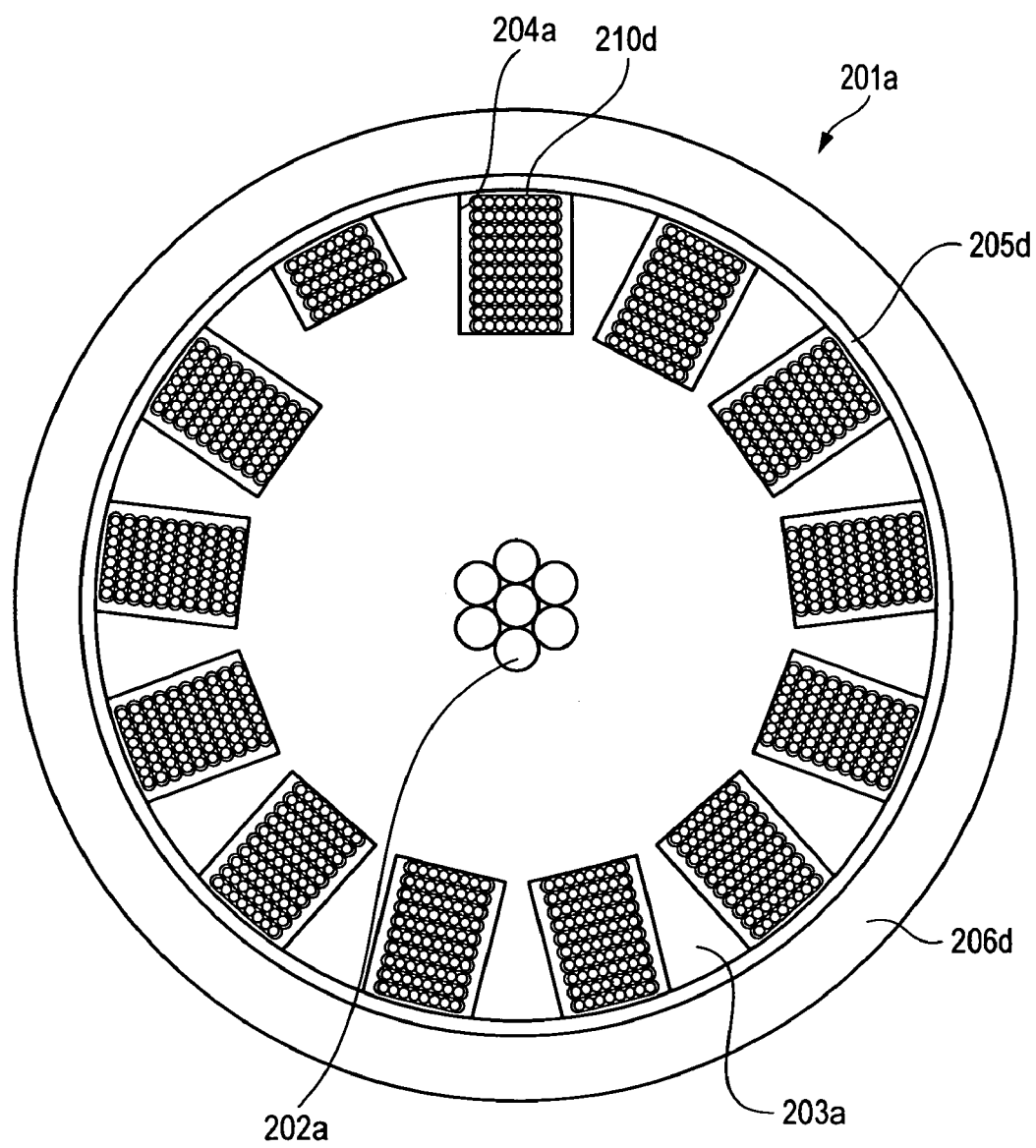
FIG. 24 is a cross-sectional view showing another optical fiber cable according to the first embodiment of the present invention.

Further, the experiment is performed with respect to another mode of the optical fiber cable according to the present invention shown in FIG. 24 in the same manner as the above-mentioned optical fiber cable 201.

Although the optical fiber cable 201 shown in FIG. 20 is the 200-fibered optical fiber cable having the SZ spacer, the optical fiber cable shown in FIG. 24 is an 1000-fibered optical fiber cable 201a having a slot twisted in one direction. The transmission loss value and the polarization mode dispersion (PMD) value at a wavelength of 1.55 µm are measured with respect to this optical fiver cable 201a. Further, an amount of increase (increment) of the transmission loss at the time of performing the intermediate post branching is measured.

In the optical fiber cable 201a which is an object of the experiment, a diameter of a spacer 203a is 23 mm and an outer diameter of a sheath 206d is 28 mm. A tensile strength body which is arranged at the center is made of seven steel wires 202a which are twisted spirally and thirteen grooves 204a are formed spirally in one direction along the longitudinal direction in a state that the grooves are arranged in parallel to each other. Among thirteen grooves 204a, ten sheets of optical fiber ribbons 210d are housed in each one of twelve grooves in a stacked manner, while five sheets of optical fiber ribbons 210d are housed in one remaining groove 204a which is formed with a small depth in a stacked manner. The twisting direction of the grooves 204a is the left twisting and the twisting pitch is 500 mm.

Here, each optical fiber ribbon 210d which is housed in the optical fiber cable 210a is an eight-fibered optical fiber ribbon 210d shown in FIG. 25. This eight-fibered optical fiber ribbon 210d is manufactured by modifying the four-fibered optical fiber ribbon 110A shown in FIG. 13A. Further, among the housed 10000-fibered optical fibers, 500-fibered optical fibers are formed of optical fibers which conform to the G652 and remaining 500-fibered optical fibers are formed of optical fibers whose mode field diameter is equal to or less than 10 µm.

With respect to the transmission loss value of the optical fibers in a state that they are housed in the optical fiber cable 201a, the optical fibers which conform to G652 exhibit the maximum value of 0.22 dB/km and the average value of 0.20 dB/km, while the optical fibers whose mode field diameter is equal to or less than 10 µm exhibit the maximum value of 0.21 dB/km and the average value of 0.19 dB/km, Further, with respect to the polarization mode dispersion value, the optical fibers which conform to G652 exhibit the average value of 0.020 (ps/km$^{1/2}$), the standard deviation of 0.015 (ps/km$^{1/2}$) and the link PMD of 0.042 (ps/km$^{1/2}$), while the optical fibers whose mode field diameter is equal to or less than 10 µm exhibit the average value of 0.026 (ps/km$^{1/2}$), the standard deviation of 0.018 (ps/km$^{1/2}$) and the link PMD of 0.044 (ps/km$^{1/2}$).

Further, in the intermediate post branching experiment which is substantially similar to the above-mentioned optical fiber cable 201 (however, the sheath 6d removal length being 750 mm), the increase of the transmission loss of 1.0 dB or more is not recognized with respect to the optical fibers which conform to the G652, while the increase of the transmission loss of 0.5 dB or more is not recognized with respect to the optical fibers whose mode field diameter is equal to or below 10 µm.

In this manner, the optical fiber cable whose increase of loss at the time of performing the intermediate post branching is 1.0 dB or less can favorably perform the intermediate post branching in a live-line state and hence, it is possible to properly take out only the desired optical fiber by branching and to use other optical fibers at the downstream side. Accordingly, it is possible to effectively make use of all optical fibers housed in the optical fiber cable. Accordingly, the construction cost of the communication line can be suppressed to a low level.

Further, the optical fiber cable whose increase of loss at the time of performing the intermediate post branching is 0.5 dB or less can take out the desired optical fiber even when the high-speed communication is performed using the optical fiber which is not branched or even when the communication is performed in an area where the dynamic range is small. Accordingly, the degree of freedom in designing the optical communication system is remarkably enhanced.

Next, the optical fiber cable according to the second embodiment of the present invention is explained in detail in conjunction with the drawings.

Figure 26A:
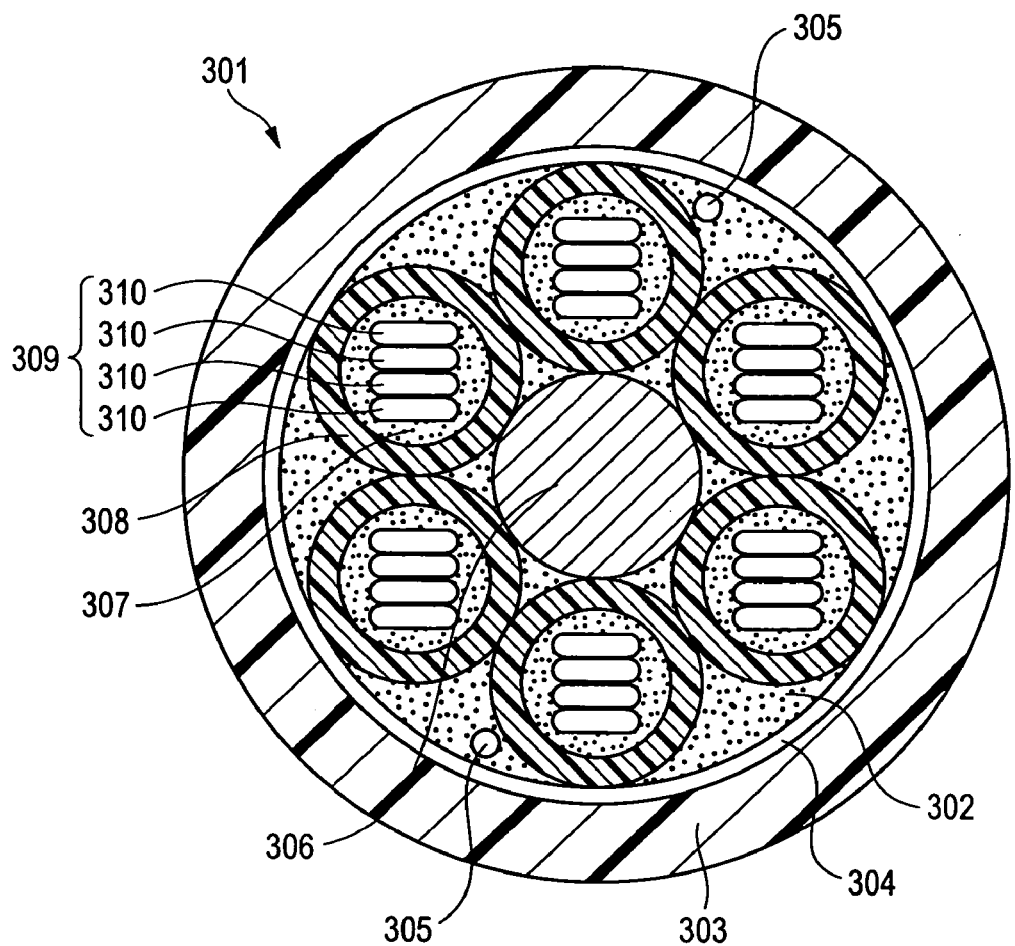
FIG. 26A is a cross-sectional view showing an optical fiber cable according to a second embodiment of the present invention.
Figure 26B:
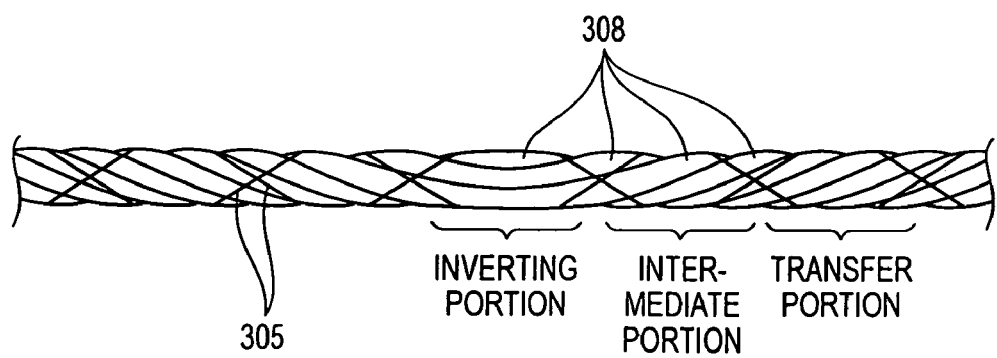
FIG. 26B is a side view of an optical fiber cable shown in FIG. 26A in a state that the optical fiber cable is not covered with a sheath and a press winding.

FIG. 26A is a cross-sectional view of an optical fiber cable according to the second embodiment of the present invention and FIG. 26B is a side view thereof. As shown in FIG. 26A, this loose tube type optical fiber cable 301 forms a four-fibered optical fiber ribbon 310 by arranging four optical fibers having an outer diameter of approximately 250 µm in parallel and by covering them in a ribbon shape with an ultraviolet ray curable resin. This four-fibered optical fiber ribbon 310 has a width of 1.1 mm and a thickness of 0.27 mm. Four sheets of these optical fiber ribbons 310 are stacked to form a stacked body 309. The stacked body 309 is housed in a plastic-made tube 308 which is made of polybutylene-terephthalate (PBT) having an outer diameter of 2.6 mm and an inner diameter of 1.8 mm while twisting the stacked body 309 in one direction at a pitch of 1000 mm. An oil-like jelly 7 is filled in the inside of the plastic-made tube 308.

As shown in FIG. 26B, six pieces of the tubes 308 are wound around a periphery of a tensile strength body 306 having an outer diameter of 2.6 mm and made of G-FRP, for example, such that the tubes 308 are twisted (SZ twisting) by repeating an inverting portion, an intermediate portion and a transfer portion periodically at a pitch of 500 mm. Then, a nylon string 305 is wound around them while pressing them and, thereafter, an unwoven press winding 304 is wound around (see FIG. 26A). Then, a sheath 303 made of polyethylene and having a thickness of 1.5 mm is formed on the outside of the press winding 304. Accordingly, this optical fiber cable 301 has 96 fibers and has an outer diameter of 10 mm. Further, in the inside of the press winding 304, a water absorbent 302 is filled.

In the optical fiber cable 301, the direction that the tubes 308 are twisted is periodically inverted and hence, by cutting arbitrary portions of the sheath 303 and the press winding 304, it is possible to easily take out the optical fiber ribbon 310 from the inverted portion of the plastic-made tube 308. Accordingly, the loose tube type optical fiber cable 301 adopting the SZ twisting is the structure suitable for intermediate post branching. Although the explanation is made that the loose tube type optical fiber cable 301 adopts the SZ twisting, the manner of twisting is not limited to SZ twisting. For example, the present invention is also applicable to the loose tube type optical fiber cable which adopts one-directional twisting.

In the optical fiber ribbon 310 which is housed in the tube 308, in the same manner as the above-mentioned optical fiber cable of the first embodiment, for example, as shown in FIG. 1A, a plurality of (four in this embodiment as an example) optical fibers 11 are arranged in parallel and, then, the whole outer peripheries of these optical fibers 11 arranged in parallel are covered with the sheath 12 which is formed of the resin over the entire length of the optical fibers 11. With respect to the detailed structure and the characteristics related to the optical fiber ribbon 310, the detailed description of the structure and characteristics is omitted.

The optical fiber ribbon 310 is formed such that a thickness of the sheath 12 is smaller than a thickness of a sheath of the related-art optical fiber ribbon. Here, the thickness t of the sheath 12 is obtained by an equation t=(T−d)/2 when the maximum value of the thickness of the optical fiber ribbon 310 is T(μm) and the outer diameter of the optical fiber 11 as d(μm). In the optical fiber ribbon 310, the thickness t of the sheath 12 is set such that a relationship T≦d+40 (μm) is established, that is, the thickness t of the sheath 12 becomes equal to or less than 20 μm.

With the use of the optical fiber ribbon 310 having the thin sheath 12, the high packing density that the related-art loose tube type optical fiber cable has can be further enhanced and, at the same time, it is possible to obtain the optical fiber cable 301 which enables an extremely easy taking out of the optical fiber ribbon from an intermediate portion while ensuring the mechanical properties.

In this manner, in the optical fiber ribbon 310, since the thickness t of the sheath 12 is small, the sheath 12 can be easily peeled off by generating cracks and peeling-off on the sheath by a manual operation of an operator or using a branching tool. Accordingly, the optical fiber 11 can be easily branched by peeling off the sheath 12 from the optical fiber ribbon 310. That is, the optical fiber ribbon 310 adopts the structure which enables the easy intermediate post branching operation.

Further, the method for performing the intermediate post branching is performed in accordance with the above-mentioned steps which have been explained in conjunction with FIGS. 2A–2C Here, the relationship between the operability of the intermediate post branching and the increase of live-line loss during such an operation due to the difference in the thickness t of the sheath 12 is shown in Table 18. Further, in Table 18, the polarization mode dispersion in a state that the optical fibers are housed in the optical fiber cable 301 (loose tube cable PMD) and the results of the separation experiment showing the strength of integrity of the optical fibers are shown. Here, the outer diameter d of the optical fibers in the optical fiber ribbon shown in Table 18 is 250 μm. Further, the Young's modulus of resin which constitutes the sheath 12 is 900 MPa.

Here, the optical fiber ribbon with the sheath having the thickness t of 0.0 in Table 18 indicates the optical fiber ribbon in which the resin does not cover the whole optical fibers as shown in FIG. 10.

The intermediate post branching property shown in Table 18 indicates the level of easiness for branching with the increase of the transmission loss held at 1.0 dB or less when an intermediate portion of the optical fiber ribbon is branched into respective optical fibers. With respect to the evaluation criteria used in this specification, "very good" means that the branching can be performed within 2 minutes, "good" means that the branching can be performed in an operation time exceeding two minutes and within three minutes and "fair" indicates that the branching can be performed in an operation time exceeding three minutes and within 5 minutes. Further, "not good" indicates that the branching requires an average operation time which exceeds 5 minutes.

Here, the fact that the increase of the transmission loss at the time of branching is equal to or less than 1.0 dB means that the live-line branching can be performed.

Here, the experiment of the intermediate post branching property is performed in the above-mentioned steps in conjunction with FIGS. 21A and 21B.

Among the optical fiber ribbons shown in Table 18, the optical fiber ribbons which exhibit the evaluations "very good", "good" and "fair" with respect to the intermediate post branching property have the ribbon thickness of 290 μm or less, that is, satisfy T≦d+40 (μm). All of these optical fiber ribbons can complete the intermediate post branching within five minutes while restricting the increase of the transmission loss at the time of branching to 1.0 dB or less. That is, it is possible to perform the live-line branching within five minutes.

To the contrary, with respect to the related-art optical fiber ribbon having a sheath which has a large thickness exceeding the outer diameter d of the optical fiber by 40 μm, the intermediate post branching property exhibits "not good". That is, the increment of the transmission loss at the time of branching exceeds 1.0 dB or even when the optical fiber can be branched, the branching operation requires a given time which exceeds five minutes and hence, the live-line branching cannot be performed from a realistic viewpoint.

The increase of live-line loss shown in Table 18 indicates an increase amount (increment) of the transmission loss generated during the intermediate post branching operation. As the evaluation criteria in this specification, "very good" means that the transmission loss is not increased by exceeding 0.1 dB during the branching operation, "good" means

TABLE 18

| ribbon thickness T (μm) | 250 | 251 | 260 | 270 | 275 | 280 | 290 | 300 | 310 | 320 |
|---|---|---|---|---|---|---|---|---|---|---|
| sheath thickness t (μm) | 0.0 | 0.5 | 5 | 10 | 12.5 | 15 | 20 | 25 | 30 | 35 |
| intermediate post branching property | very good | very good | good | good | good | good | fair | not good | not good | not good |
| live-line loss increase | good | good | good | good | good | fair | fair | not good | not good | not good |
| loose tube cable PMD | good | good | good | good | good | fair | fair | fair | fair | fair |
| with or without fiber separation | not good | good | good | good | good | good | good | good | good | good | that the transmission loss is not increased by exceeding 0.5 dB during the branching operation, and "fair" means that the transmission loss is not increased by exceeding 1.0 dB during the branching operation. Further, "not good" means that increased value of the transmission loss exceeds 1.0 dB during the branching operation.

Among the optical fiber ribbons shown in Table 18, the optical fiber ribbons which exhibit the evaluations "good" and "fair" with respect to the increase of the live-line loss have the ribbon thickness T of 290 μm or less, that is, satisfy $T \leq d+40$ (μm). All of these live-line optical fiber ribbons can complete the intermediate post branching while restricting the increase of the transmission loss at the time of branching to 1.0 dB or less. Particularly, with respect to the optical fiber ribbons which have the ribbon thickness T of 275 μm or less, that is, satisfy $T \leq d+25$ (μm), the increase of the live-line loss exhibits "good" and hence, the increase of the transmission loss can be further suppressed to a low level. Accordingly, these optical fibers are more preferable.

To the contrary, with respect to the related-art optical fiber ribbon having a large sheath thickness whose ribbon thickness T exceeds the outer diameter d of the optical fiber by 40 μm, the increase of the live-line loss exhibits "not good" and the increased value of the transmission loss exceeds 1.0 dB during the branching operation.

The loose tube cable PMD shown in Table 18 indicates the link polarization mode dispersion in a state that the optical fiber ribbon 310 is housed in the loose tube cable as shown in FIG. 26A. Here, the link polarization mode dispersion indicates the maximum value of the PMD which can be generated when the values of polarization mode dispersion (PMD) of all optical fibers 11 which are housed in the optical fiber cable 301 are processed statistically and a large number of equivalent optical fiber cables are connected in series. Here, the statistical process is performed based on the center limit theorem. Further, the measurement of the PMD is performed under the condition that the length of the optical fiber cable 301 is 1000 m or more and uses a measuring equipment based on the interference method (6000B made by Suntec inc).

As the evaluation criteria in this specification, "very good" means that the link polarization mode dispersion (link PMD) is equal to or less than 0.05 (ps/km$^{1/2}$), "good" means that the link polarization mode dispersion exceeds 0.05 (ps/km$^{1/2}$) and is equal to or less than 0.1 (ps/km$^{1/2}$), "fair" means that the link polarization mode dispersion exceeds 0.1 (ps/km$^{1/2}$) and is equal to or less than 0.2 (ps/km$^{1/2}$), and "not good" means that the link polarization mode dispersion exceeds 0.2 (ps/km$^{1/2}$).

In the loose tube type optical fiber cable, the optical fiber ribbons are arranged in the tube in a stacked manner and hence, a stress from a fixed direction is generated and birefringence is generated in the optical fibers. Further, the birefringence is also liable to be easily generated due to the curing shrinking of the sheath of the optical fiber ribbons. The sheath (resin) of the optical fiber ribbon shrinks by approximately 5% due to curing at the time of manufacturing thereof. Due to this curing shrinking, an external force is applied to the optical fiber and a stress is generated in the inside of the optical fiber. However, the optical fiber ribbon has a cross-sectional shape which is broadened in a widthwise direction and hence, the stress differs between the widthwise direction and the thickness direction. Particularly, the sheath arranged in the thickness direction of the optical fiber ribbon with respect to the optical fibers is contiguously formed in the widthwise direction of the optical fiber ribbon and hence, when the thickness of the sheath at these portions is large, the stress which is generated in the widthwise direction is increased whereby the difference in stress in the widthwise direction and the thickness direction is increased.

In this manner, in the loose tube type optical fiber cable which houses the optical fiber ribbons, the PMD is liable to be easily increased. Particularly, when the tube is twisted in a SZ form, the optical fiber ribbon is bent in a complicated manner due to the inverted shape and hence, a tendency that the PMD is easily increased is observed.

In this embodiment, the optical fiber ribbon having the thinner sheath than the related-art optical fiber ribbon is used, the birefringence which is generated due to curing shrinking can be suppressed to an extremely small value. Accordingly, the optical fiber cable of this embodiment can suppress the PMD to a low level.

Among the optical fiber cables shown in Table 18, when the optical fiber cable satisfies $T \leq d+25$ (μm), the loose tube cable PMD becomes "good" and hence, it is understood that this optical fiber cable is particularly favorable.

The presence or non-presence of fiber separation shown in Table 18 shows the result of a separation test which indicates the strength of integrity of the optical fibers.

This separation test is performed in accordance with the above-mentioned steps explained in conjunction with FIG. 22.

As the evaluation criteria on the separation of fibers in this specification, "good" means that there is no separation between the optical fiber and the sheath (resin) and the optical fiber ribbon is held in an integrated form in the longitudinal direction, and "not good" means that there arise a portion where the optical fiber and the sheath (resin) are separated from each other.

Among the optical fiber ribbons shown in Table 18, when the optical fiber ribbons satisfy the relationship $T \geq d+1$ (μm), the separation of the optical fiber ribbon is not generated and hence, the optical fiber cable is favorable. That is, it is found that when the thickness t of the sheath is equal to or more than 0.51 μm, the optical fiber cable can have the sufficient strength to integrate the respective optical fibers.

Among the optical fiber ribbons shown in Table 18, the optical fiber ribbon which satisfies the relationship T=d (see FIG. 10) generates the separation portions in the separation experiment. However, by taking the fact that the external force such as ironing which is applied to the optical fiber ribbons is reduced in the line at the time of manufacturing the optical fiber cable into consideration, it is possible to prevent the drawback that the separation of ribbon occurs in the manufacturing step for forming the optical fibers into a cable. Further, with respect to the optical fiber ribbon which satisfies the relationship T=d, since the sheath is substantially eliminated at the portion in the thickness direction of the optical fiber ribbon which passes the centers of the respective optical fibers, the respective optical fibers can be easily separated in the widthwise direction of the optical fiber ribbon and hence, the intermediate post branching can be performed favorably compared to the optical fiber ribbon having a shape which covers the whole of respective optical fibers with the sheath.

With respect to the optical fiber ribbon 10A shown in FIG. 10 in which the resin 12aA does not cover the whole of respective optical fibers 11A, the respective optical fibers 11A are integrated by merely using an adhesive strength between the resin 12aA and the optical fibers. To the contrary, with respect to the optical fiber ribbon 10 shown in FIG. 1A, the resin integrally covers the whole of respective optical fibers 11 which constitutes the sheath 12 and hence, the optical fiber ribbon 10 easily maintains a state in which the whole of the optical fiber ribbon 10 is integrated due to a force which intends to hold the shape of the sheath 12 per se besides the adhesive strength between the resin and the optical fibers.

Further, in the above-mentioned optical fiber ribbon (see FIG. 1A), by setting the ratio between the product of Young's modulus E and the cross-sectional area S of the sheath (resin) 12 and the sum of products of the Young's moduli E and the cross-sectional areas S of the respective optical fibers 11 to the proper value, the PMD can be reduced. An amount of stress which acts on the optical fiber 11 when the sheath 12 generates the curing shrinking is increased corresponding to the increase of the Young's modulus of the resin which constitutes the sheath 12 and the increase of the thickness of the sheath 12. Here, a cause which brings about the increase of the PMD is a strain which is generated in the glass fiber 13 of the optical fiber 11. An amount of strain is determined based on an amount of force which reaches the glass fiber 13 through a coating layer including a primary protective coating. 14, a second protective coating 15 and a color layer and the Young's modulus of the glass fiber 13.

Then, the relationship between the ES product ratio of the sheath 12 with respect to the optical fibers 11 and the loose tube cable PMD is reviewed under the respective conditions that the Young's modulus of the sheath 12 assumes 700 MPa, 900 MPa, 1200 MPa and 1500 MPa respectively when the thickness of the optical fiber ribbon 310 differs, that is, when the thickness of the sheath 12 differs.

Here, the glass fiber 13 has the Young's modulus of 73000 MPa and has the outer diameter of 125 μm. The primary protective coating 14 has the Young's modulus of 1 MPa and has the outer diameter of 200 μm. The secondary protective coating 15 has the Young's modulus of 700 MPa and has the outer diameter of 240 μm. The color layer has the Young's modulus of 1500 MPa and has the outer diameter of 250 μm.

The relationship between the ES product ratio and the loose tube cable PMD when the Young's modulus of the sheath 12 is 700 MPa is shown in Table 19.

TABLE 19

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| resin ES product (N) | 10.264 | 10.789 | 12.014 | 12.889 | 13.764 | 14.639 | 16.389 |
| ES product ratio | 0.0113 | 0.0118 | 0.0132 | 0.0141 | 0.0151 | 0.160 | 0.0180 |
| loose tube cable PMD | good | good | good | good | good | fair | fair |

The relationship between the ES product ratio and the loose tube cable PMD when the Young's modulus of the sheath 12 is 900 MPa is shown in Table 20.

TABLE 20

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| resin ES product (N) | 13.196 | 13.871 | 15.446 | 16.571 | 17.696 | 18.821 | 21.071 |
| ES product ratio | 0.0145 | 0.0152 | 0.0169 | 0.0182 | 0.0194 | 0.0206 | 0.0231 |
| loose tube cable PMD | good | good | good | good | good | fair | fair |

The relationship between the ES product ratio and the loose tube cable PMD when the Young's modulus of the sheath 12 is 1200 MPa is shown in Table 21.

TABLE 21

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| resin ES product (N) | 17.595 | 18.495 | 20.595 | 22.095 | 23.595 | 25.095 | 28.095 |

TABLE 21-continued

| ES product ratio | 0.0193 | 0.0203 | 0.0226 | 0.0242 | 0.0259 | 0.0275 | 0.0308 |
|---|---|---|---|---|---|---|---|
| loose tube cable PMD | good | fair | fair | fair | fair | not good | not good |

The relationship between the ES product ratio and the loose tube cable PMD when the Young's modulus of the sheath 12 is 1500 MPa is shown in Table 22.

TABLE 22

| ribbon thickness T (μm) | 255 | 258 | 265 | 270 | 274 | 280 | 290 |
|---|---|---|---|---|---|---|---|
| fiber ES product sum (N) | 912.2 | 912.2 | 912.2 | 912.2 | 912.2 | 912.2 | 912.2 |
| resin ES product (N) | 21.994 | 23.119 | 25.744 | 27.619 | 29.494 | 31.369 | 35.119 |
| ES product ratio | 0.0241 | 0.0253 | 0.0282 | 0.0303 | 0.0323 | 0.0344 | 0.0385 |
| loose tube cable PMD | fair | fair | not good | not good | not good | not good | not good |

Here, the fiber ES product shown in Table 19 to Table 22 is the sum of respective ES products of regions which are constituted of the glass fiber 13, the primary protective coating 14, the secondary protective coating 15 and the color layer, while the resin ES product is an ES product of the sheath 12. The ES product ratio can be expressed as "resin ES product/fiber ES product".

As shown in Table 19 to Table 22, the condition that the loose tube cable PMD obtain "good" or "fair", that is, the condition that the link PMD of all fibers of the optical fibers housed in the loose tube type optical fiber cable assumes 0.2 (ps/km$^{1/2}$) or less is a case that the ES product ratio assumes a value equal to or less than 0.026. Further, the condition that the loose tube cable PMD obtains "good", that is, the condition that the link PMD of all fibers of the optical fibers housed in the loose tube type optical fiber cable assumes 0.1 (ps/km$^{1/2}$) or less is a case that the ES product ratio assumes a value equal to or less than 0.020.

In this manner, by setting the ES product ratio of the sheath 12 with respect to the optical fibers 11 to a desired value, it is possible to suppress the PMD of the optical fibers 11 to a low level.

Further, as another preferred mode of the optical fiber ribbon which is housed in the optical fiber cable according to the second embodiment of the present invention, the optical fiber ribbon shown in FIG. 11A can be named. That is, as shown in FIG. 11A, with respect to the optical fiber ribbon 310, recessed portions 116 are formed in the sheath 12 in conformity with the indentations formed between the neighboring optical fibers 111, 111 in the sheath 112 which covers the optical fibers 111. The recessed portion 116 includes a bottom portion 117 as a portion having the largest indentation. Further, the optical fiber ribbon 110A shown in FIG. 13A which constitutes another mode obtained by partially modifying the constitution of the optical fiber ribbon 110 shown in FIG. 11A can be named. The detailed explanation of the detailed structure and the characteristics of the optical fiber ribbon 310 is omitted.

Here, in housing the optical fiber ribbon in the tube shown in FIG. 26A, since the stacked optical fiber ribbons are twisted in the inside of the tube, the distance from the center of twisting differs between the optical fiber which is positioned at the end portion in the widthwise direction of the optical fiber ribbon and the optical fiber which is positioned inside the former optical fiber. Accordingly, the difference in length arises between the optical fiber at the end portion and the optical fiber at the inside and hence, a stress is generated in the optical fibers. This stress imparts the anisotropic stress to the glass fiber and hence, the birefringence is generated and this becomes a cause of the increase of the PMD.

To the contrary, in the optical fiber ribbon 110A shown in FIG. 13A, the recessed portions are formed in the sheath and hence, as shown in FIG. 14, the optical fiber ribbon 110A is easily deflectable in the widthwise direction. Accordingly, when the optical fiber ribbon 110A is housed in the tube, no excessive force is imparted to the optical fiber ribbon 110A and hence; the difference in length in the inside of the tube which is generated between the optical fiber at the end portion and the optical fiber at the inside is resolved whereby it is considered that the cable PMD can be improved. Further, the sheath 112A of the optical fiber ribbon 110A approximates a circular shape along the outer peripheries of the optical fibers 111A and hence, the anisotropy of the curing shrinking stress of the sheath 112A which may occur in manufacturing the optical fiber ribbon 110A can be reduced whereby it is considered that the PMD of the optical fiber ribbon 110A in a cable state can be enhanced. Here, this advantageous effect is also obtained by the optical fiber ribbon 110 shown in FIG. 11A, the optical fiber ribbon 110A having the deeper recessed portions can exhibit the advantageous effect more apparently.

Here, with respect to the depth of the recessed portions formed in the sheath shown in FIG. 11A and FIG. 13A, the prevention of separation of the optical fiber at the time of manufacturing the optical fiber ribbon by arranging a plurality of optical fibers in parallel and by integrating them using the sheath, the prevention of peeling-off (becomes a cause of separation of the optical fibers) at the time of performing the installation operation of the optical fiber ribbon, or the increase or decrease of transmission loss during the favorable branching operation or the live-line branching are reviewed. As a result, it is found that it is preferable that the recessed portions are formed such that the recessed portions do not exceed the common tangent which is formed by the neighboring optical fibers. That is, it is found that it is favorable that the recessed portions are formed at the inner side than the common tangent.

The result of the review is specifically explained hereinafter.

With respect to cases in which the thickness T(μm) of the optical fiber ribbon is set to 270 μm, 280 μm and 290 μm, a ratio t/Y which is a ratio of the thickness t(μm) of the sheath with respect to the depth Y(μm) of the recessed portion and a ratio g/d which is a ratio of thickness g(μm) of the optical fiber ribbon at the recessed portion with respect to the outer diameter (μm) of the optical fiber when the depth d of the recessed portion differs are calculated, and the intermediate post branching property, the increase of live-line loss and the loose tube cable PMD are reviewed in respective cases.

The relationship among the intermediate post branching property, the increase of live-line loss and the loose tube cable PMD when the thickness T of the optical fiber ribbon is 270 μm is shown in Table 23. Here, the ratio (T−d)/2Y in the table is an equivalent value as t/Y.

TABLE 23

| ribbon thickness T (μm) | 270 | 270 | 270 | 270 | 270 | 270 | 270 | 270 | 270 |
|---|---|---|---|---|---|---|---|---|---|
| sheath thickness t (μm) | 10 | 10 | 10 | 10 | 10 | 10 | 10 | 10 | 10 |
| recessed portion depth Y (μm) | 1 | 2 | 5 | 10 | 20 | 30 | 40 | 50 | 100 |
| ratio (T − d)/2Y | 10 | 5 | 2 | 1 | 0.5 | 0.333 | 0.25 | 0.2 | 0.1 |
| ratio g/d | 1.072 | 1.064 | 1.04 | 1 | 0.92 | 0.84 | 0.76 | 0.68 | 0.28 |
| intermediate post branching property | good | good | very good | very good | very good | very good | very good | very good | very good |
| live-line loss increase | good | good | good | very good | very good | very good | very good | very good | very good |
| loose tube cable PMD | good | good | good | good | good | good | very good | very good | very good |

The relationship among the intermediate post branching property, the increase of live-line loss and the loose tube cable PMD when the thickness T of the optical fiber ribbon is 280 μm is shown in Table 24.

TABLE 24

| ribbon thickness T (μm) | 280 | 280 | 280 | 280 | 280 | 280 | 280 | 280 | 280 |
|---|---|---|---|---|---|---|---|---|---|
| sheath thickness t (μm) | 15 | 15 | 15 | 15 | 15 | 15 | 15 | 15 | 15 |
| recessed portion depth Y (μm) | 1 | 2 | 5 | 10 | 20 | 30 | 40 | 50 | 100 |
| ratio (T − d)/2Y | 15 | 7.5 | 3 | 1.5 | 0.75 | 0.5 | 0.375 | 0.3 | 0.15 |
| ratio g/d | 1.112 | 1.104 | 1.08 | 1.04 | 0.96 | 0.88 | 0.8 | 0.72 | 0.32 |
| intermediate post branching property | good | good | very good | very good | very good | very good | very good | very good | very good |
| live-line loss increase | fair | fair | fair | good | very good | very good | very good | very good | very good |
| loose tube cable PMD | fair | fair | fair | fair | good | good | very good | very good | very good |

The relationship among the intermediate post branching property, the increase of live-line loss and the loose tube cable PMD when the thickness T of the optical fiber ribbon is 290 μm is shown in Table 25.

TABLE 25

| | | | | | | | | | |
|---|---|---|---|---|---|---|---|---|---|
| ribbon thickness T (μm) | 290 | 290 | 290 | 290 | 290 | 290 | 290 | 290 | 290 |
| sheath thickness t (μm) | 20 | 20 | 20 | 20 | 20 | 20 | 20 | 20 | 20 |
| recessed portion depth Y (μm) | 1 | 2 | 5 | 10 | 20 | 30 | 40 | 50 | 100 |
| ratio (T − d)/2Y | 20 | 10 | 4 | 2 | 1 | 0.667 | 0.5 | 0.4 | 0.2 |
| ratio g/d | 1.152 | 1.144 | 1.12 | 1.08 | 1 | 0.92 | 0.84 | 0.76 | 0.36 |
| intermediate post branching property | fair | fair | good | good | very good | very good | very good | very good | very good |
| live-line loss increase | fair | fair | fair | fair | fair | fair | fair | fair | fair |
| loose tube cable PMD | fair | fair | fair | fair | good | good | good | very good | very good |

As shown in Table 23 to Table 25, in any one of the intermediate post branching property, the increase of live-line loss and the SD cable PMD, the larger the depth Y of the recessed portions, the favorable results are obtained.

Further, when the thickness T of the optical fiber ribbon is either 270 μm or 280 μm, that is, when the thickness T of the optical fiber ribbon satisfies T≦d+30 (μm), it is possible to obtain the particularly favorable results with respect to the intermediate post branching property, the increase of live-line loss. The reason is considered that when the branching tools shown in FIG. 12A to FIG. 12C are used, due to the advantageous effects of the recessed portions, the branching property is improved than the optical fiber ribbon which merely reduces the thickness of the sheath. For example, while the evaluation of the intermediate post blanching property is "good" when the ribbon thickness T is set to 270 μm as shown in Table 23, the evaluation of the intermediate post blanching property is "very good" when the ribbon thickness is set to 280 μm and the depth Y of the recessed portions is set to 5 μm as shown in Table 24 and hence, the advantageous effect of the recessed portion can be confirmed.

Further, to focus on the intermediate post branching property, it is understood that the intermediate post branching property is particularly associated with the value of the ratio (T−d)/2Y. For example, when the ratio (T−d)/2Y is equal to or less than 4.0, it is possible to obtain the favorable intermediate post branching property.

Further, to focus on the loose tube cable PMD, it is understood that the loose tube cable PMD is particularly associated with the value of the ratio g/d. For example, when the ratio g/d is equal to or less than 1, that is, when the bottom portion is inside the common tangent of the optical fibers, it is possible to obtain the remarkable PMD suppression effect while sufficiently reducing an amount of the resin.

When the ratio g/d is equal to or less than 1.0, the sheath is thin to prevent the bottom portion from being disposed outside the common tangent and hence, the sheath is easily bendable in the longitudinal direction and, at the same time, the recessed portion is deep and hence, the deflection shown in FIG. 14 is easily generated whereby it is considered that the cable PMD can be effectively suppressed.

Further, when the ratio g/d is equal to or less than 0.8, the PMD in a state that the optical fibers are housed in the loose tube type optical fiber cable can be further effectively suppressed.

In general coating of the optical fibers, the primary protective coating which exhibits the low Young's modulus covers the periphery of the glass fiber and the outer periphery of the primary protective coating is covered with the secondary protective layer and the color layer having the high Young's modulus. Further, the outer diameter of the primary protective covering is approximately 0.8 times as large as the thickness of the outer diameter d of the optical fiber. Then, when the resin of the recessed portion is in a range which does not exceed the primary protective coating, the sheath is liable to be easily deformed and hence, the deflection shown in FIG. 14 is easily generated. Accordingly, the PMD can be further suppressed.

In the optical fiber ribbon having the recessed portions shown in FIG. 11A and FIG. 13A, it is desirable that the recessed portions of the sheath are formed in a smooth curved shape R. This is because, for example, when the recessed portions have bottom portions thereof formed in an acute shape along the shape of the optical fiber ribbon, a stress is concentrated on the bottom portions of the recessed portions and hence, ruptures and cracks are liable to be easily generated.

Further, in the optical fiber ribbon used in the optical fiber cable according to the present invention shown in FIG. 1A, FIG. 10, FIG. 11A and FIG. 13A, the adhesive strength between the optical fiber and the sheath sometimes affects the increase of the transmission loss and the branching operation efficiency at the time of performing the live-line branching. With respect to the adhesive strength of the optical fiber and the sheath (resin), to take the prevention of the increase of the transmission loss and the branching operability into consideration, it is favorable that the adhesive strength per one optical fiber falls within a range 0.245 (mN) to 2.45 (mN) When the above-mentioned adhesive strength is smaller than the above-mentioned range, there may arise a case that the sheath is ruptured at the time of being formed into a cable and the optical fibers are separated from each other. On the other hand, when the adhesive strength is larger than the above-mentioned range, the branching property is deteriorated.

Here, the adhesive strength between the optical fiber and the sheath is measured using the above-mentioned method explained in conjunction with FIG. 5 and FIG. 6.

In the optical fiber ribbon used in the present invention, when the main object of the invention lies in that the optical fibers keep the integrity without being separated from each other, it is favorable that the thickness of the sheath is equal to or more than 0.5 µm. In this case, the maximum thickness T of the optical fiber ribbon becomes T≧outer diameter of the optical fiber d+1 (µm).

Also depending on the properties of the sheath of the optical fiber ribbon, in some cases, these properties affect the increase of the transmission loss and the branching operation efficiency at the live-line branching. It is preferable that the yield point stress, as the property of material of the sheath, falls within a range of 20 MPa to 45 Mpa. This is because that the branching operation can be performed easily and the transmission loss at the time of performing the live-line branching can be suppressed. In accordance with JIS K7113, the yield point stress is measured with respect to a No. 2 test piece at a tension speed of 50 mm/minute. When the yield point stress is less than 20 MPa, there arises a case in which the respective optical fibers are separated by an external force which is applied to the optical fibers during a step of assembling the optical fiber ribbons to form a cable and hence, the cable cannot be formed. On the other hand, when the yield point stress exceeds 45 MPa, it is difficult to rupture the sheath and hence, the intermediate post branching of the optical fiber ribbon is hard to perform.

Further, in this embodiment, with respect to the optical fiber cable 301 shown in FIG. 26A, the transmission loss value and the polarization mode dispersion (PMD) value at a wavelength of 1.55 m are measured. Further, an amount of increase (increment) of the transmission loss at the time of performing the intermediate post branching is measured.

Here, the optical fiber ribbon used here is the optical fiber ribbon 110A shown in FIG. 13A and a thickness T of the optical fiber ribbon is 270 µm. The outer diameter d of the optical fiber 111A is 250 µm. Further, the thickness t of the sheath is 10 µm and the depth Y of the recessed portions is 40 µm. The thickness g of the optical fiber ribbon at the recessed portions is 190 µm. However, among the optical fibers which are integrated as the optical fiber ribbon, 48 fibers are selected from optical fibers which conform to G652 and the remaining 48 fibers have the mold filed diameter of equal to or less than 10 µm.

With respect to the transmission loss value of the optical fibers in a state that they are housed in the optical fiber cable 301, the optical fibers which conform to G652 exhibit the maximum value of 0.23 dB/km and the average value of 0.21 dB/km, while the optical fibers whose mode field diameter is 10 µm or less exhibit the maximum value of 0.21 dB/km and the average value of 0.20 dB/km.

Further, with respect to the polarization mode dispersion value, the optical fibers which conform to G652 exhibit the average value of 0.024 $(ps/km^{1/2})$, the standard deviation of 0.020 $(ps/km^{1/2})$ and the link PMD of 0.045 $(ps/km^{1/2})$, while the optical fibers whose mode field diameter is 10 µm or less exhibit the average value of 0.023 $(ps/km^{1/2})$, the standard deviation of 0.019 $(ps/km^{1/2})$ and the link PMD of 0.043 $(ps/km^{1/2})$.

In this manner, with respect to the transmission loss and the PMD of the optical fibers after being formed into the cable, the optical fibers whose mode field diameter is 10 µm or less exhibit the more favorable characteristics.

Further, as mentioned above, the optical fiber cable which incorporates the optical fiber ribbons in the tubes and twists the tubes into SZ or the optical fiber cable which includes a single tube which is positioned at the center thereof and is not twisted exhibits the favorable intermediate post branching property. Accordingly, when this optical fiber cable is used as a subscriber-system communication path which connects between a station and an ordinary subscriber, the length of the optical fiber cable is, in many cases, shorter than the optical fiber cable for a relay system which connects stations and is several tens km at the longest. However, when one optical fiber is allocated to one subscriber from the station to the subscribers, in case the number of the subscribers is large, the optical fiber cable capable of housing a large number of optical fibers becomes necessary and hence, the diameter of the optical fiber cable becomes large-sized. This situation is not favorable in installing the optical fiber cable in a conduit. Accordingly, the wavelength division multiplexing (WDM) technique which superposes signals of many subscribers in one optical fiber is effective and there exists a strong demand for an optical fiber cable which can transmit signals at a high speed.

As in the case of the optical fiber cable according to the present invention, when the link PMD is equal to or less than 0.2 $(ps/km^{1/2})$, the transmittable distance becomes 156 km in case the transmission rate is 400 Gbps and hence, it is possible to ensure a sufficient communication quantity to the subscriber system.

Further, when link PMD is equal to or less than 0.1 $(ps/km^{1/2})$, the transmittable distance becomes 625 km in case the transmission rate is 40 Gbps and the transmittable distance becomes 156 km in case the transmission rate is 80 Gbps and hence, it is more preferable.

Here, the method for measuring the transmission loss by performing the intermediate post branching from the optical fiber cable is explained in conjunction with FIG. 23.

First of all, as shown in FIG. 23, out of an arbitrary optical fiber ribbon in a tube, a light source 220 for allowing the incidence of light having a wavelength of 1.55 µm into a first optical fiber 11a is connected to the optical fiber 11a at one side of the optical fiber cable 301, while a light receiver 221 and a storage oscilloscope 222 are connected to the optical fiber 11a at the other side of the optical fiber cable 301. In this state, the light having a wavelength of 1.55 µm is incident on the first optical fiber 11a from the light source 220. The incident light is transmitted to the other side of the optical fiber 11a and is received by the receiver 221. An received light quantity of the received light is observed by the storage oscilloscope 222 at proper times.

Then, in a state that the incidence of light from the light source 220 is continued, the sheath and the press winding are removed at an intermediate portion of the optical fiber cable 301 by a length of approximately 500 mm. The tube including the optical fiber 11a on which the light from the light source is incident is taken out by making use of the inverting portion of twisting. Further, the tube coating at the intermediate portion is removed using a tube cutter and the optical fiber ribbon 10c is taken out. Then, the optical fiber ribbon 10c is branched into a plurality of single fibers and a fourth fiber 11b is cut. Here, the method for branching the optical fiber ribbon 10c is performed in accordance with the above-mentioned steps explained in conjunction with FIG. 2A to FIG. 2C.

The measurement of the transmission loss is performed by observing the steps ranging from the removal of the sheath from the optical fiber cable 301 to the completion of the operation using the storage oscilloscope 222.

As a result, with respect to an increased amount of transmission loss during the operation, a value equal to or more than 1.0 dB is not recognized in the optical fibers which conform to G652, while a value equal to or more than 0.5 dB is not recognized in the optical fibers which has the mode field diameter of equal to or less than 10 μm.

Next, a central tube type optical fiber cable which constitutes another modification of the optical fiber cable according to the second embodiment of the present invention is explained. Here, the parts which are common with parts of the previously-mentioned loose tube type optical fiber cable 301 are indicated by same symbols and the repeated explanation of these parts is omitted. FIG. 27A is a cross-sectional view of the optical fiber cable of a type in which optical fiber ribbons are incorporated in one tube positioned at the center of the optical fiber cable and a jelly is filled in the tube, FIG. 27B is across-sectional view of the 24-fibered optical fiber ribbons and FIG. 28 is a cross-sectional view of an optical fiber cable of a yarn filled type.

In the jelly-filled-type optical fiber cable 301A shown in FIG. 27A is configured such that 24 pieces of optical fibers 11 having an outer diameter of 250 μm which conform to G652 are arranged in parallel in a state that they are brought into contact with each other, the optical fibers are covered with an ultraviolet ray curable resin so as to form a 24-fibered optical fiber ribbon shown in FIG. 27B, and 18 pieces of these optical fiber ribbons 310d are stacked to form a stacked body 309A. Here, the 24-fibered optical fiber ribbon has a width w of 6.1 mm and a thickness T of 270 μm, while a thickness t of a sheath thereof is 10 μm. Further, a depth Y of recessed portions is 40 μm and a thickness g of the optical fiber ribbon 310d at the recessed portions is 190 μm. By twisting the stacked body 109A in one direction at a pitch of 1000 mm, the stacked body 109A is housed in a plastic tube 308A made of polybutylene terephthalate (PBT) which has an outer diameter of 14 mm and an inner diameter of 10 mm. Then, jelly 307A is filled in the inside of the plastic tube 308A.

To the outside of the plastic tube 308A, tensile strength bodies 306A (for example, G-FRP having an outer diameter of 1.5 mm) are attached such that three tensile strength bodies 306A extend in the longitudinal direction along each of left and right sides. A sheath 303A which is made of polyethylene and has a thickness of 2.5 mm is formed on the outside of the above-mentioned structure. Here, a tearing string 305A which is served for tearing the sheath 303A is provided along the tensile strength bodies 306A in parallel. Due to such a constitution, the optical fiber cable can have the favorable properties such that the transmission loss after forming into a cable is 0.25 dB/km or less at a wavelength of 1.55 μm and a link PMD is 0.05 ps/km$^{1/2}$. Further, the increase of the transmission loss at the intermediate post branching experiment can be suppressed to 1.0 dB or less in the same manner as the above-mentioned optical fiber cable 301.

Figure 28:
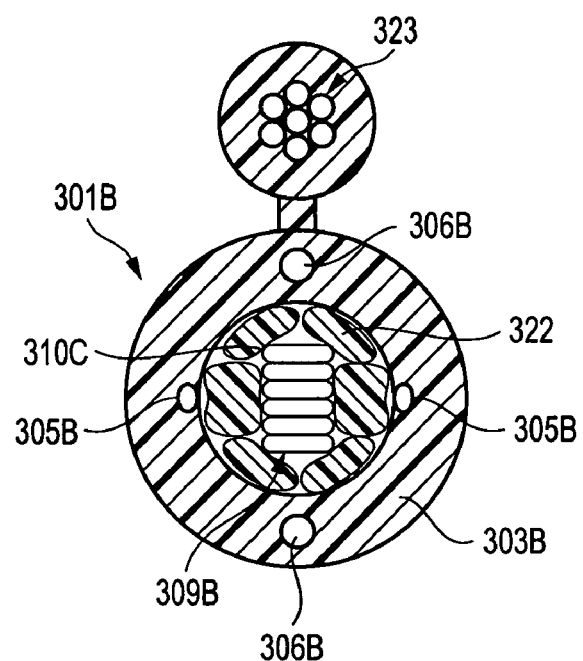
FIG. 28 is across-sectional view of another optical fiber cable according to the second embodiment of the present invention.

Further, as shown in FIG. 28, the yarn-filled-type optical fiber cable 301B forms a stacked body 309B by laminating 6 sheets of 4-fibered optical fiber ribbons having recessed portions as shown in FIG. 13A. The 4-fibered optical fiber ribbons has a thickness T of 270 μm and a sheath thickness t of 10 μm. Further, a depth Y of the recessed portions is 30 μm and a thickness g of the optical fiber ribbon at the recessed portions is 210 μm. The stacked body 309B is twisted in one direction together with a yarn 322 which constitutes a filler and they are covered with polyethylene together with tensile strength bodies 306B, support lines 323 and the like in a peanut shape. Although the explanation is made with respect to the yarn-filled optical fiber cable adopting one-direction twisting, the modification is not limited to one-direction twisting and is applicable to the optical fiber cable adopting the SZ direction twisting. Here, in the inside of the sheath 303B, a tearing string 305B which is served for tearing the sheath 303B is provided. Due to such a constitution, the optical fiber cable can have the favorable properties such that the transmission loss after forming into a cable is 0.25 dB/km or less at a wavelength of 1.55 μm and a link PMD is 0.1 ps/km$^{1/2}$ or less. Further, the increase of the transmission loss at the intermediate post branching experiment can be suppressed to 1.0 dB or less with respect to the optical fibers which conform to G652 and to 0.5 dB or less with respect to the optical fibers which has the mode field diameter of 10 μm or less in the same manner as the above-mentioned optical fiber cable 301.

In this manner, the optical fiber cable whose increase of loss at the time of performing the intermediate post branching is 1.0 dB or less can favorably perform the intermediate post branching in a live-line state and hence, it is possible to properly take out only the desired optical fiber by branching and to use other optical fibers at the downstream side. Accordingly, it is possible to effectively make use of all optical fibers housed in the optical fiber cable. Accordingly, the construction cost of the communication line can be suppressed to a low level.

Further, the optical fiber cable whose increase of loss at the time of performing the intermediate post branching is 0.5 dB or less can take out the desired optical fiber even when the high-speed communication is performed using the optical fiber which is not branched or even when the communication is performed in an area where the dynamic range is small. Accordingly, the degree of freedom in designing the optical communication system is remarkably enhanced.

An optical fiber cable according to the third embodiment of the present invention is explained in conjunction with FIG. 29 to FIG. 38.

Figure 29:
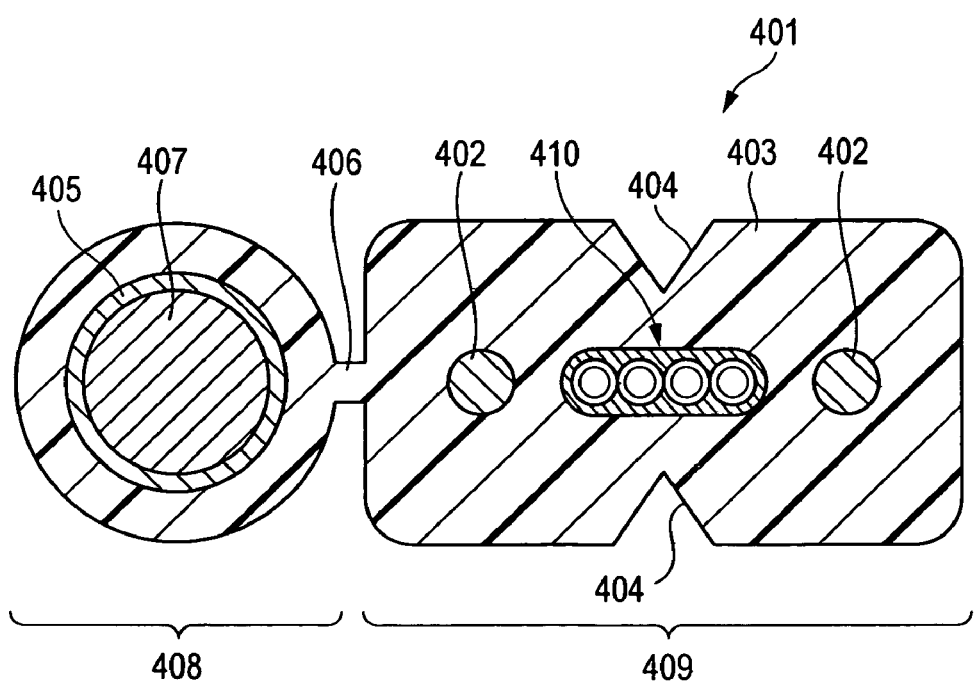
FIG. 29 is a cross-sectional view of an optical fiber cable according to a third embodiment of the present invention.

The optical fiber cable 401 shown in FIG. 29 is an optical fiber cable which is used as a drop cable. The optical fiber cable 401 is configured such that an element portion 409 and a messenger wire portion 408 are connected by means of a neck portion 406.

In the element portion 409, an optical fiber ribbon 410 which is arranged at the center of the element portion 409 and two tensile strength bodies 402 are integrally formed by covering them with a sheath 403 made of a thermoplastic resin. The optical fiber ribbon 410 and two tensile strength bodies 402 are covered by the sheath 403 such that they are adhered to each other. As the thermoplastic resin, a non-flammable polyethylene or PVC can be suitably used.

Two tensile strength bodies 402 are arranged in parallel on a coplanar face with the optical fiber ribbon 410 such that the optical fiber ribbon 410 is arranged between two tensile strength bodies 402.

The tensile strength bodies 402 are formed of a glass FRP or a steel wire and a profile of cross section has a circular shape.

Further, it is preferable to provide an adhesive layer (not shown in the drawing) on an outer periphery of the tensile strength body 402 made of glass FRP. In this case, the tensile strength bodies 402 and the sheath 403 are strongly adhered to each other. As a material of the adhesive layer, polyethylene is suitably used.

In this manner, by collectively covering the optical fiber ribbon 410 and the tensile strength bodies 402, the tensile strength bodies 402 receive an external force such as a tension applied to the element portion 409 so as to protect the optical fiber ribbon 410 from the external force.

Further, in the outer periphery of the element portion 409, two notches 404 are formed such that these notches 404 are directed to the optical fiber ribbon 410. The notches 404 are provided for facilitating the removal of the optical fiber ribbon 410. At the time of taking out the optical fiber ribbon 410, a cut is formed in the sheath 403 between two notches 404 and the sheath 403 is torn.

The messenger wire portion 408 is configured such that the messenger wire portion 408 has a strength to support the optical fiber cable 401 overhead and is formed by covering a support line 407 made of steel, FRP or the like with the sheath 403 made of thermoplastic resin. Further, an adhesive layer 405 is formed on an outer periphery of the support line 407 so as to strongly adhere the support line 407 and the sheath 403 to each other.

Further, in the neck portion 406, the element portion 409 and the messenger wire portion 408 are integrally formed of the same resin as the sheath 403 of the element portion 409 and the messenger wire portion 408. At this neck portion 406, when the element portion 409 and the messenger wire portion 408 are separated, the element portion 409 and the messenger wire portion 408 can be easily torn apart using a hand or fingers.

As the optical fiber ribbon 410 which is housed in the optical fiber cable according to the present invention, an optical fiber ribbon 10 which is similar to the optical fiber ribbons of the above-mentioned first and the second embodiment can be named. That is, as shown in FIG. 1A, for example, in the optical fiber ribbon 410, a plurality (four in this embodiment, for example) of optical fibers 11 are arranged in parallel and the whole outer peripheries of the optical fibers 11 which are arranged in parallel are integrally covered with the sheath 12 over the whole length of the optical fibers 11. With respect to the detailed structure and the characteristics of the optical fiber ribbon 410, the detailed explanations are omitted.

In the optical fiber ribbon 410 of this embodiment, the thickness of the sheath 12 is set smaller than the thickness of a sheath 12 of an optical fiber ribbon which has been used in the related art. Here, assuming the maximum value of the thickness of the optical fiber ribbon 410 as T(μm) and the outer diameter of the optical fiber 11 as d(μm), the thickness t of the sheath 12 can be calculated based on a formula t=(T−d)/2. In the optical fiber ribbon 410, the thickness t of the sheath 12 is set such that the thickness satisfies T≦d+40 (μm), that is, the thickness t of the sheath 12 becomes equal to or less than 20 μm.

With the use of the optical fiber ribbon 410 having thin sheath 12, the optical fiber cable 401 from which an intermediate optical fiber ribbon can be taken out extremely easily can be obtained at low cost.

In this manner, in the optical fiber ribbon 410, since the thickness t of the sheath 12 is small, the resin 112 can be easily started to be peeled off by generating cracks or peeling in the sheath 12 manually by an operator or using a branching tool. Accordingly, the optical fiber 11 can be easily branched by peeling off the sheath 12 from the optical fiber ribbon 410. That is, the optical fiber ribbon 410 has the structure which facilitates the intermediate post branching operation.

Further, the method for performing the intermediate post branching is performed in accordance with the above-mentioned steps which have been explained in conjunction with FIGS. 2A–2C Here, the relationship between the operability of the intermediate post branching and the live-line loss increase at the time of performing such branching which differs depending on the difference in thickness t of the sheath 12 is shown in Table 26. Further, Table 26 shows the result of the separation experiment showing the strength of integrity of the optical fibers. Here, the outer diameter d of the optical fibers of the optical fiber ribbon shown in Table 26 is 250 μm. Further, the Young's modulus of the resin which constitutes the sheath 12 is 900 MPa.

TABLE 26

| ribbon thickness T (μm) | 250 | 251 | 260 | 270 | 275 | 280 | 290 | 300 | 310 | 320 |
|---|---|---|---|---|---|---|---|---|---|---|
| ribbon resin thickness t (μm) | 0.0 | 0.5 | 5 | 10 | 12.5 | 15 | 20 | 25 | 30 | 35 |
| intermediate post branching property | very good | very good | good | good | good | good | fair | not good | not good | not good |
| live-line loss increase | good | good | good | good | good | fair | fair | not good | not good | not good |
| with or without fiber separation | not good | good | good | good | good | good | good | good | good | good |

Here, the optical fiber ribbon with the sheath having the thickness t of 0.0 in Table 26 indicates the optical fiber ribbon in which the resin does not cover the whole optical fibers as shown in FIG. 10.

The intermediate post branching property shown in Table 26 indicates the easiness in branching the intermediate portion of the optical fiber ribbon into respective optical fibers while suppressing the increase of the transmission loss to a value equal to or less than 1.0 dB. As criteria for evaluation in this specification, "very good" indicates that the branching can be performed within 2 minutes on average, "good" indicates that the branching can be performed over two minutes and within 3 minutes on average and "fair" indicates that the branching can be performed over 3 minutes and within 5 minutes on average. Further, "no good" indicates that the branching operation takes more than 5 minutes on average.

Further, when the increase of the transmission loss at the time of branching is equal to or less than 1.0 dB, it means that the live-line branching can be performed.

Here, the experiment on the intermediate post branching property is explained.

First, as shown in FIG. 30A, the sheath at the both ends of the optical fiber cable 410 is removed by approximately 1 m at each end and, then, the optical fiber ribbon 410 is taken out. Then, both ends of the optical fiber ribbon 410 are respectively separated into single fibers and a light source 420 for emitting light having a wavelength of 1.55 μm is connected to the optical fiber 11a of the primary fiber on one side and a light receiving device 421 and a storage oscilloscope 422 are connected to the optical fiber 11a of the primary fiber at the other side. In this state, light having a wavelength of 1.55 µm is emitted from the light source 420 and is incident on the optical fiber 11a of the primary fiber. The incident light is transmitted to the other side of the optical fiber 11a and is received by the light receiver 421. An amount of the received light is observed by the storage oscilloscope 422 at proper times.

Then, in a state that the incidence of the light from the light source 420 is continued, as shown in FIG. 30B, the sheath is removed by making use of the notches at the intermediate portion of the optical fiber cable 401 by approximately 50 cm. The optical fiber ribbon 410 is taken out and the intermediate post branching of the optical fiber ribbon 410 is performed. That is, the optical fiber ribbon 410 is branched into single fibers in a state that the first optical fiber 11a is in a live-line state (live-line branching). At this time, the increase amount of the transmission loss brought about by the intermediate post branching is measured by the storage oscilloscope 422.

Here, the length of the portion for the intermediate post branching is set to 40 cm. Further, the method for performing the intermediate post branching is performed in accordance with the above-mentioned steps which have been explained in conjunction with FIGS. 2A–2C.

Among the optical fiber ribbons shown in Table 26, the optical fiber ribbons whose intermediate post branching property is "very good", "good" or "fair" have the ribbon thicknesses T which is equal to or less than 290 µm, that is, $T \leq d+40$ (µm). In each of these optical fiber ribbons, the intermediate post branching can be performed within 5 minutes while suppressing the increase of the transmission loss at the time of branching to a value equal to or less than 1.0 dB. That is, the live-line branching can be performed within 5 minutes.

On the other hand, with respect to the optical fiber ribbons available in the related art having a thick sheath in which the ribbon thickness T exceeds the outer diameter d of the optical fiber by more than 40 µm, the evaluation of the intermediate post branching property is "no good". The increase amount of the transmission loss at the time of branching exceeds 1.0 dB or, even when the branching can be performed, the time necessary for branching exceeds 5 minutes and hence, the live-line branching cannot be performed actually.

The live-line loss increase shown in Table 26 is the increase amount of the transmission loss which is generated during the intermediate post branching operation. As criteria for evaluation in this specification, "very good" indicates that the transmission loss does not increase by more than 0.1 dB during the branching operation, "good" indicates that the transmission loss does not increase by more than 0.5 dB during the branching operation and "fair" indicates that the transmission loss does not increase by more than 1.0 dB during the branching operation. Further, "no good" indicates that the increase amount of the transmission loss exceeds by more than 1.0 dB during the branching operation.

Among the optical fiber ribbons shown in Table 26, the optical fiber ribbons whose live-line loss increase is "very good", "good" or "fair" have ribbon thicknesses T equal to or less than 290 µm, that is, $T \leq d+40$ (µm). In each of these optical fiber ribbons, the intermediate post branching in live-line can be performed while suppressing the increase of the transmission loss at the time of branching to a value equal to or less than 1.0 dB. Among these optical fiber ribbons, the optical fiber ribbons having the ribbon thickness T of equal to or less than 275 µm, that is, $T \leq d+25$ (µm) are more preferable, since the evaluation on the live-line increase loss is "good" and the increase amount of the transmission loss is further suppressed to a low level.

On the other hand, with respect to the optical fiber ribbons available in the related art having a thick resin in which the ribbon thickness T exceeds the outer diameter d of the optical fibers by more than 40 µm, the evaluation on the live-line loss increase is "not good" and the increase an amount of the transmission loss exceeds 1.0 dB during the branching operation.

The presence and non-presence of fiber separation shown in Table 26 show the result of separation experiment showing the strength of integrity of the optical fiber.

Here, the separation experiment is performed in accordance with the steps shown in FIG. 22.

As criteria for evaluation of the fiber separation in this specification, "good" indicates a case in which there is no separation between the optical fiber and the resin and the optical fiber ribbon remains integrally formed in a lengthwise direction and "no good" indicates a case in which areas where the optical fiber and the resin are separated are generated.

Among the optical fiber ribbons shown in Table 26, when the thickness T satisfies $T \geq d+1$ (µm), the separation between the optical fiber ribbons is not generated and hence is favorable. That is, it is understood that when the thickness t of the resin is equal or more than 0.5 µm, enough strength which can keep the respective optical fibers integrated to each other can be obtained.

Among the optical fiber ribbons shown in Table 26, when the thickness T assumes T=d (see FIG. 10), although separation area is generated in this separation experiment, by controlling such that the external power such as ironing or the like which is applied on the optical fiber ribbon in the manufacturing line of the optical fiber cable is reduced, drawbacks such as the generation of the separation of the ribbons during the manufacturing process of the cable can be prevented. Further, in this optical fiber ribbon in which the thickness T assumes T=d, because the sheath is practically disconnected at the areas in the thickness direction of the optical fiber ribbon which passes through the center of the respective optical fibers, the respective optical fibers are easily separated in the widthwise direction of the optical fiber ribbon and hence, compared to the optical fiber ribbons which are configured such that the whole of the respective optical fibers are covered with the sheath, the intermediate post branching property is favorable.

Further, in the optical fiber ribbon 10A in which the whole of the respective optical fibers 11A are not covered with the resin 12aA as shown in FIG. 10, the respective fiber 11A is integrally formed using only the adhesive strength between the resin 12aA and the optical fiber. On the other hand, the optical fiber ribbon 10 shown in FIG. 1A, because the resin covers the whole of the respective optical fibers 11 integrally as the sheath 12, not only by the adhesive strength between the resin and the optical fiber, but also by the strength with which the sheath 12 itself tries to hold its shape, the state in which the whole of the optical fiber ribbon 10 is integrated can be easily maintained.

Next, another preferred mode of the optical fiber ribbon which is housed in an optical fiber cable according to the third embodiment of the present invention is explained.

As shown in FIG. 11A, in the optical fiber ribbon 410, with respect to the sheath 112 which covers the optical fibers 141, each recessed portion 116 is formed in the sheath corresponding to each indentation formed between the neighboring optical fibers 111, 111. In the recessed portion 116, the bottom portion 117 is formed as a portion where the indentation is largest. With respect to the detailed constitution and the characteristics regarding the optical fiber ribbon 410b, the detailed description is omitted.

As mentioned above, it is favorable that the thickness of the sheath which is formed on the periphery of the optical fiber 11 is preferably small from a viewpoint of reduction of the increase of the live-line loss and it is more preferable that the thickness of the sheath 12 is approximately 0.5 µm. However, in manufacturing such an optical fiber ribbon actually, it is preferable that a certain degree of thickness is ensured. The reason is that in an attempt to make the thickness of the resin which constitutes the resin thin, there is a possibility that the resin is not applied partially (this phenomenon being referred to as "shortage of resin". Accordingly, it is preferable to form the resin having a thickness of 2.5 µm or more with respect to the optical fibers 111. In this case, to reduce an amount of the resin in the thickness direction of the optical fiber ribbon while ensuring a given resin thickness, the resin formed between the indentation of the neighboring optical fibers may be reduced. Portions where the shortage of resin occurs are portions where the outer diameter of the optical fiber assumes the largest value in the thickness direction of the optical fiber ribbon and hence, the reduction of an amount of the resin between the neighboring optical fibers does not obstruct the reliable coating of the resin.

Accordingly, the formation of the recessed portions 116 as shown in FIG. 11A can suppress the increase of the live-line loss at the time of performing the intermediate post branching while preventing the shortage of resin.

Further, as the optical fiber ribbon which is housed in the optical fiber cable of this embodiment, an optical fiber ribbon 110A shown in FIG. 13A which is a mode obtained by partially modifying the constitution of the optical fiber ribbon 110 shown in FIG. 11A is named.

Here, with respect to the depth of the recessed portions formed in the resin shown in FIG. 11A and FIG. 13, the prevention of separation of the optical fiber at the time of manufacturing the optical fiber ribbon by arranging a plurality of optical fibers in parallel and by integrating them using a resin, the prevention of peeling-off (becoming a cause of separation of the optical fibers) at the time of performing the installation operation of the optical fiber ribbon, or the increase or decrease of transmission loss during the favorable branching operation or the live-line branching are reviewed. As a result, it is preferable that the recessed portions are formed such that the recessed portions do not exceed a common tangent line which is formed by the neighboring optical fibers. That is, it is favorable that the recessed portions are formed at the inner side than the common tangent.

The result of the review is specifically explained hereinafter.

With respect to cases in which the thickness T(µm) of the optical fiber ribbon is set to 270 µm, 280 µm and 290 µm, a ratio t/Y which is a ratio of the thickness t(µm) of the resin with respect to the depth Y(µm) of the recessed portion and a ratio g/d which is a ratio of thickness g(µm) of the optical fiber ribbon at the recessed portion with respect to the outer diameter (µm) of the optical fiber when the depth d of the recessed portion differs are calculated, and the intermediate post branching property, and the increase of live-line loss a for respective cases are reviewed.

The relationship between the intermediate post branching property and the live-line loss increase when the thickness T of the optical fiber ribbon is 270 µm is shown in Table 27. Here, the ratio (T−d)/2Y in the table has the same value as t/Y.

TABLE 27

| ribbon thickness T (µm) | 270 | 270 | 270 | 270 | 270 | 270 | 270 | 270 | 270 |
|---|---|---|---|---|---|---|---|---|---|
| ribbon resin thickness t (µm) | 10 | 10 | 10 | 10 | 10 | 10 | 10 | 10 | 10 |
| recessed portion depth Y (µm) | 1 | 2 | 5 | 10 | 20 | 30 | 40 | 50 | 100 |
| ratio (T − d)/2Y | 10 | 5 | 2 | 1 | 0.5 | 0.333 | 0.25 | 0.2 | 0.1 |
| ratio g/d | 1.072 | 1.064 | 1.04 | 1 | 0.92 | 0.84 | 0.76 | 0.68 | 0.28 |
| intermediate post branching property | good | good | very good | very good | very good | very good | very good | very good | very good |
| live-line loss increase | good | good | good | very good | very good | very good | very good | very good | very good |

The relationship between the intermediate post branching property and the live-line loss increase when the thickness T of the optical fiber ribbon is 280 µm is shown in Table 28.

TABLE 28

| ribbon thickness T (µm) | 280 | 280 | 280 | 280 | 280 | 280 | 280 | 280 | 280 |
|---|---|---|---|---|---|---|---|---|---|
| ribbon resin thickness t (µm) | 15 | 15 | 15 | 15 | 15 | 15 | 15 | 15 | 15 |

TABLE 28-continued

| recessed portion depth Y (μm) | 1 | 2 | 5 | 10 | 20 | 30 | 40 | 50 | 100 |
|---|---|---|---|---|---|---|---|---|---|
| Ratio (T − d)/2Y | 15 | 7.5 | 3 | 1.5 | 0.75 | 0.5 | 0.375 | 0.3 | 0.15 |
| Ratio g/d | 1.112 | 1.104 | 1.08 | 1.04 | 0.96 | 0.88 | 0.8 | 0.72 | 0.32 |
| intermediate post branching property | good | good | very good | very good | very good | very good | very good | very good | very good |
| live-line loss increase | fair | fair | fair | fair | good | good | very good | very good | very good |

The relationship between the intermediate post branching property and the live-line loss increase when the thickness T of the optical fiber ribbon is 290 μm is shown in Table 29.

TABLE 29

| ribbon thickness T (μm) | 290 | 290 | 290 | 290 | 290 | 290 | 290 | 290 | 290 |
|---|---|---|---|---|---|---|---|---|---|
| ribbon resin thickness t (μm) | 20 | 20 | 20 | 20 | 20 | 20 | 20 | 20 | 20 |
| recessed portion depth Y (μm) | 1 | 2 | 5 | 10 | 20 | 30 | 40 | 50 | 100 |
| ratio (T − d)/2Y | 20 | 10 | 4 | 2 | 1 | 0.667 | 0.5 | 0.4 | 0.2 |
| ratio g/d | 1.152 | 1.144 | 1.12 | 1.08 | 1 | 0.92 | 0.84 | 0.76 | 0.36 |
| intermediate post branching property | fair | fair | good | good | very good | very good | very good | very good | very good |
| live-line loss increase | fair | fair | fair | fair | fair | fair | fair | good | good |

As shown in Table 27 to Table 29, with respect to both of the intermediate post branching property and the live-line loss increase, the better result is obtained as the depth Y of the recessed portion increases.

Further, when the thickness T of the optical fiber ribbon is 270 μm or 280 μm, that is, T≦d+30 (μm), the result of the live-line loss increase is especially favorable. It can be considered that this is because that, when a branching tool as shown in FIGS. 12A–12C is used, due to the advantageous effect of the recessed portions, the branching property is improved compared to the optical fiber ribbon whose resin is merely formed thin. For example, when the ribbon thickness T assumes 270 μm shown in Table 27, the intermediate post branching property is "good", while when the ribbon thickness T assumes 280 μm and the depth Y of the recessed portion assumes 5 μm shown in Table 29, the intermediate post branching property is "very good". Accordingly, the effect of the recessed portions is confirmed.

Further, it is understood that when focusing on the intermediate post branching property, the intermediate post branching property is especially associated with the value of the ratio (T−d)/2Y. For example, when the ration (T−d)/2Y is equal to or less than 4.0, the intermediate post branching property is good.

Further, when the ration g/d is equal to or less than 1.0, that is, when the bottom portion of the recessed portion is located at the inner side of the common tangent of the optical fibers, the intermediate post branching property is good and the live-line loss increase becomes low, and when the ratio g/d is equal to or less than 1.0, the advantageous effect is further distinguished.

It is favorable that, in the optical fiber ribbon on which the recessed portion is formed as shown in FIG. 11A or FIG. 13A, the recessed portion is formed in a smooth curved shape R. For example, it is because, when the recessed portion has the bottom portion having the pointed shape in conformity with the shape of the optical fiber ribbon, the stress concentrates on the bottom portion and hence, it becomes to easily generate cracks and fractures.

Further, as shown in FIG. 1A, FIG. 10, FIG. 11A, FIG. 13A, in the optical fiber ribbon which is used in the optical fiber cable of the present invention, the adhesive strength between the optical fiber and the sheath (resin) sometimes affects the increase of transmission loss and the branching operability at the live-line branching. With respect to the adhesive strength of the optical fiber and the resin, considering the prevention of the increase of transmission loss and the branching operability, it is favorable that the adhesive strength per one optical fiber is within a range of 0.245 (mN) to 2.45 (mN) When the above-mentioned adhesive strength is smaller than the above-mentioned region, it sometimes happens that the sheath (resin) is broken when forming the cable and the respective optical fibers are separated. Further, when the above-mentioned adhesive strength is larger than the above-mentioned region, the branching property is deteriorated.

The adhesive strength between the optical fiber and the resin can be measured by the method which has been explained above in conjunction with FIGS. 5 and 6.

In the optical fiber ribbon which is used in the present invention, when the main object is that the optical fibers keep the integrality without being separated from each other, it is favorable that the thickness of the resin is equal to or more than 0.5 µm and, in this case, the maximum thickness T of the optical fiber ribbon becomes T≧outer diameter d of the optical fiber+1 (µm).

Further, properties of the resin of the optical fiber ribbon also sometimes affect the increase of the transmission loss or the branching operability at the live-line branching. With respect to the material properties of the resin, it is favorable that the yield point stress is within a range of 20 MPa to 45 MPa and the branching operation can be easily performed as well as the transmission loss at the time of live-line branching can be suppressed. The yield point stress is measured in conformity with JIS K7113 using a No.2 test piece at a tension speed of 50 mm/minute. When the yield point stress is less than 20 MPa, it sometimes happens that the respective optical fibers are separated by an external stress which is applied in the steps for forming the optical fiber ribbon into a cable and hence, the optical fiber ribbon cannot be formed into a cable. When the yield point stress exceeds 45 MPa, it is difficult to break the resin and the intermediate post branching of the optical fiber ribbon is difficult to be performed.

Further, here, with respect to the optical fiber cable 401 shown in FIG. 29, the value of the transmission loss in the ordinary condition with a wavelength of 1.55 µm and the increase amount of the transmission loss of the intermediate post branching are measured.

Here, the optical fiber cable 401 used in this embodiment has the whole width of 6.0 mm, a thickness of 2.0 mm, while a support line 7 and a tensile strength body 402 are made of a steel wire.

Further, the optical fiber ribbon which is used in this embodiment is the optical fiber ribbon 110A shown in FIG. 13A and a thickness T thereof is 270 µm. The outer diameter d of the optical fiber 11 is 250 µm. Further, the thickness t of the resin is 10 µm and the depth of the recessed portions is 50 µm. However, as the optical fibers which are integrated as the optical fiber ribbon, a case in which the optical fibers which conform to G652 are used and a case in which the optical fibers having the mode field diameter equal to or less than 10 µm are used are provided and the results of the measurement by comparing respective cases are provided.

With respect to the value of the transmission loss of the optical fibers in the condition that the optical fibers are covered with the cable sheath 403 as the optical fiber cable 401, when the optical fibers conforming to G652 are used, the maximum value is 0.22 dB/km and the average value is 0.20 dB/km. When the optical fiber having the mode field diameter equal to or less than 10 µm are used, the maximum value is 0.21 dB/km and the average value is 0.19 dB/km.

In this manner, with respect to the transmission loss of the optical fibers in a state that the optical fibers are formed into the cable, the optical fibers having the mode field diameter equal to or less than 10m exhibit the particularly favorable property.

Further, in accordance with the method shown in FIGS. 30A–30B, the intermediate post branching is performed on the optical fiber cable so as to measure the transmission loss thereof.

The transmission loss is measured by observing the operation from a point of time the sheath 403 is removed from the optical fiber cable 401 to the completion of the intermediate post branching using the storage oscilloscope 422.

As a result, with respect to the increase amount of the transmission loss during the operation, in both of the case in which the optical fibers conforming to G652 is used and the case in which the optical fibers having the mode field diameter of equal to or less than 10 µm is used, values which are equal to or more than 0.1 dB cannot be recognized.

In this manner, the optical fiber cable which exhibits the increase of the loss amounting to a value equal to or less than 1.0 dB at the time of performing the intermediate post branching can perform the intermediate post branching in the live-line condition favorably and hence, only the desired optical fibers can be appropriately branched and be taken out and other optical fibers can be used in the downstream side. Accordingly, all of the optical fibers housed in the optical fiber able can be effectively used. Accordingly, the construction cost of the communication line can be suppressed to a low level.

Further, with respect to the optical fiber cable which can suppress the increase of transmission loss at the time of intermediate post branching to a value equal to or less than 0.5 dB, even when the high speed communication is performed through the optical fibers with no branching or even when the communication is performed in a region having a small dynamic range, desired optical fibers can be branched and taken out. Accordingly, the design flexibility of the optical communication network can be remarkably enhanced.

Next, the optical fiber cable of another mode according to the present invention is explained.

Figure 31:
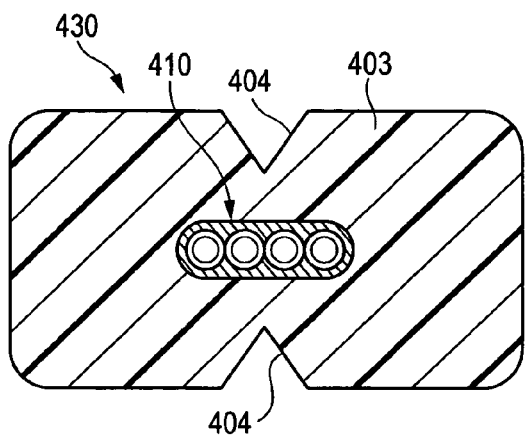
FIG. 31 is across-sectional view of another optical fiber cable according to the third embodiment of the present invention.

An optical fiber cable 430 which is shown in FIG. 31 is provided with neither the support line 407 nor the tensile strength body 402 which are shown in FIG. 29. In the optical fiber cable 430, an optical fiber ribbon 410 is covered with a sheath 403 made of a thermoplastic resin and two notches 404 are formed in a sheath 403.

Figure 32:
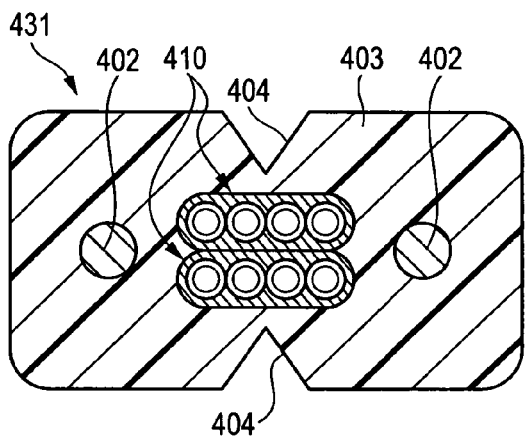
FIG. 32 is a cross-sectional view of another optical fiber cable according to the third embodiment of the present invention.

An optical fiber cable 431 which is shown in FIG. 32 is constituted of two optical fiber ribbons 410, two tensile strength bodies 402 and a sheath 403. Two optical fiber ribbons 410 are arranged between two tensile strength bodies 402 in a state that two optical fiber ribbons are stacked in contact with each other in the thickness direction and is covered with a sheath 403 together with two tensile strength bodies 402. Further, two notches 404 are formed in the sheath 403.

Figure 33:
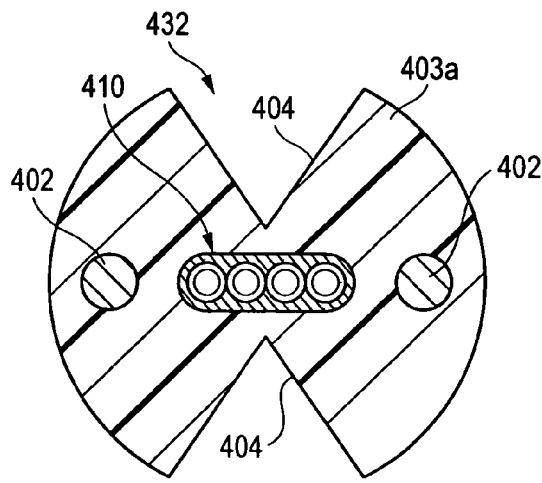
FIG. 33 is a cross-sectional view of another optical fiber cable according to the third embodiment of the present invention.

In an optical fiber cable 432 which is shown in FIG. 33, an optical fiber ribbon 410 and two tensile strength bodies 402 are covered with a sheath 403a having a substantially circular contour. Two notches 404 are also formed in the sheath 403a.

Figure 34:
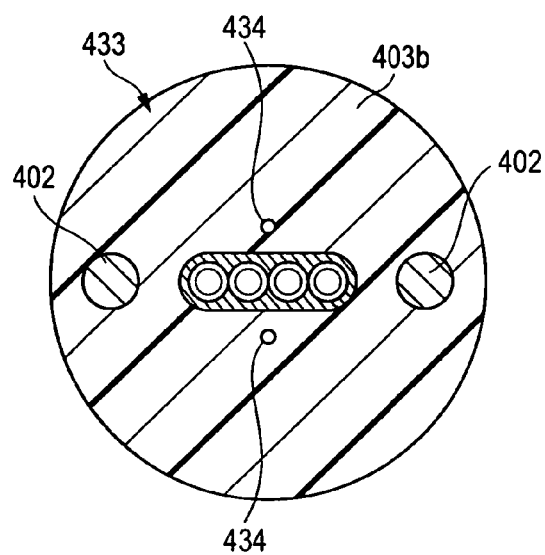
FIG. 34 is across-sectional view of another optical fiber cable according to the third embodiment of the present invention.

In an optical fiber cable 433 shown in FIG. 34, an optical fiber ribbon 410 and two tensile strength bodies 402 are covered with a sheath 403b having a circular contour. Although no notch is formed in the sheath 403b, two tearing strings 434 for tearing off the sheath 403b are mounted in the neighborhood of the optical fiber ribbon 410. When the optical fiber ribbon 410 is taken out, by pulling these tearing strings 434 to the outside of the sheath 403b in directions opposite to each other, the sheath 403b can be torn.

Figure 35:
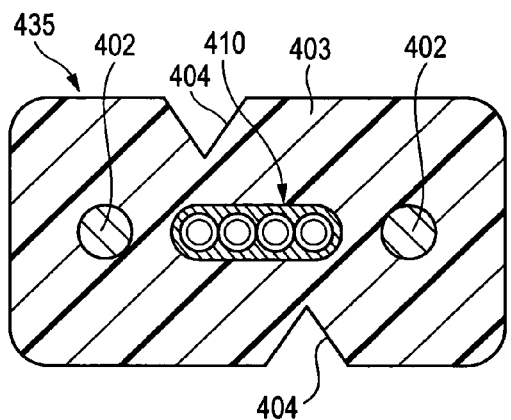
FIG. 35 is a cross-sectional view of another optical fiber cable according to the third embodiment of the present invention.

An optical fiber cable 435 which is shown in FIG. 35 is constituted of an optical fiber ribbon 410, two tensile strength bodies 402 and a sheath 403. Two notches 404 which are formed in the sheath 403 are not formed on the same area in the thickness direction and on the center in the widthwise direction of the optical fiber ribbon 410 but the respective notches 404 are formed toward the end portions of the widthwise direction of the optical fiber ribbon 410. In this manner, by forming two notches 404 on asymmetrical positions, when the sheath 403 is torn from these notches 404, the optical fiber ribbon can be easily taken out due to such a constitution.

Figure 36:
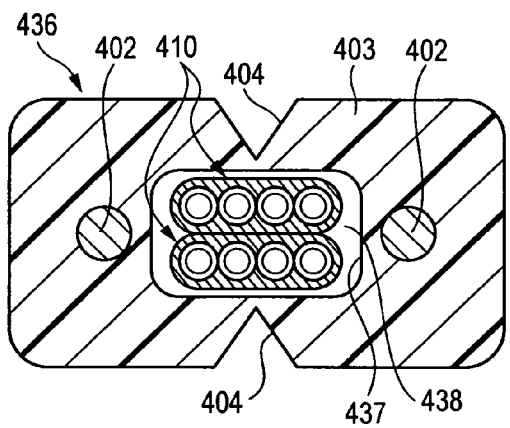
FIG. 36 is across-sectional view of another optical fiber cable according to the third embodiment of the present invention.

In an optical fiber cable 436 shown in FIG. 36, similar to the optical fiber cable 431 shown in FIG. 32, two optical fiber ribbons 410 are covered with a sheath 403 together with two tensile strength bodies 402. However, two optical fiber ribbons 410 are housed in a housing hole 437 which is formed in the sheath 403 and are not completely brought into contact with the sheath 403. That is, between the optical fiber ribbons 410 and the sheath 403, an inner cavity 438 of a housing hole 437 is mounted. In this case, when the optical fiber cable 436 is bent or is twisted, because the optical fiber ribbons 410 are not always deformed together with the sheath 403, the increase of transmission loss can be suppressed to a low level. Further, when the optical fiber ribbons 410 are taken out by tearing the sheath 403 from the notch 404, the frictional force caused by the displacement of the sheath is not applied directly to the optical fiber ribbons 410 and hence, an undesired separation of the optical fiber ribbons 410 can be prevented.

Figure 37:
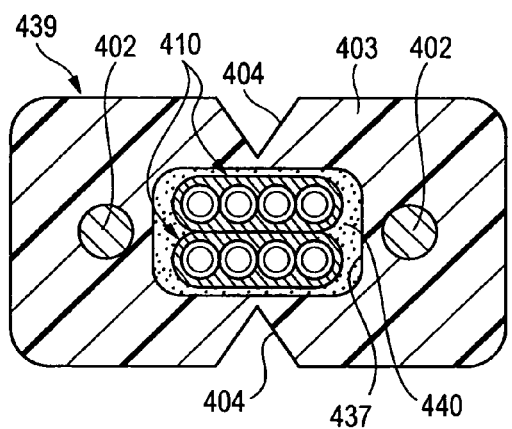
FIG. 37 is across-sectional view of another optical fiber cable according to the third embodiment of the present invention.

Further, like an optical fiber cable 439 shown in FIG. 37, in a housing hole 437, a separator 440 can be mounted together with the optical fiber ribbons 410. Here, the separator 440 may be, for example, an separator which can decrease the frictional resistance between the optical fiber ribbon 410 and the sheath 403 such as oil, talc or the like, or may be a fiber-type yarn which is formed of polypropylene or the like having a function as a tensile strength body.

Figure 38:
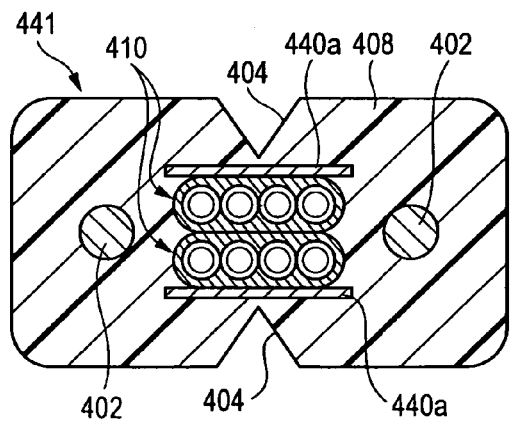
FIG. 38 is across-sectional view of another optical fiber cable according to the third embodiment of the present invention.
Figure 39:
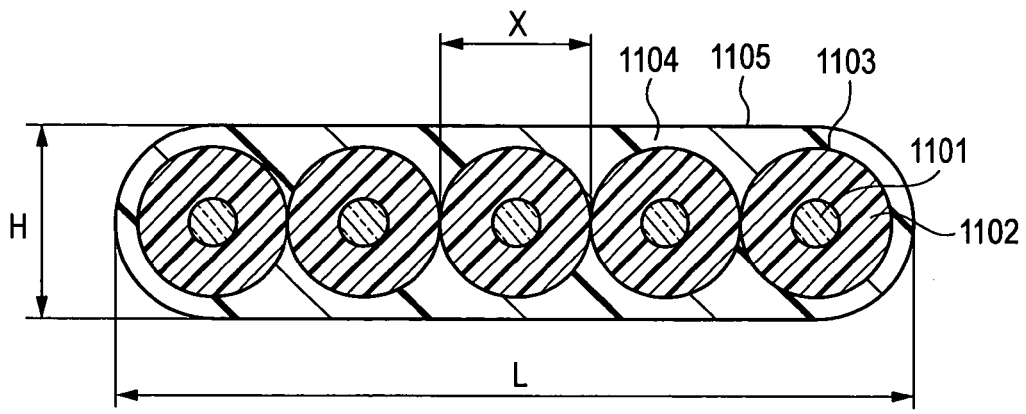
FIG. 39 is a cross-sectional view showing a related-art optical fiber ribbon described in Japanese Unexamined Patent Publication Sho. 61(1986)-73112.
Figure 40A:
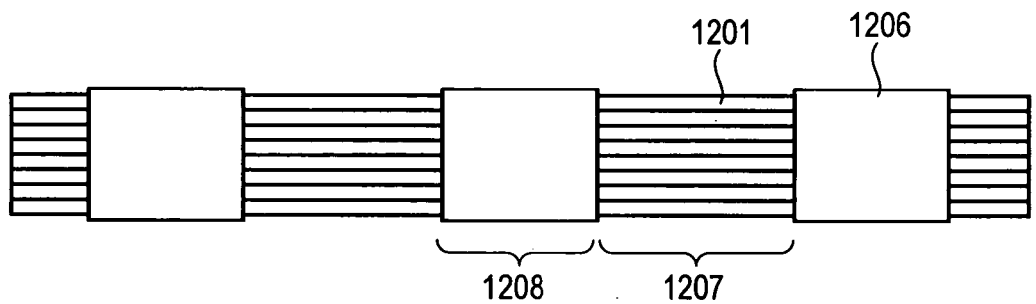
FIG. 40 is a cross-sectional view showing a related-art optical fiber ribbon described in Japanese Unexamined Utility Model Publication Hei4(1992)-75304.
Figure 40B:
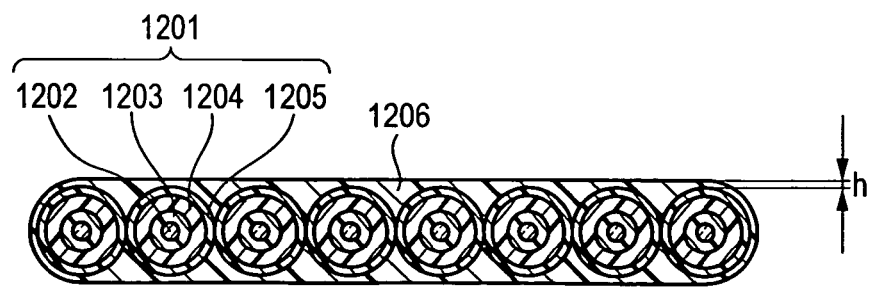
Figure 41:
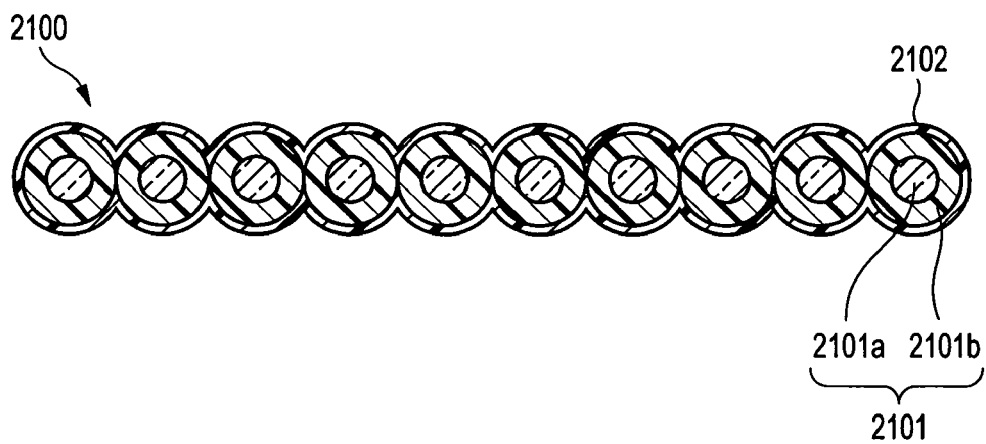
FIG. 41 is a cross-sectional view showing a related-art optical fiber ribbon described in Japanese Unexamined Patent Publication Sho. 63(1988)-13008.
Figure 42:
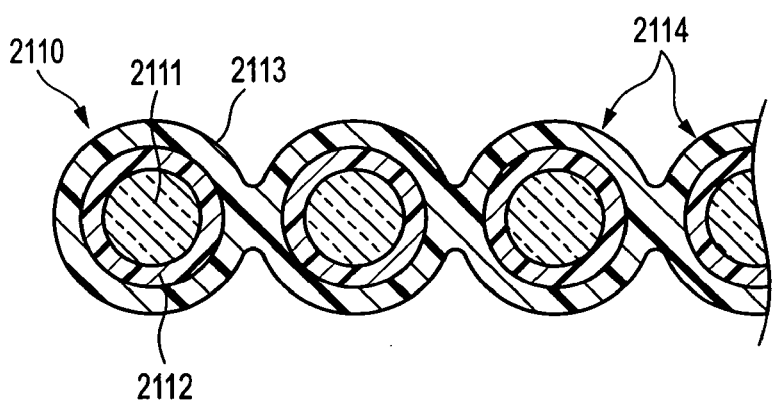
FIG. 42 is a cross-sectional view showing a related-art optical fiber ribbon described in U.S. Pat. No. 4,147,407.
Figure 43:
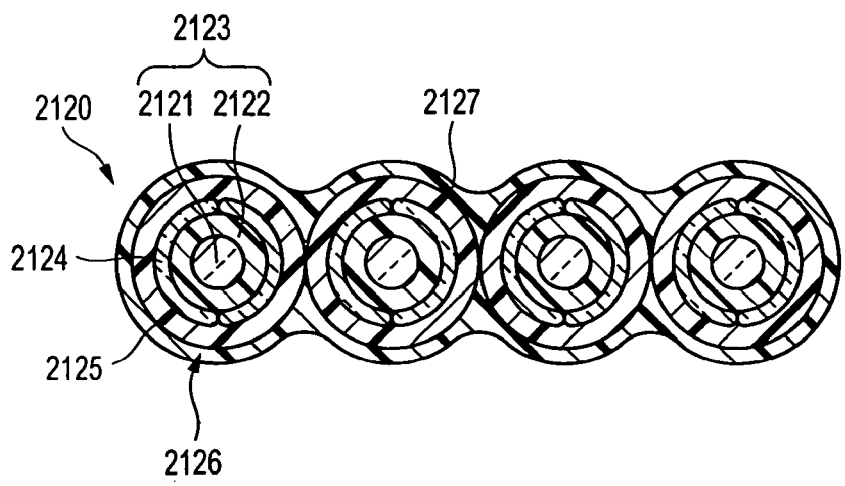
FIG. 43 is a cross-sectional view showing a related-art optical fiber ribbon described in Japanese Accepted Patent Publication Sho. 63(1988)-2085.
Figure 44:
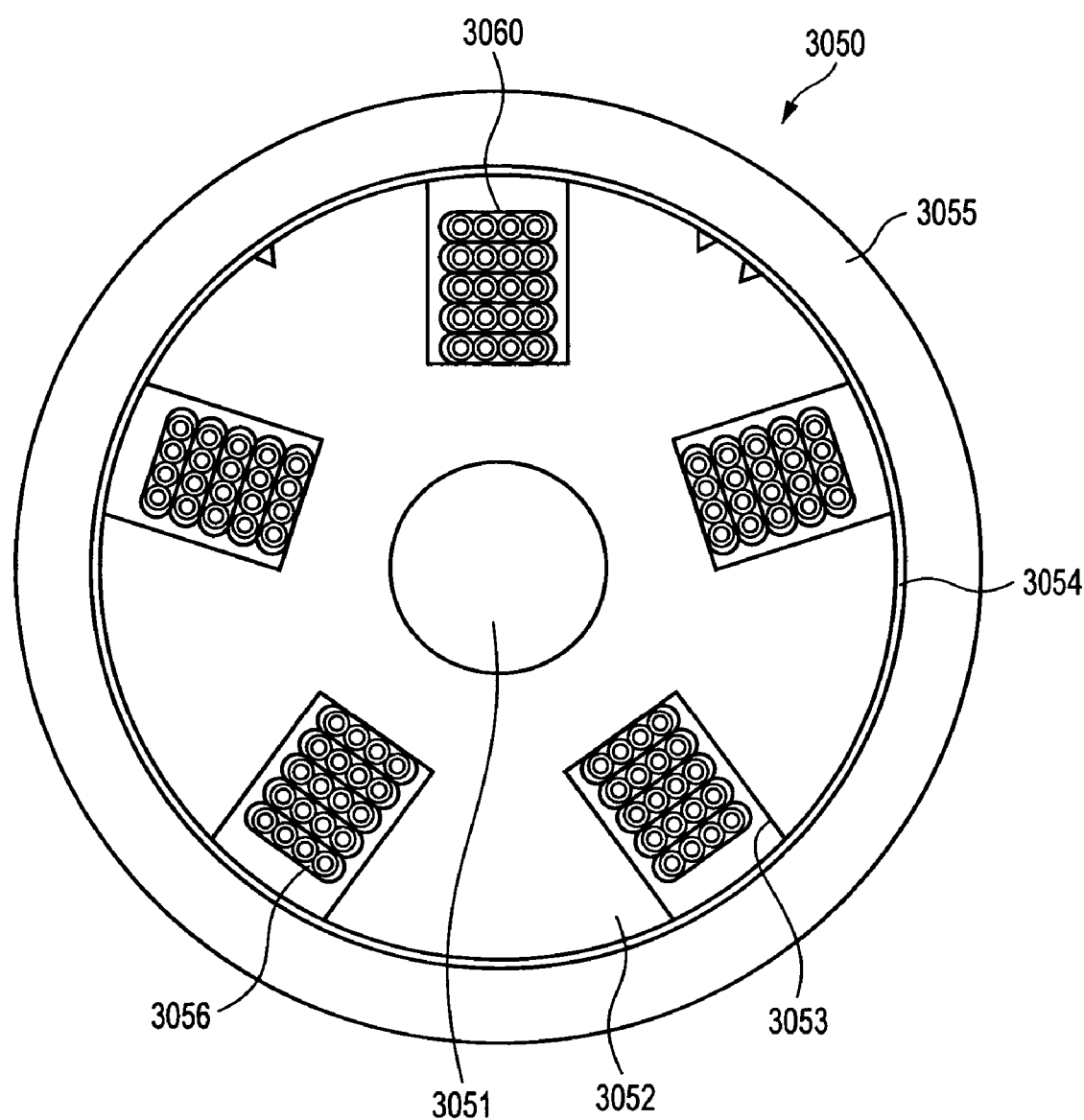
FIG. 44 is a cross-sectional view of an example of a related-art optical fiber cable.
Figure 45:
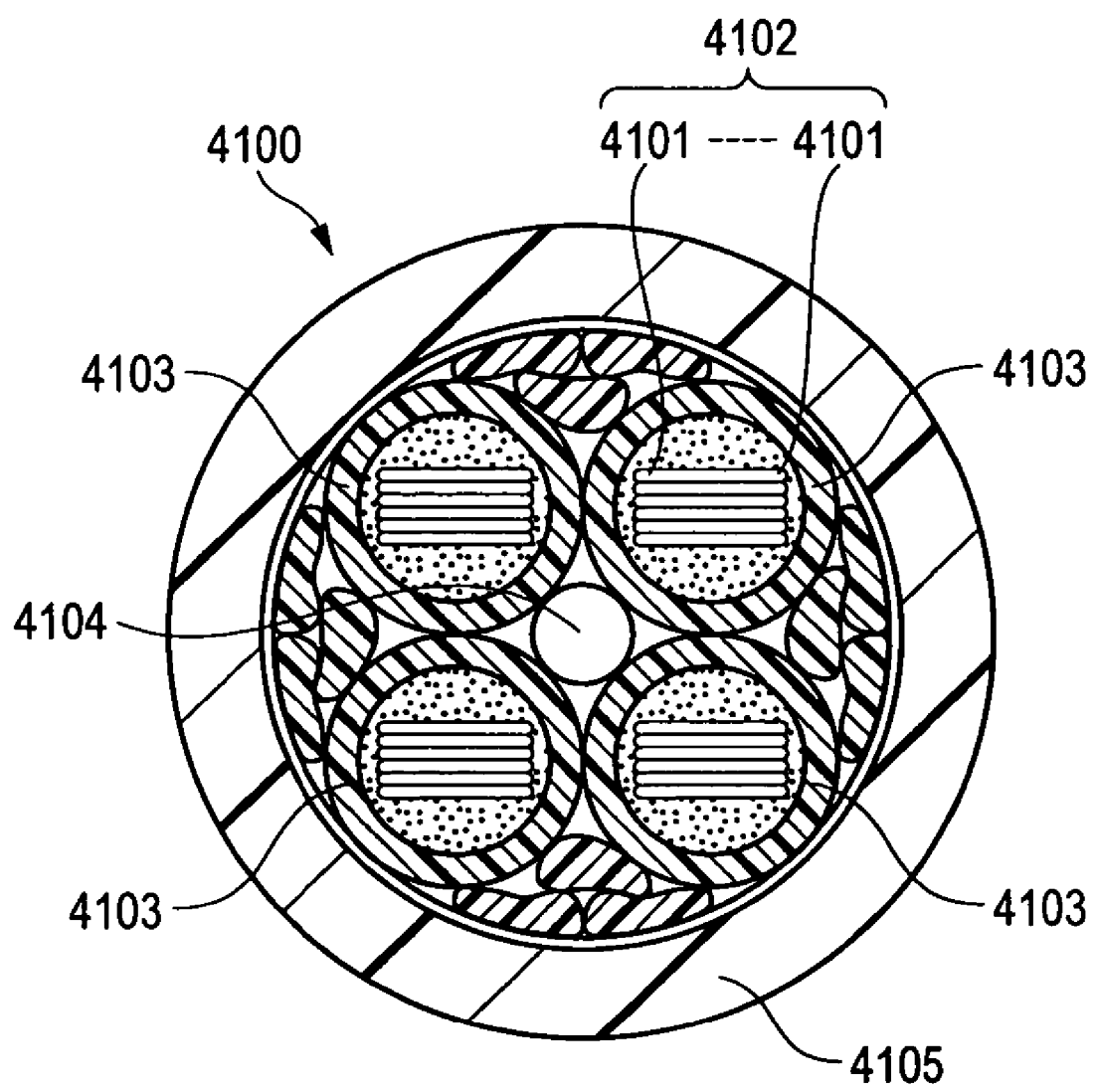
FIG. 45 is a cross-sectional view of an example of a related-art optical fiber cable.
Figure 46:
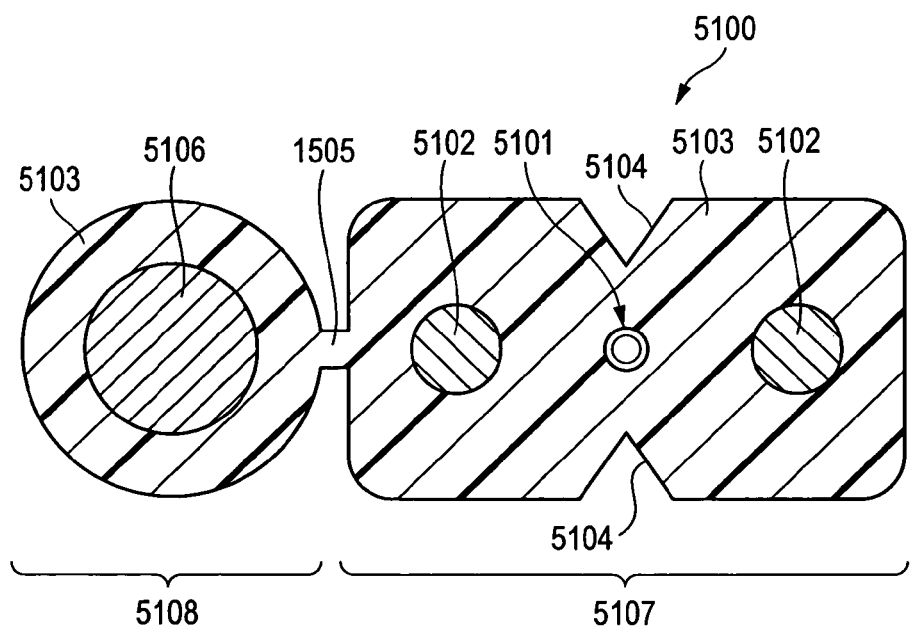
FIG. 46 is a cross-sectional view of an example of a related-art optical fiber cable.
Figure 47:
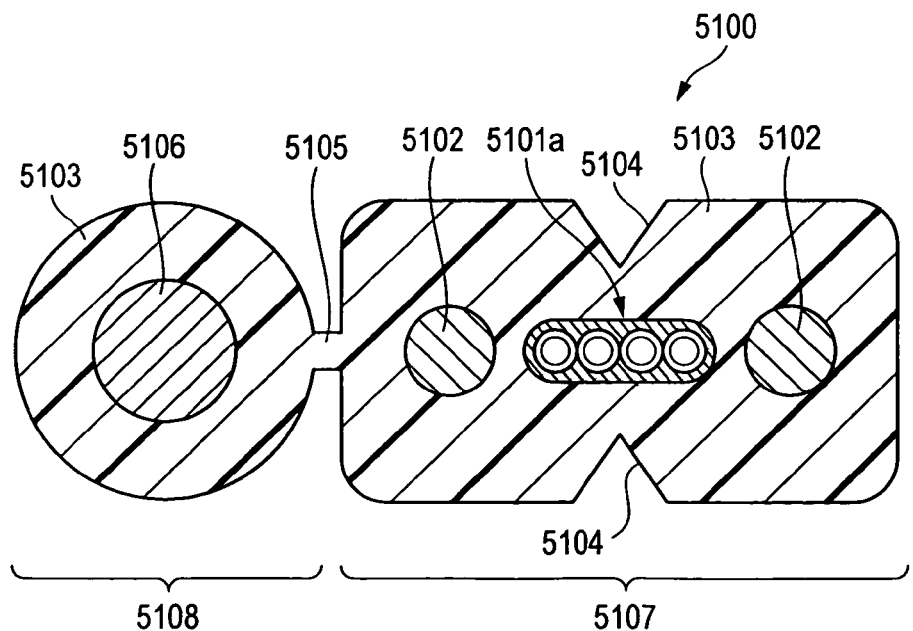
FIG. 47 is a cross-sectional view of an example of a related-art optical fiber cable.

Further, like an optical fiber cable 441 which is shown in FIG. 38, without forming a housing hole, a ribbon-shaped intermediate 440a which is arranged such that the intermediate 440a lies along the optical fiber ribbon 410 may be mounted.

As explained above, with respect to the optical fiber cable according to the present invention, examples of various aspects can be shown.

Here, as the optical fiber ribbons of the optical fiber cables 430, 431, 432, 433, 435, 436, 439, 441, other than the optical fiber ribbon 10 which is shown in the drawing, the above-mentioned optical fiber ribbons 10A, 110, 110A can be used.

Further, as the resin of the sheath of the cable covering over the optical fiber ribbon, thermosetting resin can be used. Further, for reducing the weight or improving the tearing property at the time of taking out the optical fiber ribbon, the resin of the sheath may be foamed.

Herein, the optical fiber ribbon as shown in FIG. 13, according to the present invention, is not limited to satisfy the relationship $T \leq d + 40$ (μm), and the sheath disposed in a recessed portion formed between the neighboring optical fibers may not exceed a common tangent of the neighboring optical fibers.

In this optical fibber ribbon with such a structure, when the optical fibers are branched from the integrated optical fiber ribbon, it is possible to easily branch the optical fibers because the sheath which covers the recessed portion between the optical fibers does not exceed the common tangent of the optical fibers.

As explained above, in the optical fiber ribbons according to the present invention, the optical fiber ribbon can be kept without separating each other when the optical fiber ribbon is formed in a cable and the respective optical fibers can be easily branched.

As explained above, by means of the optical fiber cable according to the present invention, the intermediate post branching of the optical fiber ribbon which is housed in the optical fiber cable can be easily performed.

As explained above, by means of the optical fiber cable according to the present invention, the intermediate post branching of the optical fiber ribbon which is housed in the optical fiber cable can be easily performed and the PMD can be decreased.

What is claimed is:

1. An optical fiber ribbon comprising:
a plurality of optical fibers which are arranged in parallel; and
a resin which integrates the plurality of optical fibers over the whole length of the optical fibers, the optical fibers and the resin being in a state that the optical fibers and the resin are closely adhered to each other, wherein
assuming a maximum value of a thickness of the optical fiber ribbon as T (μm) and an outer diameter of the optical fiber as d (μm), a relationship $T \leq d+40$ (μm) is established;
the plurality of optical fibers are integrated by covering the whole periphery of the plurality of optical fibers in a parallelly arranged state with the resin;
a recessed portion is formed in the resin corresponding to an indentation between the neighboring optical fibers;
assuming a thickness of the optical fiber ribbon in the recessed portion of the resin as g, a relationship $g \leq d$ (μm) is established;
the plurality of optical fibers are arranged in a state such that they are contacted to each other and each recess portion is provided in the resin corresponding to every indentation between the neighboring optical fibers; and
the resin is removed from the optical fiber ribbon by rubbing to branch one or more individual fibers from the optical fiber ribbon.

2. An optical fiber ribbon according to claim 1, wherein assuming a depth of the recessed portion as Y(μm), a relationship $(T-d)/2Y \leq 4.0$ is established.

3. An optical fiber ribbon according to claim 1, wherein the plurality of optical fibers are brought into contact with each other.

4. An optical fiber ribbon according to claim 1, wherein a relationship $g \leq 0.8d$(μm) is established.

5. An optical fiber ribbon according to claim 1, wherein an adhesive strength between the optical fiber and the resin per one optical fiber is within a range of 0.245 (mN) to 2.45 (mN).

6. An optical fiber ribbon according to claim 1, wherein a yield point stress of the resin is within a range of 20 (MPa) to 45 (MPa).

7. An optical fiber ribbon according to claim 1, wherein the increase of transmission loss when the optical fiber is branched from the optical fiber ribbon in a live-line state is equal to or less than 1.0 (dB).

8. An optical fiber ribbon according to claim 1, wherein a mode field diameter based on the definition of Petermann-I at a wavelength of 1.55 (μm) of the optical fibers is equal to or less than 10 (μm).

9. An optical fiber ribbon according to claim 1, wherein macrobend loss of the optical fiber having a bending diameter of 15 (mm) at a wavelength of 1.55 (μm) is equal to or less than 0.1 (dB/turn).

10. An optical fiber ribbon according to claim 1, wherein polarization mode dispersion of the optical fiber ribbon in a loose coil state is equal to or less than 0.2 ($ps/km^{1/2}$).

11. An optical fiber cable having one or a plural sheets of optical fiber ribbons, the optical fiber ribbon comprising a plurality of optical fibers which are arranged in parallel and a resin which integrates the plurality of optical fibers over the whole length of the optical fibers, the optical fibers and the resin being in a state that the optical fibers and the resin are closely adhered to each other, wherein assuming a maximum value of a thickness of the optical fiber ribbon as T(μm) and an outer diameter of the optical fiber as d(μm), a relationship T≦d+40 (μm) is established;

the optical fiber ribbon is configured such that the plurality of optical fibers are integrated by covering the whole periphery of the plurality of optical fibers in a parallelly arranged state with the resin;

a recessed portion is formed in the resin of the optical fiber ribbon corresponding to an indentation between the neighboring optical fibers;

the optical fiber ribbon is configured such that assuming a thickness of the optical fiber ribbon in the recessed portion as g, a relationship g≦d is established;

the plurality of optical fibers are arranged in a state such that they are contacted to each other and each recess portion is provided in the resin corresponding to every indentation between the neighboring optical fibers; and the resin is removed from the optical fiber ribbon by rubbing to branch one or more individual fibers from the optical fiber ribbon.

12. An optical fiber cable according to claim 11, further comprising a spacer having an approximately columnar plastic elongated body including a tensile strength body at a center thereof, wherein an approximately spirally grooves are formed on an outer peripheral face of the elongated body, and one or the plural sheets of optical fiber ribbons are stacked and housed in the inside of the groove.

13. An optical fiber cable according to claim 12, wherein the grooves are formed spirally in one direction along a longitudinal direction of the spacer.

14. An optical fiber cable according to claim 13, wherein link polarization mode dispersion of any wavelength within a range of 1.26 (μm) to 1.65 (μm) in all of the housed optical fibers is equal to or less than 0.05 (ps/km$^{1/2}$).

15. An optical fiber cable according to claim 12, wherein the grooves are formed spirally in such a manner that a spiral direction of the groove is alternatingly inverted along the longitudinal direction of the spacer.

16. An optical fiber cable according to claim 15, wherein link polarization mode dispersion of any wavelength within a range of 1.26 (μm) to 1.65 (μm) in all of the optical fibers housed in the grooves is equal to or less than 0.2 (ps/km$^{1/2}$).

17. An optical fiber cable according to claim 11, further comprising: an approximately cylindrical elongated tube in which one or the plural sheets of optical fiber ribbons are housed in a stacked manner.

18. An optical fiber cable according to claim 17, wherein one or the plural sheets of the optical fiber ribbons housed in the approximately cylindrical elongated tube are covered with a jelly compound.

19. An optical fiber cable according to claim 18, wherein link polarization mode dispersion of any wavelength within a range of 1.26 (μm) to 1.65 (μm) in all of the housed optical fibers is equal to or less than 0.05 (ps/km$^{1/2}$).

20. An optical fiber cable according to claim 17, wherein one or the plural sheets of the optical fiber ribbons housed in the approximately cylindrical elongated tube are covered with yarns.

21. An optical fiber cable according to claim 20, wherein link polarization mode dispersion of any wavelength within a range of 1.26 (μm) to 1.65 (μm) in all of the housed optical fibers is equal to or less than 0.2 (ps/km$^{1/2}$).

22. An optical fiber cable according to claim 17, wherein the approximately cylindrical elongated tube in which one or the plural sheets of the optical fiber ribbons are housed are twisted in such a manner that a twisting direction of the approximately cylindrical elongated tube is alternatingly inverted around a tensile strength body in a longitudinal direction of the tensile strength body.

23. An optical fiber cable according to claim 22, wherein link polarization mode dispersion of any wavelength within a range of 1.26 (μm) to 1.65 (μm) in all of the housed optical fibers is equal to or less than 0.2 (ps/km$^{1/2}$).

24. An optical fiber cable according to claim 17, wherein the approximately cylindrical elongated tube in which one or the plural sheets of the optical fiber ribbons are housed are twisted around a tensile strength body in one direction in the longitudinal direction of the tensile strength body.

25. An optical fiber cable according to claim 24, wherein link polarization mode dispersion of any wavelength within a range of 1.26 (μm) to 1.65 (μm) in all of the housed optical fibers is equal to or less than 0.2 (ps/km$^{1/2}$).

26. An optical fiber cable according to claim 11, further comprising: a sheath for covering one or the plural sheets of the optical fiber ribbon.

27. An optical fiber cable according to claim 26, wherein one of the plural sheets of the optical fiber ribbons and the sheath are adhered to each other.

28. An optical fiber cable according to claim 26, wherein an air gap is formed between one of the plural sheets of the optical fiber ribbons and the sheath.

29. An optical fiber cable according to claim 26, wherein an separator is disposed between one of the plural sheets of the optical fiber ribbons and the sheath.

30. An optical fiber cable according to claim 11, wherein the optical fiber ribbon is configured such that assuming a depth of the recessed portion as Y (μm), a relationship (T−d)/2Y≦4.0 is established.

31. An optical fiber cable according to claim 11, wherein the optical fiber ribbon is configured such that a relationship g≦0.8d is established.

32. An optical fiber cable according to claim 11, wherein the optical fiber ribbon is configured such that the neighboring optical fibers are arranged to be contact with each other.

33. An optical fiber cable according to claim 11, wherein the optical fiber ribbon is configured such that in an inside region defined by two straight lines which are perpendicular to a straight line which connects respective centers of two neighboring optical fibers and respectively pass the respective center of two neighboring optical fibers in a transverse cross section of the optical fiber ribbon, and assuming a Young's modulus as E and a cross-sectional area as S, a rate of an ES product of the resin with respect to a sum of ES products of the optical fibers is equal to or less than 0.026.

34. An optical fiber cable according to claim 33, wherein the optical fiber ribbon is configured such that in the inside region defined by two straight lines which are perpendicular to the straight line which connects respective centers of two neighboring optical fibers and respectively pass the respective center of two neighboring optical fibers in the transverse cross section of the optical fiber ribbon, and the rate of an ES product of the resin with respect to the sum of ES products of the optical fibers is equal to or less than 0.020.

35. An optical fiber cable according to claim 11, wherein the optical fiber ribbon is configured such that an adhesive strength between the optical fiber and the resin per one optical fiber is within a range of 0.245 (mN) to 2.45 (mN).

36. An optical fiber cable according to claim 11, wherein the optical fiber ribbon is configured such that a yield point stress of the resin is within a range of 20 (MPa) to 45 (MPa).

37. An optical fiber cable according to claim 11, wherein the optical fibers are configured such that a mode field diameter based on the definition of Petermann-I at a wavelength of 1.55 (μm) is equal to or less than 10 (μm).

38. An optical fiber cable according to claim 11, wherein the optical ribbons are configured such that the increase of transmission loss when the optical fiber is branched from the optical fiber ribbon in a live-line state is equal to or less than 1.0 (dB).

39. An optical fiber cable according to claim 11, wherein macrobend loss of the optical fiber having a bending diameter of 15 (mm) at a wavelength of 1.55 (μm) is equal to or less than 0.1 (dB/turn).

* * * * *